US012812640B2

(12) United States Patent
Jang et al.

(10) Patent No.: US 12,812,640 B2
(45) Date of Patent: Nov. 24, 2026

(54) METHOD AND DEVICE FOR MULTIPLEXING CHANNEL STATE INFORMATION IN WIRELESS COMMUNICATION SYSTEM

(71) Applicant: Samsung Electronics Co., Ltd., Suwon-si (KR)

(72) Inventors: Youngrok Jang, Suwon-si (KR); Seongmok Lim, Suwon-si (KR); Hyoungju Ji, Suwon-si (KR); Kyungjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 18/774,137

(22) Filed: Jul. 16, 2024

(65) Prior Publication Data

US 2025/0056533 A1 Feb. 13, 2025

(30) Foreign Application Priority Data

Jul. 27, 2023 (KR) ........................ 10-2023-0098482

(51) Int. Cl.

| | |
|---|---|
| ***H04W 72/1268*** | (2023.01) |
| ***H04B 7/06*** | (2006.01) |
| ***H04L 5/00*** | (2006.01) |
| ***H04W 72/0446*** | (2023.01) |
| ***H04W 72/231*** | (2023.01) |

(52) U.S. Cl.

CPC ...... *H04W 72/1268* (2013.01); *H04B 7/0626* (2013.01); *H04L 5/0051* (2013.01); *H04W 72/0446* (2013.01); *H04W 72/231* (2023.01)

(58) Field of Classification Search

CPC ....... H04L 5/005; H04L 5/001; H04L 5/0044; H04L 5/0051; H04L 5/0053;

(Continued)

(56) References Cited

U.S. PATENT DOCUMENTS

| | | | |
|---|---|---|---|
| 2020/0305183 A1 | 9/2020 | Papasakellariou | |
| 2021/0320779 A1 | 10/2021 | Huang et al. | |

(Continued)

FOREIGN PATENT DOCUMENTS

| | | | |
|---|---|---|---|
| KR | 20250038276 A * | 3/2025 | .......... H04W 72/232 |
| KR | 10-2026-0028026 A | 3/2026 | |

(Continued)

OTHER PUBLICATIONS

International Search Report with Written Opinion dated Oct. 22, 2024; International Appln. No. PCT/KR2024/010130.

*Primary Examiner* — Shean Tokuta
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting higher data rates. A method performed by a user equipment (UE) in a wireless communication system is provided. The method includes receiving, from a base station, configuration information including first information one a first sounding reference signal (SRS) resource set and a second SRS resource set, second information associated with an physical uplink shared channel (PUSCH) repeat transmissions, and third information associated with slot configuration, receiving, from the base station, downlink control information (DCI) scheduling a PUSCH, the DCI including a CSI request field triggering aperiodic channel state information (CSI) reporting, and transmitting, to the base station, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE)

(Continued)

allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

16 Claims, 29 Drawing Sheets

(58) Field of Classification Search
CPC ....... H04L 5/0057; H04L 5/0094; H04L 5/14; H04W 72/232; H04W 72/231; H04W 72/1268; H04B 7/0626
See application file for complete search history.

(56) References Cited

U.S. PATENT DOCUMENTS

| | | | | |
|---|---|---|---|---|
| 2022/0330240 | A1 | 10/2022 | Lee et al. | |
| 2024/0236978 | A1 * | 7/2024 | Zhang | H04L 1/1861 |
| 2024/0323937 | A1 * | 9/2024 | Lin | H04W 72/0453 |
| 2025/0008494 | A1 * | 1/2025 | Jang | H04L 5/0007 |
| 2025/0056533 | A1 * | 2/2025 | Jang | H04W 72/0446 |
| 2025/0105871 | A1 * | 3/2025 | Jang | H04W 72/21 |

FOREIGN PATENT DOCUMENTS

| | | | | |
|---|---|---|---|---|
| WO | 2021/161269 | A1 | 8/2021 | |
| WO | 2022/015848 | A1 | 1/2022 | |
| WO | WO-2025023588 | A1 * | 1/2025 | H04W 72/232 |
| WO | WO-2025173169 | A1 * | 8/2025 | H04W 72/21 |

* cited by examiner

METHOD AND DEVICE FOR MULTIPLEXING CHANNEL STATE INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2023-0098482, filed on Jul. 27, 2023, in the Korean Intellectual Property Office, the disclosure of which is incorporated by reference herein in its entirety.

BACKGROUND

1. Field

The disclosure relates to an operation of a terminal and a base station in a wireless communication system. More particularly, the disclosure relates to a channel state information multiplexing method for full duplex communication in network cooperative communication, and a device capable of performing same.

2. Description of Related Art $5^{th}$ generation (5G) mobile communications technology defines a wide range of frequency bands to enable faster transmission speeds and new services, and can be implemented in the sub-6 GHZ ("Sub 6 GHz") bands, such as 3.5 gigahertz (3.5 GHz), as well as in the ultra-high frequency bands called millimeter wave ("Above 6 GHz"), such as 28 GHZ and 39 GHz. In addition, for $6^{th}$ generation (6G) mobile communications technology, also known as Beyond 5G systems, implementations in terahertz bands (e.g., the 3 terahertz (3 THz) band at 95 GHZ) are being considered to achieve 50 times faster transmission speeds and one-tenth the ultra-low latency of 5G mobile communications technology.

In the early stages of 5G mobile communications technology, beamforming and massive array multiple input/multiple output (massive MIMO) to mitigate the path loss of radio waves in the ultra-high frequency band and increase the transmission distance of radio waves, with the goal of supporting services and meeting the performance requirements for enhanced mobile broadband (eMBB), ultra-reliable low-latency communications (URLLC), and massive machine-type communications (mMTC), support for various pneumatologies for efficient utilization of ultra-high frequency resources (such as multiple subcarrier spacing operations) and dynamic operations for slot formats, early access technologies to support multi-beam transmission and broadband, and the definition and operation of band-width parts (BWPs), standardization of new channel coding methods, such as low density parity check (LDPC) coding for large data transfers and polar code for reliable transmission of control information, layer 2 (L2) pre-processing, and Network Slicing, which provides dedicated networks for specific services.

Currently, discussions are underway to improve and enhance the initial 5G mobile communications technology in light of the services it was intended to support, such as vehicle-to-everything (V2X) to help autonomous vehicles make driving decisions based on their own location and status information transmitted by the vehicle and increase user convenience, physical layer standardization is underway for technologies, such as new radio unlicensed (NR-U), NR terminal low power consumption technology (user equipment (UE) power saving), non-terrestrial network (NTN), which is a direct terminal-to-satellite communication for coverage in areas where communication with terrestrial networks is not possible, and Positioning.

In addition, intelligent factories (industrial Internet of things, IIoT) to support new services through connectivity and convergence with other industries, integrated access and backhaul (IAB) to provide nodes for network coverage area expansion by integrating wireless backhaul links and access links, and mobility enhancement technologies, including conditional handover and dual active protocol stack (DAPS) handover, standardization is also underway in the area of air interface architecture/protocols for technologies, such as 2-step random access channel (RACH) for NR, which simplifies the random access process, 5G baseline architecture (e.g., service based architecture, service based interface) for the convergence of network functions virtualization (NFV) and software-defined networking (SDN) technologies, and system architecture/services for mobile edge computing (MEC), where services are delivered based on the location of the terminal.

Once these 5G mobile communication systems are commercialized, an explosive growth of connected devices will be connected to the communication network, which is expected to require enhancement of the functions and performance of 5G mobile communication systems and integrated operation of connected devices. To this end, new research will be conducted on improving 5G performance and reducing complexity by utilizing extended reality (XR), artificial intelligence (AI), and machine learning (ML) to efficiently support augmented reality (AR), virtual reality (VR), and mixed reality (MR), supporting AI services, supporting Metaverse services, and drone communication.

In addition, these advances in 5G mobile communications systems will be supported by new waveforms to ensure coverage in the terahertz band of 6G mobile communications technology, and multi-antenna transmission technologies, such as full dimensional MIMO (FD-MIMO), array antenna, and large scale antenna, metamaterial-based lenses and antennas, high-dimensional spatial multiplexing techniques using orbital angular momentum (OAM), and reconfigurable intelligent surface (RIS) technologies to improve coverage of terahertz band signals, full duplex technology to improve frequency efficiency and system network of 6G mobile communication technology, AI-based communication technology that utilizes satellite and artificial intelligence (AI) from the design stage and realizes system optimization by embedding end-to-end AI support functions, and next-generation distributed computing technology that realizes complex services beyond the limits of terminal computing power by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device enabling effective provision of a service in a mobile communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving, from a base station, configuration information including first information one a first sounding reference signal (SRS) resource set and a second SRS resource set, second information associated with an physical uplink shared channel (PUSCH) repeat transmissions, and third information associated with slot configuration, receiving, from the base station, downlink control information (DCI) scheduling a PUSCH, the DCI including a CSI request field triggering aperiodic channel state information (CSI) reporting, and transmitting, to the base station, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

In accordance with another aspect of the disclosure, a method performed by a base station in a wireless communication system is provided. The method includes transmitting, to a user equipment (UE), configuration information including first information one a first sounding reference signal (SRS) resource set and a second SRS resource set, second information associated with an physical uplink shared channel (PUSCH) repeat transmissions, and third information associated with slot configuration, transmitting, to the UE, downlink control information (DCI) scheduling a PUSCH, the DCI including a CSI request field triggering aperiodic channel state information (CSI) reporting, and receiving, from the UE, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

In accordance with another aspect of the disclosure, a user equipment (UE) in a wireless communication system is provided. The UE includes a transceiver, and a controller coupled with the transceiver and configured to receive, from a base station, configuration information including first information one a first sounding reference signal (SRS) resource set and a second SRS resource set, second information associated with an physical uplink shared channel (PUSCH) repeat transmissions, and third information associated with slot configuration, receive, from the base station, downlink control information (DCI) scheduling a PUSCH, the DCI including a CSI request field triggering aperiodic channel state information (CSI) reporting, and transmit, to the base station, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

In accordance with another aspect of the disclosure, a base station in a wireless communication system is provided. The base station includes a transceiver, and a controller coupled with the transceiver and configured to transmit, to a user equipment (UE), configuration information including first information one a first sounding reference signal (SRS) resource set and a second SRS resource set, second information associated with an physical uplink shared channel (PUSCH) repeat transmissions, and third information associated with slot configuration, transmit, to the UE, downlink control information (DCI) scheduling a PUSCH, the DCI including a CSI request field triggering aperiodic channel state information (CSI) reporting, and receive, from the UE, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

A disclosed embodiment provides a method and a device enabling effective provision of a service in a mobile communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
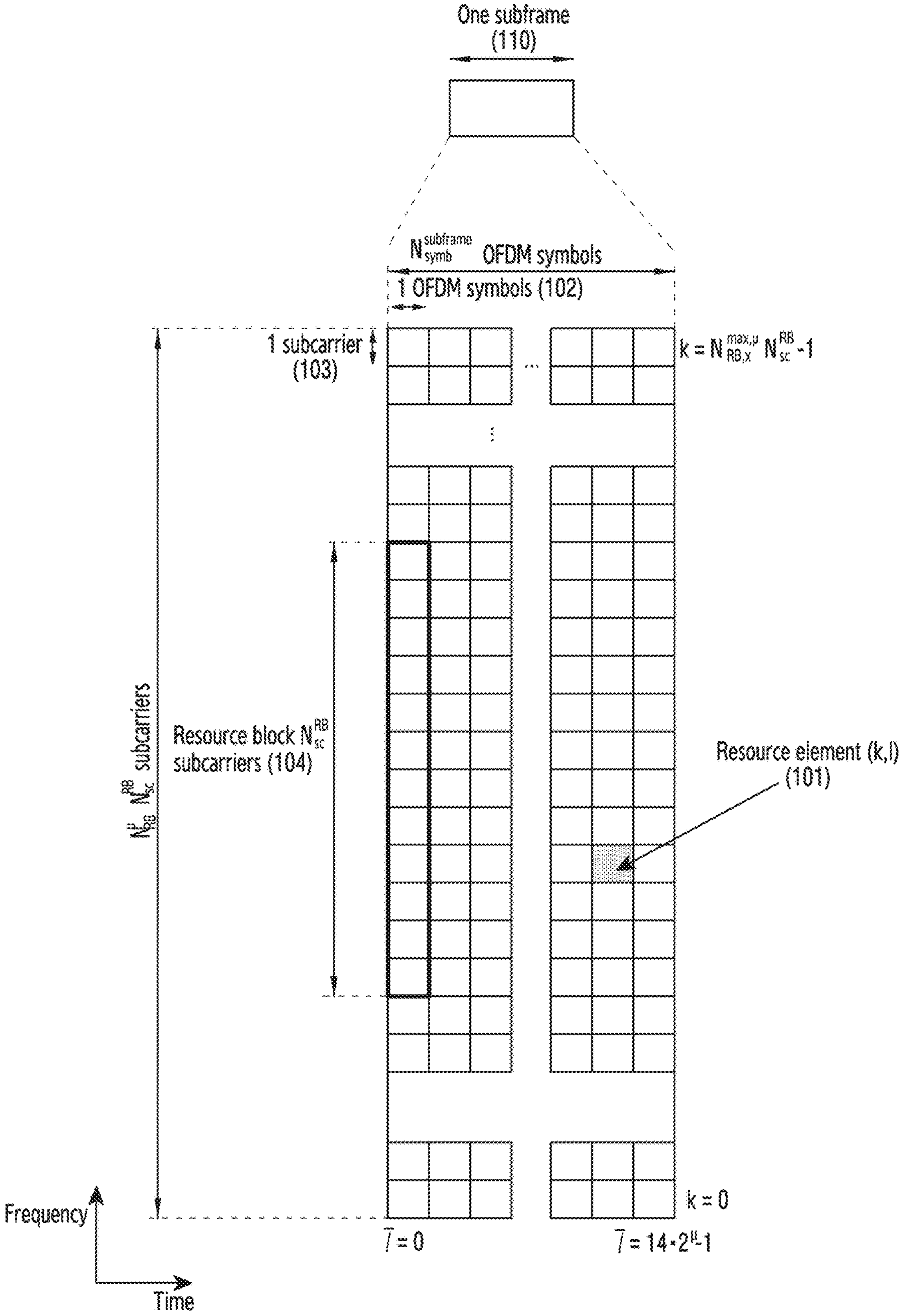
FIG. 1 illustrates a basic structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the accompanying drawings, some elements may be exaggerated, omitted, or schematically illustrated. Furthermore, the size of each element does not completely reflect the actual size. In the respective drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms, and the embodiments of the disclosure are provided merely to completely disclose the disclosure and inform those skilled in the art of the scope of the disclosure. The disclosure is defined by the scope of the appended claims. Throughout the specification, the same or like reference signs indicate the same or like elements. In describing the disclosure below, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include at least one of a user equipment (UE), a mobile station (MS), a cellular phone, a smartphone, a computer, or a multimedia system capable of performing a communication function. In the disclosure, a "downlink (DL)" may refer to a radio link via which a base station transmits a signal to a terminal, and an "uplink (UL)" may refer to a radio link via which a terminal transmits a signal to a base station. Furthermore, in the following description, long term evolution (LTE) or LTE-advanced (LTE-A) systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, and other similar services. In addition, based on determinations by those skilled in the art, the disclosure may also be applied to other communication systems through some modifications without significantly departing from the scope of the disclosure.

It will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

According to an embodiment of the disclosure, as used in the disclosure, the "unit" may refer to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more central processing units (CPUs) within a device or a security multimedia card. Furthermore, the "unit" in the disclosure may include one or more processors.

A wireless communication system is advancing to a broadband wireless communication system for providing high-speed and high-quality packet data services using communication standards, such as high-speed packet access (HSPA) of 3rd generation partnership project (3GPP), LTE (long-term evolution or evolved universal terrestrial radio access (E-UTRA)), LTE-Advanced (LTE-A), LTE-Pro, high-rate packet data (HRPD) of 3GPP2, ultra-mobile broadband (UMB), IEEE 802.16e, and the like, as well as typical voice-based services.

According to an embodiment of the disclosure, as a typical example of the broadband wireless communication system, an LTE system employs an orthogonal frequency division multiplexing (OFDM) scheme in a downlink (DL). In an uplink (UL), a single carrier frequency division multiple access (SC-FDMA) scheme may be employed. The uplink may refer to a radio link via which a user equipment (UE) or a mobile station (MS) transmits data or control signals to a base station (BS) or eNode B, and the downlink may refer to a radio link via which the base station transmits data or control signals to the UE. The multiple access scheme may separate data or control information of respective users by allocating and operating time-frequency resources for transmitting the data or control information for each user so as to avoid overlapping each other, that is, so as to establish orthogonality.

According to an embodiment of the disclosure, since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to an embodiment of the disclosure, e MBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, various transmission/reception technologies including a further enhanced multiple-input multiple-output (MIMO) transmission technique may be required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services, such as the Internet of things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of things. Since the Internet of things provides communication functions while being provided to various sensors and various devices, it must support a large number of UEs (e.g., 1,000,000 UEs/km$^2$) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 15 years because it is difficult to frequently replace the battery of the UE.

Lastly, URLLC is a cellular-based mission-critical wireless communication service. For example, URLLC may be used for services, such as remote control for robots or machines, industrial automation, unmanned aerial vehicles, remote health care, and emergency alert. Thus, URLLC must provide communication with ultra-low latency and ultra-high reliability. For example, a service supporting URLLC must satisfy an air interface latency of less than 0.5 ms, and may also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

According to an embodiment of the disclosure, the three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

In the following description, the term "a/b" may be understood as at least one of a and b.

[NR Time-Frequency Resources]

Hereinafter, a frame structure of a 5G system will be described with reference to the accompanying drawings.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a basic structure of a time-frequency domain, which is a radio resource domain used to transmit data or control channels, in a 5G system according to an embodiment of the disclosure.

Referring to FIG. 1, the horizontal axis in FIG. 1 represents a time domain, and the vertical axis in FIG. 1 represents a frequency domain. The basic unit of resources in the time-frequency domain is a resource element (RE) 101, which may be defined as one orthogonal frequency division multiplexing (OFDM) symbol 102 on the time axis and one subcarrier 103 on the frequency axis. In the frequency domain, $$N_{SC}^{RB}$$

(for example, 12) consecutive REs may constitute one resource block (RB) 104. In the time domain, one subframe 110 may include multiple OFDM symbols 102. For example, the length of one subframe may be 1 ms.

Figure 2:
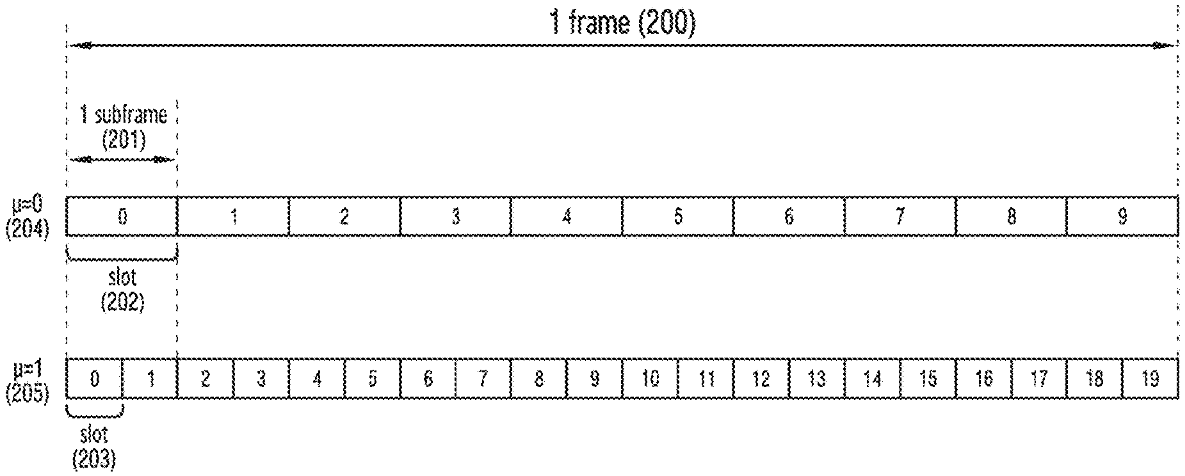
FIG. 2 illustrates a structure of a frame, a subframe, and a slot in a wireless communication system according to an embodiment of the disclosure.

FIG. 2 illustrates a structure of a frame, a subframe, and a slot in a wireless communication system according to an embodiment of the disclosure.

Referring to FIG. 2, FIG. 2 illustrates an example of a structure of a frame 200, a subframe 201, and a slot 202. One frame 200 may be defined as 10 ms. One subframe 201 may be defined as 1 millisecond (ms), and thus one frame 200 may include a total of ten subframes 201.

According to an embodiment of the disclosure, one slot 202 or 203 may be defined as 14 OFDM symbols. For example, the number of symbols per one slot may be referred to as $$N_{symb}^{slot} = 14.$$

One subframe 201 may include one or multiple slots 202 and 203, and the number of slots 202 and 203 per one subframe 201 may vary depending on configuration values μ 204 or 205 for the subcarrier spacing.

The example of FIG. 2 shows the case of μ=0 (204) and the case of μ=1 (205) as a configuration value for a subcarrier spacing. In the case of μ=0 (204), one subframe 201 may include one slot 202, and in the case of μ=1 (205), one subframe 201 may include two slots 203. For example, the number of slots per one subframe $$N_{slot}^{sunframe,\mu}$$

may differ depending on the subcarrier spacing configuration value u, and the number of slots per one frame $$N_{slot}^{frame,\mu}$$

may differ accordingly.

$$N_{slot}^{sunframe,\mu}$$

and $$N_{slot}^{frame,\mu}$$

may be defined according to each subcarrier spacing configuration μ as in Table 1 below.

TABLE 1

| μ | $N_{symb}^{slot}$ | $N_{slot}^{frame,\mu}$ | $N_{slot}^{sunframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Hereinafter, bandwidth part (BWP) configuration in a 5G communication system will be described with reference to the drawings.

Figure 3:
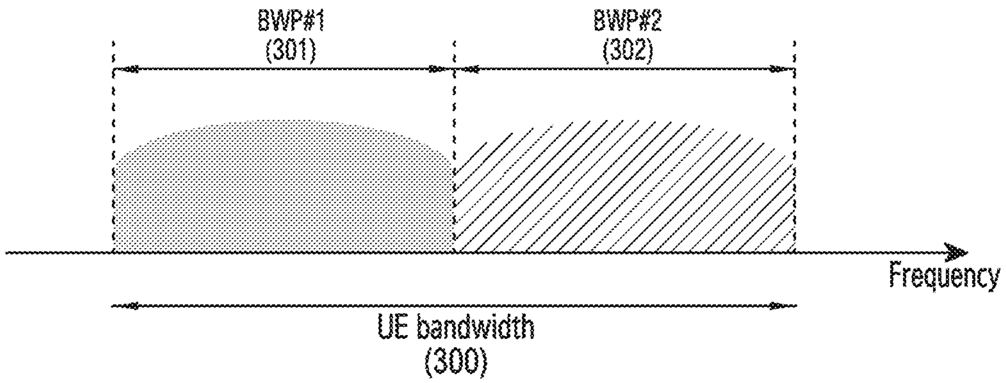
FIG. 3 illustrates bandwidth part configuration in a wireless communication system according to an embodiment of the disclosure.

FIG. 3 illustrates bandwidth part configuration in a wireless communication system according to an embodiment of the disclosure.

Referring to FIG. 3, it illustrates an example in which a UE bandwidth 300 is configured to include two bandwidth parts, that is, bandwidth part #1 (BWP #1) 301 and bandwidth part #2 (BWP #2) 302. A base station may configure one or multiple bandwidth parts for a UE, and may configure the following pieces of information with regard to each bandwidth part as given in Table 2 below.

TABLE 2

| | |
|---|---|
| BWP ::= | SEQUENCE { |
| bwp-Id (bandwidth part identifier) | BWP-Id, |
| locationAndBandwidth (bandwidth part location) | INTEGER (1..65536), |
| subcarrierSpacing | ENUMERATED {n0, n1, n2, n3, |
| n4, n5}, (subcarrier spacing) | |
| cyclicPrefix (cyclic prefix) | ENUMERATED { extended } |
| } | |

Of course, the information configured for the UE is not limited to the above example, and in addition to the configuration information in Table 2, various parameters related to the bandwidth part may be configured for the UE. The base station may transfer the configuration information to the UE through upper layer signaling (for example, radio resource control (RRC) signaling). At least one of the one or more bandwidth parts configured for the UE may be activated. Whether or not the bandwidth part configured for the UE is activated may be transferred from the base station to the UE semi-statically through RRC signaling, or dynamically through downlink control information (DCI).

According to an embodiment of the disclosure, before a radio resource control (RRC) connection, an initial bandwidth part (BWP) for initial access may be configured for the UE by the base station through a master information block (MIB). For example, the UE may receive configuration information regarding a control resource set (CORESET) and a search space which may be used to transmit a physical downlink control channel (PDCCH) for receiving system information (which may correspond to remaining system information (RMSI) or system information block 1 (SIB1) necessary for initial access through the MIB in the initial access step.

According to an embodiment of the disclosure, each of the control resource set and the search space configured through the MIB may be considered identity (ID) 0 or identified thereby. The base station may notify the UE of configuration information, such as frequency allocation information, time allocation information, and/or numerology, regarding CORESET #0 through the MIB. In addition, the base station may notify the UE of configuration information regarding the monitoring cycle and occasion with regard to CORESET #0, that is, configuration information regarding search space #0, through the MIB. The UE may identify or consider a frequency domain configured by CORESET #0 acquired from the MIB as an initial bandwidth part for initial access. The ID of the initial bandwidth part may be considered to be 0.

According to an embodiment of the disclosure, the bandwidth part-related configuration supported by 5G may be used for various purposes.

According to an embodiment of the disclosure, if the bandwidth supported by the UE is smaller than the system bandwidth, the base station may support data communication of the UE through the bandwidth part configuration. For example, the base station may configure the frequency location of the bandwidth part (configuration information 2) for the UE, so that the UE can transmit/receive data at a specific frequency location (for example, a configured frequency location) within the system bandwidth.

According to an embodiment of the disclosure, the base station may configure multiple bandwidth parts for the UE for the purpose of supporting different numerologies. For example, in order to support a designated UE's data transmission/reception using both a subcarrier spacing of 15 kHz and a subcarrier spacing of 30 kHz, the base station may configure, for the designated UE, two bandwidth parts as subcarrier spacings of 15 kHz and 30 kHz, respectively. Different bandwidth parts may be subjected to frequency division multiplexing (FDM), and if data is to be transmitted/received at a specific subcarrier spacing, the bandwidth part configured as the corresponding subcarrier spacing may be activated.

According to an embodiment of the disclosure, the base station may configure bandwidth parts having different sizes of bandwidths for the UE for the purpose of reducing power consumed by the UE. For example, if the UE supports a substantially large bandwidth (for example, 100 MHZ) and always transmits/receives data with the supported bandwidth, a substantially large amount of power consumption may occur. Particularly, it may be substantially inefficient from the viewpoint of power consumption to unnecessarily monitor the downlink control channel with a large bandwidth of 100 MHz in the absence of traffic. In order to reduce power consumed by the UE, the base station may configure a bandwidth part of a relatively small bandwidth (for example, a bandwidth part of 20 MHZ) for the UE. The UE may perform a monitoring operation in the 20 MHz bandwidth part in the absence of traffic, and may transmit/receive data with the 100 MHz bandwidth part as indicated by the base station if data has occurred.

According to an embodiment of the disclosure, in connection with the bandwidth part configuring method, UEs, before RRC-connected, may receive configuration information regarding the initial bandwidth part (initial BWP) through an MIB in the initial access step. For example, a UE may have a control resource set (i.e., CORESET) configured for a downlink control channel which may be used to transmit DCI for scheduling a system information block (SIB) from the MIB of a physical broadcast channel (PBCH). The bandwidth of the control resource set configured by the MIB may be considered the initial bandwidth part, and the UE may receive, through the configured initial bandwidth part, a physical downlink shared channel (PDSCH) through which an SIB is transmitted. The initial bandwidth part may be used not only for the purpose of receiving the SIB, but also for other system information (OSI), paging, and/or random access.

According to an embodiment of the disclosure, if one or more bandwidth parts are configured for the UE, the base station may indicate, to the UE, to change (or switch or transition) the bandwidth parts by using a bandwidth part indicator field inside DCI. For example, if the currently activated bandwidth part of the UE is bandwidth part #1 301 in FIG. 3, the base station may indicate bandwidth part #2 302 with a bandwidth part indicator inside DCI, and the UE may change (or switch) the bandwidth part to bandwidth part #2 302 indicated by the bandwidth part indicator inside the received DCI.

As described above, DCI-based bandwidth part changing may be indicated by DCI for scheduling a PDSCH or a PUSCH, and thus, upon receiving a bandwidth part change request, the UE needs to be able to receive or transmit the PDSCH or PUSCH scheduled by the corresponding DCI in the changed bandwidth part with no problem. To this end, requirements for the delay time (TBWP) required during a bandwidth part change are specified in standards, and may be defined as given in Table 3 below, for example.

TABLE 3

| | | BWP switch delay $T_{BWP}$ (slots) | |
|---|---|---|---|
| μ | NR Slot length (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1

Depends on UE capability.

Note 2:

If the BWP switch involves changing of SCS, the BWP switch delay is determined by the larger one between the SCS before BWP switch and the SCS after BWP switch.

According to an embodiment of the disclosure, the requirements for the bandwidth part change delay time may support type 1 or type 2, depending on the capability of the UE. The UE may report the supportable bandwidth part change delay time type to the base station. For example, the bandwidth part delay time may differ depending on the capability of the UE, and the UE may report the bandwidth part change delay time type, determined based on the capability of the UE, to the base station. The bandwidth part change delay time type may indicate a bandwidth part change delay time.

According to an embodiment of the disclosure, if the UE has received DCI including a bandwidth part change indicator in slot n, according to (or based on) the requirement for the bandwidth part change delay time, the UE may complete a change to the new bandwidth part indicated by the bandwidth part change indicator at a timepoint not later than slot n+TBWP, and the UE may transmit and/or receive a data channel scheduled by the corresponding DCI in the changed new bandwidth part.

According to an embodiment of the disclosure, if the base station wants to schedule a data channel by using the new bandwidth part, the base station may determine time domain resource allocation regarding the data channel, based on the UE's bandwidth part change delay time (TBWP). For example, when scheduling a data channel by using the new bandwidth part, the base station may schedule the corresponding data channel at a timepoint after the bandwidth part change delay time, in connection with the determination of time domain resource allocation regarding the data channel. Accordingly, the UE may not expect that the DCI indicating a bandwidth part change will indicate a slot offset (K0 or K2) value smaller than the bandwidth part change delay time (TBWP).

According to an embodiment of the disclosure, in case that the UE has received DCI (for example, DCI format 1_1 or 0_1) indicating a bandwidth part change, the UE may perform no transmission or reception during a time interval from the third symbol of the slot used to receive a PDCCH including the corresponding DCI indicating the bandwidth part change to the start point of the slot indicated by a slot offset (K0 or K2) value. For example, the slot offset (K0 or K2) value may be indicated by a time domain resource allocation indicator field in the corresponding DCI.

For example, if the UE has received DCI indicating a bandwidth part change in slot n, and the slot offset value indicated by the corresponding DCI is K, the UE may perform no transmission or reception from the third symbol of slot n to the symbol before slot n+K (i.e., the last symbol of slot n+K-1).

[Regarding CA/DC]

Figure 4:
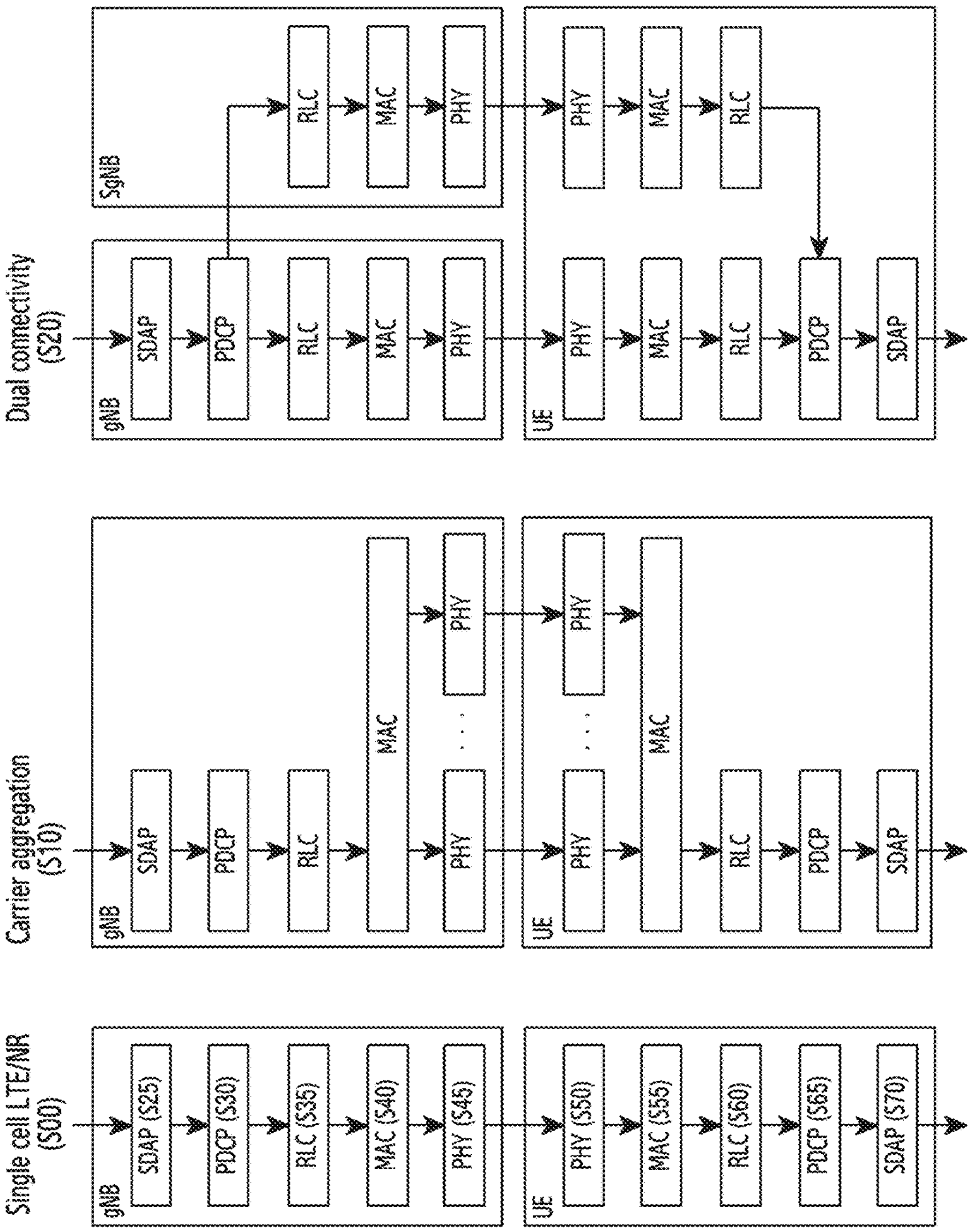
FIG. 4 illustrates radio protocol structures of a base station and a terminal in single cell, carrier aggregation, and dual connectivity situations in a wireless communication system according to an embodiment of the disclosure.

FIG. 4 illustrates radio protocol structures of a base station and a terminal in single cell, carrier aggregation, and dual connectivity situations according to an embodiment of the disclosure.

Referring to FIG. 4, a radio protocol of a mobile communication system includes an NR service data adaptation protocol (SDAP) S25 or S70, an NR packet data convergence protocol (PDCP) S30 or S65, an NR radio link control (RLC) S35 or S60, and/or an NR medium access controls (MAC) S40 or S55, on each of UE and NR base station sides.

According to an embodiment of the disclosure, the main functions of the NR SDAP S25 or S70 may include at least some of functions below.

- Transfer of user plane data
- Mapping between a quality of service (QOS) flow and a data radio bearer (DRB) for both DL and UL
- Marking QoS flow ID in both DL and UL packets
- Reflective QoS flow to DRB mapping for the UL SDAP protocol data units (PDUs)

According to an embodiment of the disclosure, for the SDAP layer device, whether to use the header of the SDAP layer device or whether to use functions of the SDAP layer device mat be configured for the UE through an RRC message, with regard to each PDCP layer device or with regard to each bearer or with regard to each logical channel. If an SDAP header is configured, the SDAP layer device may indicate, through the non-access stratum (NAS) QOS reflection configuration 1-bit indicator (NAS reflective QoS) of the SDAP header and the AS QoS reflection configuration 1-bit indicator (AS reflective QoS), that the UE can update or reconfigure mapping information regarding the QoS flow and data bearer of the uplink and downlink. For example, the SDAP header may include QoS flow ID information indicating the QoS. For example, the QoS information may be used as data processing priority for smoothly supporting services and/or or scheduling information, or the like.

The main functions of the NR PDCP S30 or S65 may include at least some of functions below.

- Header compression and decompression: robust header compression (ROHC) only
- Transfer of user data
- In-sequence delivery of upper layer PDUs
- Out-of-sequence delivery of upper layer PDUs
- PDCP PDU reordering for reception
- Duplicate detection of lower layer service data units (SDUs)
- Retransmission of PDCP SDUs
- Ciphering and deciphering
- Timer-based SDU discard in uplink According to an embodiment of the disclosure, the reordering of the NR PDCP device may refer to a function of reordering PDCP PDUs received from a lower layer in an order based on the PDCP sequence number (SN), and may include a function of transferring data to an upper layer in the reordered sequence.

According to an embodiment of the disclosure, the reordering of the NR PDCP device may include a function of instantly transferring data without considering the order, and may include a function of recording PDCP PDUs lost as a result of reordering. The reordering of the NR PDCP device may include a function of reporting the state of the lost PDCP PDUs to the transmitting side, and may include a function of requesting retransmission of the lost PDCP PDUs.

The main functions of the NR RLC S35 or S60 may include at least some of functions below.

- Transfer of upper layer PDUs
- In-sequence delivery of upper layer PDUs
- Out-of-sequence delivery of upper layer PDUs
- Error correction through automatic repeat request (ARQ)
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment According to an embodiment of the disclosure, the in-sequence delivery of the NR RLC device may refer to a function of successively delivering RLC SDUs received from the lower layer to the upper layer. The in-sequence delivery of the NR RLC device may include a function of, if one original RLC SDU is segmented into multiple RLC SDUs and the segmented RLC SDUs are received, reassembling the RLC SDUs and delivering the reassembled RLC SDUs. The in-sequence delivery of the NR RLC device may include a function of reordering the received RLC PDUs with reference to the RLC sequence number (SN) or PDCP sequence number (SN), and may include a function of recording RLC PDUs lost as a result of reordering. The in-sequence delivery of the NR RLC device may include a function of reporting the state of the lost RLC PDUs to the transmitting side, and may include a function of requesting retransmission of the lost RLC PDUs.

According to an embodiment of the disclosure, the in-sequence delivery of the NR RLC device may include a function of, if there is a lost RLC SDU, successively delivering only RLC SDUs before the lost RLC SDU to the upper layer, and may include a function of, if a predetermined timer has expired although there is a lost RLC SDU, successively delivering all RLC SDUs received before the timer was started to the upper layer. Alternatively, the in-sequence delivery of the NR RLC device may include a function of, if a predetermined timer has expired although there is a lost RLC SDU, successively delivering all RLC SDUs received until now to the upper layer. In addition, the in-sequence delivery of the NR RLC device may process RLC PDUs in the received order (regardless of the sequence number order, in the order of arrival) and deliver same to the PDCP device regardless of the order (out-of-sequence delivery). The in-sequence delivery of the NR RLC device may, in the case of segments, receive segments which are stored in a buffer or which are to be received later, reconfigure same into one complete RLC PDU, and then process and deliver same to the PDCP device. The NR RLC layer may include no concatenation function, which may be performed in the NR MAC layer or replaced with a multiplexing function of the NR MAC layer.

According to an embodiment of the disclosure, the out-of-sequence delivery of the NR RLC device may refer to a function of instantly delivering RLC SDUs received from the lower layer to the upper layer regardless of the order. The out-of-sequence delivery of the NR RLC device may include a function of, if one original RLC SDU is segmented into multiple RLC SDUs and the segmented RLC SDUs are received, reassembling the RLC SDUs and delivering the reassembled RLC SDUs, and may include a function of storing the RLC SN or PDCP SN of received RLC PDUs, and recording RLC PDUs lost as a result of reordering.

According to an embodiment of the disclosure, the NR MAC S40 or S55 may be connected to multiple NR RLC layer devices configured in one UE, and the main functions of the NR MAC may include at least some of functions below.

- Mapping between logical channels and transport channels
- Multiplexing/demultiplexing of MAC SDUs
- Scheduling information reporting
- Error correction through hybrid ARQ (HARQ)
- Priority handling between logical channels of one UE
- Priority handling between UEs by means of dynamic scheduling
- Multimedia broadcast multicast service (MBMS) service identification
- Transport format selection
- Padding According to an embodiment of the disclosure, an NR physical (PHY) layer S45 or S50 may perform operations of channel-coding and modulating upper layer data, thereby obtaining OFDM symbols, and delivering the same through a radio channel, or demodulating OFDM symbols received through the radio channel, channel-decoding the same, and delivering the same to the upper layer.

According to an embodiment of the disclosure, the structure of the radio protocol structure may be variously changed according to the carrier (or cell) operating scheme. For example, in case that the base station transmits data to the UE, based on a single carrier (or cell), the base station and the UE may use a protocol structure having a single structure with regard to each layer, such as S00. On the other hand, in case that the base station transmits data to the UE, based on carrier aggregation (CA) which uses multiple carriers in a single TRP, the base station and the UE may use a protocol structure which has a single structure up to the RLC, but multiplexes the PHY layer through a MAC layer, such as S10. For example, in case that the base station transmits data to the UE, based on dual connectivity (DC) which uses multiple carriers in multiple TRPs, the base station and the UE may use a protocol structure which has a single structure up to the RLC, but multiplexes the PHY layer through a MAC layer, such as S20.

[Unified TCI State]

Hereinafter, a single TCI state indication and activation method based on a unified TCI scheme is described. The unified TCI scheme may mean a scheme of integral management through a TCI state instead of transmission and reception beam management schemes having been classified as a TCI state scheme used in downlink reception of a UE and a spatial relation info scheme used in uplink transmission in Rel-15 and 16 of the related art. Therefore, in a case where a UE receives an indication from a base station, based on the unified TCI scheme, the UE may perform beam management even for uplink transmission by using a TCI state. If the higher layer signaling TCI-State having the higher layer signaling tci-stateId-r17 is configured for a UE by a base station, the UE may perform an operation based on the unified TCI scheme by using the TCI-State. TCI-State may exist in two types including a joint TCI state and a separate TCI state.

The first type is a joint TCI state, and all TCI states to be applied to uplink transmission and downlink reception may be indicated to a UE by a base station through one value of TCI-State. If joint TCI state-based TCI-state is indicated to the UE, a parameter to be used in downlink channel estimation may be indicated to the UE by using an RS corresponding to qcl-Type1 in the joint TCI state-based TCI-state, and a parameter to be used as a downlink reception beam or reception filter may be indicated thereto by using an RS corresponding to qcl-Type2. If joint TCI state-based TCI-state is indicated to the UE, a parameter to be used as an uplink transmission beam or transmission filter may be indicated to the UE by using an RS corresponding to qcl-Type2 in a corresponding joint DL/UL TCI state-based TCI-state. If a joint TCI state is indicated to the UE, the UE may apply the same beam to uplink transmission and downlink reception.

The second type is a separate TCI state, and a UL TCI state to be applied to uplink transmission and a DL TCI state to be applied to downlink reception may be individually indicated to a UE by a base station. If a UL TCI state is indicated to the UE, a parameter to be used as an uplink transmission beam or transmission filter may be indicated to the UE by using a reference RS or a source RS configured in the UL TCI state. If a DL TCI state is indicated to the UE, a parameter to be used in downlink channel estimation may be indicated to the UE by using an RS corresponding to qcl-Type1 configured in the DL TCI state, and a parameter to be used as a downlink reception beam or reception filter may be indicated thereto by using an RS corresponding to qcl-Type2.

If a DL TCI state and a UL TCI state are indicated to the UE together, a parameter to be used as an uplink transmission beam or transmission filter may be indicated to the UE by using a reference RS or a source RS configured in the UL TCI state, a parameter to be used in downlink channel estimation may be indicated to the UE by using an RS corresponding to qcl-Type1 configured in the DL TCI state, and a parameter to be used as a downlink reception beam or reception filter may be indicated thereto using an RS corresponding to qcl-Type2. If the reference RSs or source RSs configured in the DL TCI state and UL TCI state indicated to the UE are different from each other, the UE may apply individual beams to uplink transmission and downlink reception, based on the indicated UL TCI state and DL TCI state.

A maximum of 128 joint TCI states may be configured for a particular bandwidth part in a particular cell for the UE by the base station through higher layer signaling, a maximum of 64 or 128 DL TCI states, which are separate TCI states, may be configured for a particular bandwidth part in a particular cell through higher layer signaling, based on a UE capability report, and a DL TCI state among separate TCI states and a joint TCI state may use the same higher layer signaling structure. For example, if 128 joint TCI states are configured and 64 DL TCI states of separate TCI states are configured, the 64 DL TCI states may be included in the 128 joint TCI states.

A maximum of 32 or 64 UL TCI states, which are separate TCI states, may be configured for a particular bandwidth part in a particular cell through higher layer signaling, based on a UE capability report, and a UL TCI state among separate TCI states and a joint TCI state may also use the same higher layer signaling structure like the relation between a DL TCI state among separate TCI states and a joint TCI state, or a UL TCI state among separate TCI states may also use a higher layer signaling structure different from that of a joint TCI state and a DL TCI state among separate TCI states.

As described above, using different or identical higher layer signaling structures may be defined in a specification, or may be distinguished through another higher layer signaling configured by a base station, based on a UE capability report including information on a usage scheme which a UE is able to support among two types of usage schemes.

A transmission/reception beam-related indication may be received by the UE in a unified TCI scheme by using one scheme among a joint TCI state and a separate TCI state configured by the base station. Whether to use one of a joint TCI state and a separate TCI state may be configured for a UE by a base station through higher layer signaling.

A UE may receive a transmission/reception beam-related indication through higher layer signaling by using one scheme selected from among a joint TCI state and a separate TCI state, and a method of transmission/reception beam-related indication by a base station may be classified as two methods including a MAC-CE-based indication method and a MAC-CE-based activation and DCI-based indication method.

In a case where a UE receives a transmission/reception beam-related indication through higher layer signaling by using a joint TCI state scheme, the UE may receive a MAC-CE indicating a joint TCI state from a base station to perform a transmission/reception beam application operation, and the base station may schedule reception of a PDSCH including the MAC-CE to the UE through a PDCCH. If there is one joint TCI state included in a MAC-CE, the UE may determine an uplink transmission beam or transmission filter and a downlink reception beam or reception filter by using the indicated joint TCI state after 3 ms after physical uplink control channel (PUCCH) transmission including HARQ-acknowledgment (ACK) information meaning whether a PDSCH including the MAC-CE has been successfully received. If there are two or more joint TCI states included in a MAC-CE, the UE may identify that multiple joint TCI states indicated by the MAC-CE correspond to respective codepoints of a TCI state field of DCI format 1_1 or 1_2 after 3 ms after PUCCH transmission including HARQ-ACK information meaning whether a PDSCH including the MAC-CE has been successfully received, and activate the indicated joint TCI states. Thereafter, the UE may receive DCI format 1_1 or 1_2 to apply one joint TCI state indicated by a TCI state field in the DCI to uplink transmission and downlink reception beams. DCI format 1_1 or 1_2 may include downlink data channel scheduling information (with DL assignment) or not include same (without DL assignment).

In a case where a UE receives a transmission/reception beam-related indication through higher layer signaling by using a separate TCI state scheme, the UE may receive a MAC-CE indicating a separate TCI state from a base station to perform a transmission/reception beam application operation, and the base station may schedule reception of a PDSCH including the MAC-CE to the UE through a PDCCH. If a MAC-CE includes one separate TCI state set, the UE may determine an uplink transmission beam or transmission filter and a downlink reception beam or reception filter by using separate TCI states included in the indicated separate TCI state set after 3 ms after PUCCH transmission including HARQ-ACK information meaning whether a corresponding PDSCH has been successfully received. A separate TCI state set may indicate a single or multiple separate TCI states which one codepoint of a TCI state field in DCI format 1_1 or 1_2 may have, and one separate TCI state set may include one DL TCI state, include one UL TCI state, or include one DL TCI state and one UL TCI state. If a MAC-CE includes two or more separate TCI state sets, the UE may identify that multiple separate TCI state sets indicated by the MAC-CE correspond to respective codepoints of a TCI state field of DCI format 1_1 or 1_2 after 3 ms after PUCCH transmission including HARQ-ACK information meaning whether a corresponding PDSCH has been successfully received, and may activate the indicated separate TCI state sets. Each codepoint of the TCI state field of DCI format 1_1 or 1_2 may indicate one DL TCI state, indicate one UL TCI state, or indicate one DL TCI state and one UL TCI state. The UE may receive DCI format 1_1 or 1_2 to apply a separate TCI state set indicated by a TCI state field in the DCI to uplink transmission and downlink reception beams. DCI format 1_1 or 1_2 may include downlink data channel scheduling information (with DL assignment) or not include same (without DL assignment).

Figure 5:
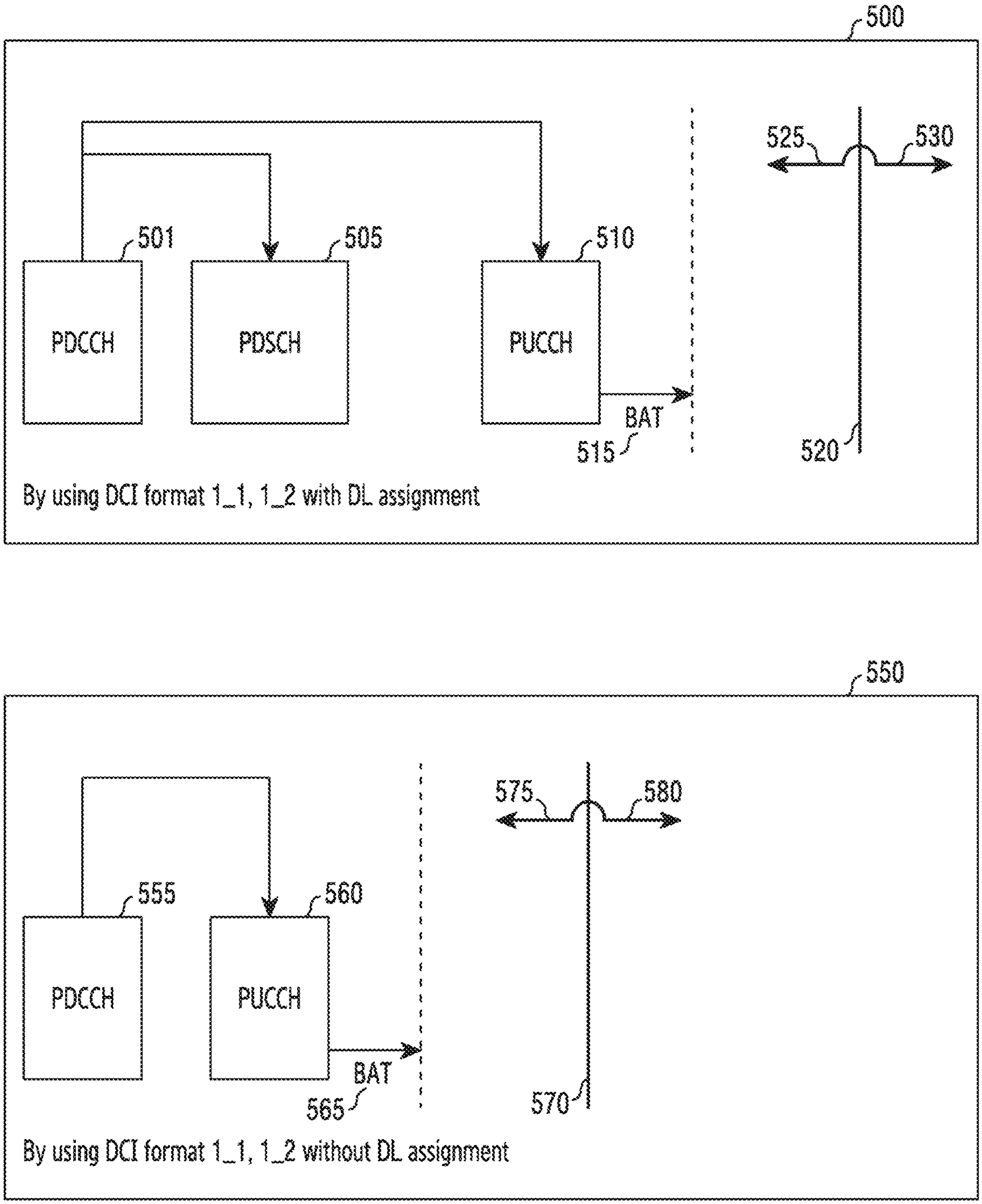
FIG. 5 is a diagram illustrating a beam application time which may be considered when a unified transmission configuration indicator (TCI) scheme is used in a wireless communication system according to an embodiment of the disclosure.

FIG. 5 is a diagram illustrating a beam application time which may be considered when a unified TCI scheme is used in a wireless communication system according to an embodiment of the disclosure. As described above, a UE may receive, from a base station, DCI format 1_1 or 1_2 including or not including downlink data channel scheduling information (with DL assignment or without DL assignment), and apply one joint TCI state or one separate TCI state set indicated by a TCI state field in the DCI to uplink transmission and downlink reception beams.

Referring to FIG. 5, with DCI format 1_1 or 1_2 with DL assignment (500): If a UE receives, from a base station, DCI format 1_1 or 1_2 including downlink data channel scheduling information (501) so that one joint TCI state or one separate TCI state set based on a unified TCI scheme is indicated, the UE may receive a PDSCH scheduled based on the received DCI (505), and transmit a PUCCH including a HARQ-ACK indicating whether reception of the DCI and the PDSCH is successful (510). The HARQ-ACK may include whether reception is successful, for both the DCI and the PDSCH, if the UE fails to receive at least one of the DCI and the PDSCH, the UE may transmit a NACK, and if the UE succeeds in receiving both of them, the UE may transmit an ACK.

- DCI format 1_1 or 1_2 without DL assignment (550): If a UE receives, from a base station, DCI format 1_1 or 1_2 not including downlink data channel scheduling information (555) so that one joint TCI state or one separate TCI state set based on a unified TCI scheme is indicated, the UE may assume at least one combination of the following items for the DCI.
- The DCI includes a cyclic redundancy check (CRC) scrambled using a configured scheduling (CS)-radio network temporary identifier (RNTI).
- The values of all bits assigned to all fields used as redundancy version fields are 1.
- The values of all bits assigned to all fields used as modulation and coding scheme (MCS) fields are 1.
- The values of all bits assigned to all fields used as new data indication (NDI) fields are 0.
- In a case of frequency domain resource allocation (FDRA) type 0, the values of all bits assigned to an FDRA field are 0, in a case of FDRA type 1, the values of all bits assigned to an FDRA field are 1, and in a case of an FDRA scheme being dynamicSwitch, the values of all bits assigned to an FDRA field are 0.
- The UE may transmit a PUCCH including a HARQ-ACK indicating whether DCI format 1_1 or 1_2 on which the items described above are assumed is successfully received (560).
- With respect to both DCI format 1_1 or 1_2 with DL assignment (500) and without DL assignment (550), if the new TCI state indicated through DCI 501 or 555 is the same as a TCI state that has previously been indicated and thus been being applied to uplink transmission and downlink reception beams, the UE may maintain the previously applied TCI state. If the new TCI state is different from the previously indicated TCI state, the UE may determine, as a time point for application of the joint TCI state or separate TCI state set, which is indicatable by a TCI state field included in the DCI, a time point 530 or 580 after the first slot 520 or 570 after passage of a time interval as long as a beam application time (BAT) 515 or 565 after PUCCH transmission, and may use the previously indicated TCI state at a time point 525 or 575 before the slot 520 or 570.
- With respect to both DCI format 1_1 or 1_2 with DL assignment (500) and without DL assignment (550), the BAT is a particular number of OFDM symbols and may be configured through higher layer signaling, based on UE capability report information, and numerologies of the BAT and the first slot after the BAT may be determined based on the smallest numerology among all cells to which a joint TCI state or separate TCI state set indicated through DCI is applied.

A UE may apply one joint TCI state indicated through a MAC-CE or DCI to reception for control resource sets connected to all UE-specific particular search spaces, reception of a PDSCH scheduled by a PDCCH transmitted from the control resource sets and transmission of a PUSCH, and transmission of all PUCCH resources.

If one separate TCI state set indicated through a MAC-CE or DCI includes one DL TCI state, a UE may apply the one separate TCI state set to reception for control resource sets connected to all UE-specific particular search spaces and to reception of a PDSCH scheduled by a PDCCH transmitted from the control resource sets, and apply a previously indicated UL TCI state to all PUSCH and PUCCH resources.

If one separate TCI state set indicated through a MAC-CE or DCI includes one UL TCI state, a UE may apply the one separate TCI state set to all PUSCH and PUCCH resources, and apply a previously indicated DL TCI state to reception for control resource sets connected to all UE-specific particular search spaces and reception of a PDSCH scheduled by a PDCCH transmitted from the control resource sets.

If one separate TCI state set indicated through a MAC-CE or DCI includes one DL TCI state and one UL TCI state, a UE may apply the DL TCI state to reception for control resource sets connected to all UE-specific particular search spaces and reception of a PDSCH scheduled by a PDCCH transmitted from the control resource sets, and apply the UL TCI state to all PUSCH and PUCCH resources.

[Unified TCI State MAC-CE]

Hereinafter, a single TCI state indication and activation method based on a unified TCI scheme is described. A PDSCH including a MAC-CE described below may be scheduled to a UE by a base station, and the UE may interpret each codepoint of a TCI state field in DCI format 1_1 or 1_2, based on information in the MAC-CE received from the base station, after 3 slots from transmission of a HARQ-ACK for the PDSCH to the base station. For example, the UE may activate each entry of the MAC-CE received from the base station in each codepoint of the TCI state field in DCI format 1_1 or 1_2.

Figure 6:
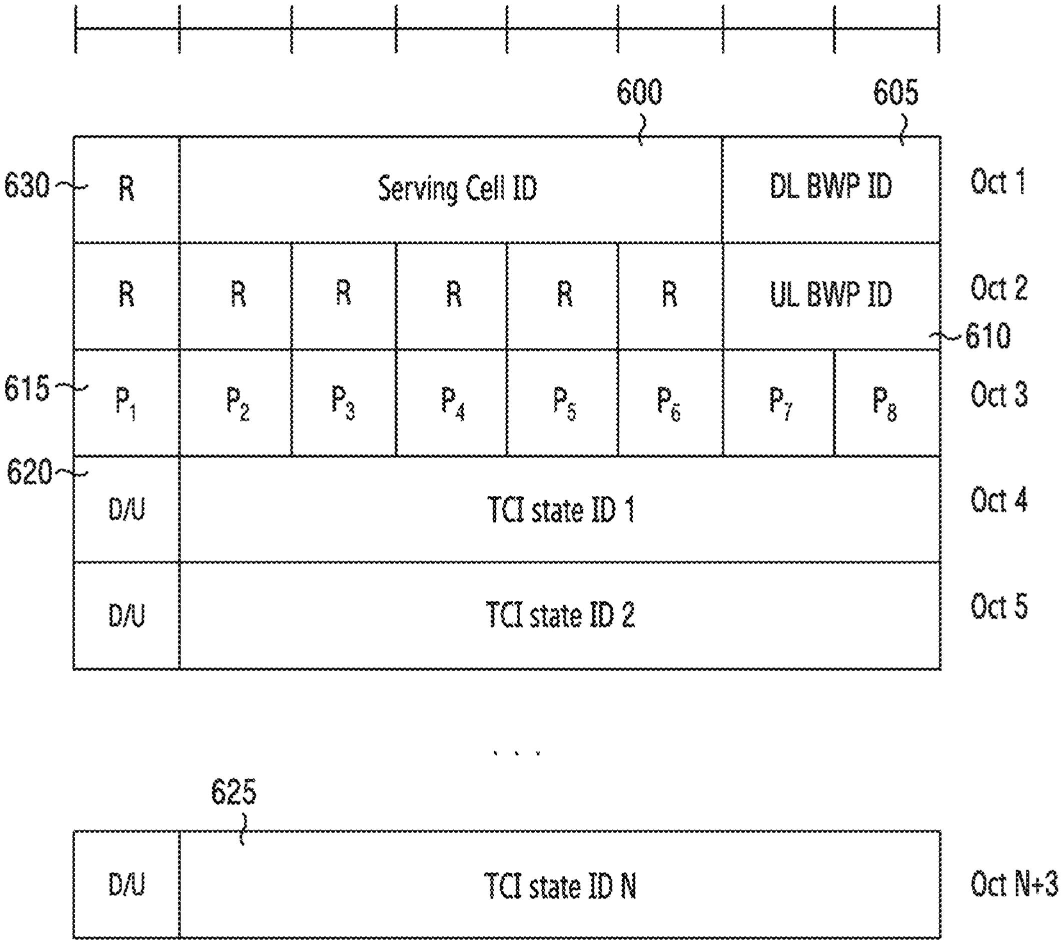
FIG. 6 is a diagram illustrating a medium access control (MAC)-control element (CE) structure for activation and indication of a joint TCI state or a separate downlink (DL) or uplink (UL) TCI state in a wireless communication system according to an embodiment of the disclosure.

FIG. 6 is a diagram illustrating MAC-CE structure for activation and indication of a joint TCI state or a separate DL or UL TCI state in a wireless communication system according to an embodiment of the disclosure. Each field in the MAC-CE structure may have the following meaning.

Referring to FIG. 6, serving cell ID (600): This field may indicate whether a corresponding MAC-CE is to be applied to which serving cell. The length of this field may be 5 bits. If a serving cell indicated by this field is included in at least one of the higher layer signaling simultaneousU-TCI-UpdateList1, simultaneousU-TCI-UpdateList2, simultaneousU-TCI-UpdateList3, or simultaneousU-TCI-UpdateList4, the MAC-CE may be applied to all serving cells included in one or more lists among simultaneousU-TCI-UpdateList1, simultaneousU-TCI-UpdateList2, simultaneousU-TCI-UpdateList3, or simultaneousU-TCI-UpdateList4, in which the serving cell indicated by the field is included.

DL BWP ID (605): This field may indicate whether the MAC-CE is to be applied to which DL BWP, and the meanings of codepoints in the field may correspond to codepoints of a bandwidth part indicator in DCI, respectively. The length of this field may be 2 bits.

UL BWP ID (610): This field may indicate whether the MAC-CE is to be applied to which UL BWP, and the meanings of codepoints in the field may correspond to codepoints of a bandwidth part indicator in DCI, respectively. The length of this field may be 2 bits.

Pi (615): This field may indicate whether each codepoint of a TCI state field in DCI format 1_1 or 1_2 has multiple TCI states or one TCI state. If a value of Pi is 1, this indicates that a corresponding i-th codepoint has multiple TCI states, and may imply that the codepoint may include a separate DL TCI state and a separate UL TCI state. If a value of Pi is 0, this indicates that a corresponding i-th codepoint has a single TCI state, and may imply that the codepoint may include one of a joint TCI state, a separate DCI TCI state, or a separate UL TCI state.

D/U (620): This field may indicate whether a TCI state ID field in the same octet is a joint TCI state, a separate DL TCI state, or a separate UL TCI state. If the field is 1, a TCI state ID field in the same octet may be a joint TCI state or a separate DL TCI state, and if the field is 0, a TCI state ID field in the same octet may be a separate UL TCI state.

TCI state ID (625): This field may indicate a TCI state identifiable by the higher layer signaling TCI-StateId. If the D/U field is configured to be 1, the TCI state ID field may be used to represent TCI-StateId expressible by 7 bits. If the D/U field is configured to be 0, a most significant bit (MSB) of the TCI state ID field may be considered as a reserved bit, and the remaining 6 bits may be used to represent the higher layer signaling UL-TCIState-Id. The number of maximally activatable TCI states may be 8 in a case of joint TCI states, and may be 16 in a case of separate DL or UL TCI states.

R (630): This indicates a reserved bit and may be configured to be 0.

With respect to the MAC-CE structure of FIG. 6, a UE may include, in the MAC-CE structure, a third octet including P1, P2, . . . , and P8 fields in FIG. 6 regardless of unifiedTCI-StateType-r17 in MIMOparam-r17 in the higher layer signaling ServingCellConfig being configured to be joint or separate. In this case, the UE may perform TCI state activation by using a fixed MAC-CE structure regardless of higher layer signaling configured by a base station. As another example, with respect to the MAC-CE structure of FIG. 6, a UE may omit the third octet including P1, P2, and P8 fields, as illustrated in FIG. 6, in a case where unifiedTCI-StateType-r17 in MIMOparam-r17 in the higher layer signaling ServingCellConfig being configured to be joint. In this case, the UE may save the payload of the MAC-CE structure by a maximum of 8 bits according to higher layer signaling configured by a base station. In addition, all D/U fields positioned on the first bits in octets starting from a fourth octet in FIG. 6 may be considered as R fields, and all the R fields may be configured to be 0 bits.

[CSI Resource Configuration]

According to an embodiment of the disclosure, in NR, there may be a CSI framework for indicating, by a base station, measurement and reporting of channel state information (CSI) to a UE. For example, a CSI framework of NR may be configured by two elements including a resource setting and a report setting at least. For example, a report setting may refer to IDs of one or more resource settings to have a connection relation with the resource settings.

According to an embodiment of the disclosure, a resource setting may include information related to a reference signal (RS) for measuring channel state information by a UE. For example, a base station may configure at least one resource settings for a UE. For example, a base station and a UE may transmit and receive, to and from each other, at least some of signaling information included in Table 4 to transfer information on a resource setting.

TABLE 4

```
-- ASN1START
-- TAG-CSI-RESOURCECONFIG-START
CSI-ResourceConfig ::=                SEQUENCE {
   csi-ResourceConfigId                 CSI-ResourceConfigId,
   csi-RS-ResourceSetList                 CHOICE {
      nzp-CSI-RS-SSB                     SEQUENCE {
         nzp-CSI-RS-ResourceSetList SEQUENCE (SIZE (1..maxNrofNZP-CSI-RS-
ResourceSetsPerConfig)) OF NZP-CSI-RS-ResourceSetId
                                                   OPTIONAL,
-- Need R
         csi-SSB-ResourceSetList               SEQUENCE (SIZE (1..maxNrofCSI-SSB-
ResourceSetsPerConfig)) OF CSI-SSB-ResourceSetId
                                                   OPTIONAL
-- Need R
      },
      csi-IM-ResourceSetList               SEQUENCE (SIZE (1..maxNrofCSI-IM-
ResourceSetsPerConfig)) OF CSI-IM-ResourceSetId
   },
   bwp-Id                          BWP-Id,
   resourceType                       ENUMERATED { aperiodic, semiPersistent, periodic },
   ...
}
-- TAG-CSI-RESOURCECONFIG-STOP
-- ASN1STOP
```

According to an embodiment of the disclosure, the signaling information CSI-ResourceConfig in Table 4 may include information on each resource setting. Based on the signaling information in Table 4, each resource setting may include a resource setting index (csi-ResourceConfigId), a BWP index (bwp-ID), time axis transmission configuration of resources (resourceType), or a resource set list (csi-RS-ResourceSetList) including at least one resource set.

According to an embodiment of the disclosure, a time axis transmission configuration of resources may be configured to be aperiodic transmission, semi-persistent transmission, or periodic transmission.

According to an embodiment of the disclosure, a resource set list may be a set including resource sets for channel measurement, or a set including resource sets for interference measurement. For example, if a resource set list is a set including resource sets for channel measurement, each resource set may include at least one resource. The at least one resource may correspond to an index of a CSI reference signal (CSI-RS) resource or a synchronization/broadcast channel block (SS/PBCH block, synchronization signal block (SSB)). For example, if a resource set list is a set including resource sets for interference measurement, each resource set may include at least one interference measurement resource (CSI interference measurement, CSI-IM).

According to an embodiment of the disclosure, if a resource set includes a CSI-RS, a base station and a UE may transmit and receive, to and from each other, at least some of signaling information included in Table 5 to transfer information on the resource set.

TABLE 5

```
-- ASN1START
-- TAG-NZP-CSI-RS-RESOURCESET-START
NZP-CSI-RS-ResourceSet ::=            SEQUENCE {
      nzp-CSI-ResourceSetId            NZP-CSI-RS-ResourceSetId,
      nzp-CSI-RS-Resources             SEQUENCE (SIZE (1..maxNrofNZP-CSI-RS-R
esourcesPerSet)) OF NZP-CSI-RS-ResourceId,
      repetition                    ENUMERATED { on, off }
       OPTIONAL,   -- Need S
      aperiodicTriggeringOffset          INTEGER(0..6)
         OPTIONAL,   -- Need S
      trs-Info                     ENUMERATED {true}
   OPTIONAL,   -- Need R
      ...
}
-- TAG-NZP-CSI-RS-RESOURCESET-STOP
-- ASN1STOP
```

According to an embodiment of the disclosure, the signaling information non-zero power (NZP)-CSI-RS-ResourceSet in Table 5 may include information on each resource set. Based on the signaling information in Table 5, each resource set may include at least information on a resource set index (nzp-CSI-ResourceSetId) or a set (nzp-CSI-RS-Resources) of CSI-RS indexes included in the resource set. Further, each resource set may include some of information (repetition) on a spatial domain transmission filter of CSI-RS resources included in the resource set, and/or information (trs-Info) relating to whether CSI-RS resources included in the resource set have a tracking purpose.

According to an embodiment of the disclosure, a CSI-RS may be the most representative reference signal included in a resource set. A base station and a UE may transmit and receive, to and from each other, at least some of signaling information included in Table 6 to transfer information on a CSI-RS resource.

TABLE 6

```
-- ASN1START
-- TAG-NZP-CSI-RS-RESOURCE-START
NZP-CSI-RS-Resource ::=            SEQUENCE {
    nzp-CSI-RS-ResourceId              NZP-CSI-RS-ResourceId,
    resourceMapping              CSI-RS-ResourceMapping,
    powerControlOffset              INTEGER (−8..15),
    powerControlOffsetSS              ENUMERATED{db−3, db0, db3, db6}
  OPTIONAL,   -- Need R
    scramblingID              ScramblingId,
    periodicityAndOffset              CSI-ResourcePeriodicityAndOffset          OPT
IONAL,   -- Cond PeriodicOrSemiPersistent
    qcl-InfoPeriodicCSI-RS              TCI-StateId              OPTIONAL,
  -- Cond Periodic
    ...
}
-- TAG-NZP-CSI-RS-RESOURCE-STOP
-- ASN1STOP
```

According to an embodiment of the disclosure, the signaling information NZP-CSI-RS-Resource in Table 6 may include information on each CSI-RS. The information included in the signaling information NZP-CSI-RS-Resource in Table 6 may have the meaning as below or include the information as below.

nzp-CSI-RS-ResourceId: The index of a CSI-RS resource resourceMapping: Resource mapping information of a CSI-RS resource powerControlOffset: The ratio between PDSCH EPRE (Energy Per RE) and CSI-RS EPRE powerControlOffsetSS: The ratio between SS/PBCH block EPRE and CSI-RS EPRE scramblingID: The scrambling index of a CSI-RS sequence periodicity AndOffset: The transmission period and the slot offset of a CSI-RS resource qcl-InfoPeriodicCSI-RS: TCI-state information when a CSI-RS is a periodic CSI-RS.

According to an embodiment of the disclosure, resourceMapping included in the signaling information NZP-CSI-RS-Resource may indicate resource mapping information of a CSI-RS resource, and the signaling information NZP-CSI-RS-Resource may include resource element (RE) mapping for frequency resources, the number of ports, symbol mapping, CDM type, frequency resource density, and/or frequency band mapping information. Each of the number of ports, frequency resource density, CDM type, and/or time-frequency axis RE mapping, which may be configured through the signaling information NZP-CSI-RS-Resource, may have a predetermined value in one of the rows shown in Table 7.

TABLE 7

| Row | Ports X | Density ρ | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1), (k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0), (k_0, l_0 + 1), (k_1, l_0 + 1), (k_2, l_0 + 1), (k_3, l_0 + 1), (k_0, l_1), (k_1, l_1), (k_2, l_1), (k_3, l_1), (k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |

TABLE 7-continued

| Row | Ports X | Density ρ | cdm-Type | $(\bar{k}, \bar{l})$ | CDM group index j | k' | l' |
|---|---|---|---|---|---|---|---|
| 17 | 32 | 1, 0.5 | CDM4 (FD2, TD2) | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0)$, $(k_1, l_0)$, $(k_2, l_0)$, $(k_3, l_0)$ | 0, 1, 2, 3 | 0, 1 | 0, 1, 2, 3 |

According to an embodiment of the disclosure, Table 7 may indicate a frequency resource density configurable according to the number (X) of CSI-RS ports, a CDM type, frequency and time axis starting positions (k, l) of a CSI-RS component RE pattern, and the number (k') of frequency axis REs and/or the number (l') of time axis REs of a CSI-RS component RE pattern. A CSI-RS component RE pattern described above may be a basic unit for configuring a CSI-RS resource. A CSI-RS component RE pattern may be configured by YZ number of REs through Y=1+max(k') number of REs at the frequency axis and Z=1+max (l') number of REs at the time axis.

For example, if the number of CSI-RS ports is 1, the position of a CSI-RS RE may be designated in a physical resource block (PRB) without restriction on subcarriers, and may be designated by a bitmap having 12 bits.

For example, if the number of CSI-RS ports is {2, 4, 8, 12, 16, 24, 32}, and Y is equal to 2, the position of a CSI-RS RE may be designated at every two subcarriers in a PRB, and may be designated by a bitmap having 6 bits. For example, if the number of CSI-RS ports is 4, and Y is equal to 4, the position of a CSI-RS RE may be designated at every four subcarriers in a PRB, and may be designated by a bitmap having 3 bits. Similarly, the position of a time axis RE may be designated by a bitmap having a total of 14 bits.

[CSI Resource Configuration]

According to an embodiment of the disclosure, a report setting may refer to IDs of one or more resource settings to have a connection relation with the resource settings, and the resource setting(s) having a connection with the report setting may provide configuration information including information on a reference signal for channel information measurement. For example, in a case where a resource setting(s) having a connection relation (or mapping relation) with a report setting is used for channel information measurement, measured channel information may be used for channel information reporting following a reporting method configured in the report setting having the connection relation.

According to an embodiment of the disclosure, a report setting may include configuration information related to a CSI reporting method. For example, a base station and a UE may transmit and receive, to and from each other, at least some of signaling information included in Table 8 to transfer information on a report setting.

TABLE 8

```
-- ASN1START
-- TAG-CSI-REPORTCONFIG-START
CSI-ReportConfig ::=                          SEQUENCE {
   reportConfigId                                 CSI-ReportConfigId,
   carrier                                    ServCellIndex                  OPTIONAL,   -- Need S
   resourcesForChannelMeasurement                          CSI-ResourceConfigId,
   csi-IM-ResourcesForInterference                       CSI-ResourceConfigId          OPTIONAL
,  -- Need R
   nzp-CSI-RS-ResourcesForInterference                       CSI-ResourceConfigId          OPTION
AL,   -- Need R
   reportConfigType                              CHOICE {
      periodic                                SEQUENCE {
         reportSlotConfig                            CSI-ReportPeriodicityAndOffset,
         pucch-CSI-ResourceList                          SEQUENCE (SIZE (1..maxNrofBWPs))
  OF PUCCH-CSI-Resource
      },
      semiPersistentOnPUCCH                             SEQUENCE {
         reportSlotConfig                         CSI-ReportPeriodicityAndOffset,
         pucch-CSI-ResourceList                          SEQUENCE (SIZE (1..maxNrofBWPs))
  OF PUCCH-CSI-Resource
      },
      semiPersistentOnPUSCH                             SEQUENCE {
         reportSlotConfig                         ENUMERATED {sl5, sl10, sl20, sl40, sl80,
sl160, sl320},
         reportSlotOffsetList                   SEQUENCE (SIZE (1.. maxNrofUL-Allocatio
ns)) OF INTEGER(0..32),
         p0alpha                             P0-PUSCH-AlphaSetId
      },
      aperiodic                               SEQUENCE {
         reportSlotOffsetList                   SEQUENCE (SIZE (1..maxNrofUL-Allocatio
ns)) OF INTEGER(0..32)
      }
   },
   reportQuantity                              CHOICE {
      none                                   NULL,
      cri-RI-PMI-CQI                               NULL,
      cri-RI-i1                               NULL,
```

TABLE 8-continued

```
      cri-RI-i1-CQI                                    SEQUENCE {
         pdsch-BundleSizeForCSI                                ENUMERATED {n2, n4}
               OPTIONAL   -- Need S
      },
      cri-RI-CQI                                      NULL,
      cri-RSRP                                        NULL,
      ssb-Index-RSRP                                     NULL,
      cri-RI-LI-PMI-CQI                                    NULL
   },
   reportFreqConfiguration                               SEQUENCE {
      cqi-FormatIndicator                                ENUMERATED { widebandCQI, subbandCQ
I }                                  OPTIONAL,   -- Need R
      pmi-FormatIndicator                                 ENUMERATED { widebandPMI, subbandP
MI }                                   OPTIONAL,   -- Need R
      csi-ReportingBand                                  CHOICE {
         subbands3                                      BIT STRING(SIZE(3)),
         subbands4                                      BIT STRING(SIZE(4)),
         subbands5                                      BIT STRING(SIZE(5)),
         subbands6                                      BIT STRING(SIZE(6)),
         subbands7                                      BIT STRING(SIZE(7)),
         subbands8                                      BIT STRING(SIZE(8)),
         subbands9                                      BIT STRING(SIZE(9)),
         subbands10                                      BIT STRING(SIZE(10)),
         subbands11                                      BIT STRING(SIZE(11)),
         subbands12                                      BIT STRING(SIZE(12)),
         subbands13                                      BIT STRING(SIZE(13)),
         subbands14                                      BIT STRING(SIZE(14)),
         subbands15                                      BIT STRING(SIZE(15)),
         subbands16                                      BIT STRING(SIZE(16)),
         subbands17                                      BIT STRING(SIZE(17)),
         subbands18                                      BIT STRING(SIZE(18)),
         ...,
         subbands19-v1530                                  BIT STRING(SIZE(19))
      }   OPTIONAL   -- Need S
   }                                                                         OPTIONAL,
 -- Need R
   timeRestrictionForChannelMeasurements         ENUMERATED {configured, no
tConfigured},
   timeRestrictionForInterferenceMeasurements      ENUMERATED {configured, n
otConfigured},
   codebookConfig                                        CodebookConfig
 OPTIONAL,   -- Need R
   dummy                                               ENUMERATED {n1, n2}
    OPTIONAL,   -- Need R
   groupBasedBeamReporting                                   CHOICE {
      enabled                                        NULL,
      disabled                                       SEQUENCE {
         nrofReportedRS                                    ENUMERATED {n1, n2, n3, n4}
            OPTIONAL   -- Need S
      }
   },
   cqi-Table                                  ENUMERATED {table1, table2, table3, spare1}
            OPTIONAL,   -- Need R
   subbandSize                                  ENUMERATED {value1, value2},
   non-PMI-PortIndication                            SEQUENCE (SIZE (1..maxNrofNZP-CSI-RS-Resour
cesPerConfig)) OF PortIndexFor8Ranks OPTIONAL,   -- Need R
   ...,
   [[
   semiPersistentOnPUSCH-v1530                           SEQUENCE {
      reportSlotConfig-v1530                             ENUMERATED {sl4, sl8, sl16}
   }                                                                           OPTIONAL
-- Need R
   ]]
}
```

According to an embodiment of the disclosure, the signaling information CSI-ResourceConfig included in Table 8 may include information on each report setting. The information included in the signaling information CSI-ReportConfig may have the following meanings and include the information as below.

reportConfigId: The index of a report setting carrier: The index of a serving cell resourcesForChannelMeasurement: The index of a resource setting for a channel measurement having a connection relation (or mapping relation) with a report setting csi-IM-ResourcesForInterference: The index of a resource setting having a CSI-IM resource for interference measurement having a connection relation with a report setting nzp-CSI-RS-ResourcesForInterference: The index of a resource setting having a CSI-RS resource for interference measurement having a connection relation with a report setting reportConfigType: This indicates a time axis transmission configuration and a transmission channel of channel reporting, and may have an aperiodic transmission, semi-persistent physical uplink control channel (PUCCH) transmission, semi-persistent PUSCH transmission, or periodic transmission configuration.

reportQuantity: This represents the type of reported channel information and may have the types of channel information when a channel report is not transmitted ("none") and when a channel report is transmitted ("cri-RI-PMI-CQI", "cri-RI-i1", "cri-RI-i1-CQI", "cri-RI-CQI", "cri-RSRP", "ssb-Index-RSRP", and "cri-RI-LI-PMI-CQI"). Elements included in the types of channel information indicate a channel quality indicator (CQI), a precoding matrix indicator (PMI), a CSI-RS resource indicator (CRI), an SS/PBCH block resource indicator (SSBRI), a layer indicator (LI), a rank indicator (RI), and/or a reference signal received power (L1-RSRP).

reportFreqConfiguration: This indicates that reported channel information includes only information on the entire band (wideband) or information on each subband, and if the reported channel information includes information on each subband, this may have configuration information on the subband including channel information.

timeRestrictionForChannelMeasurements: Whether there is a restriction on the time axis for a reference signal for channel measurement among reference signals referred to by reported channel information timeRestrictionForInterferenceMeasurements: Whether there is a restriction on the time axis for a reference signal for interference measurement among reference signals referred to by reported channel information codebookConfig: Information on a codebook referred to by reported channel information groupBasedBeamReporting: Whether beam grouping is applied for channel reporting cqi-Table: The index of a CQI table referred to by reported channel information subbandSize: An index indicating a subband size of channel information non-PMI-PortIndication: Port mapping information referred to when non-PMI channel information is reported According to an embodiment of the disclosure, in a case where a base station indicates channel information reporting through higher layer signaling or L1 signaling, a UE may perform channel information reporting, based on configuration information included in an indicated report setting.

According to an embodiment of the disclosure, a base station may indicate, to a UE, channel state information (CSI) reporting through higher layer signaling including radio resource control (RRC) signaling or medium access control (MAC)-control element (CE) signaling or L1 signaling (e.g., common DCI, group-common DCI, or UE-specific DCI).

For example, a base station may indicate aperiodic channel information reporting (CSI report) to a UE through higher layer signaling or DCI using DCI format 0_1. The base station may configure, through higher layer signaling, a parameter for an aperiodic CSI report of a UE or multiple CSI report trigger states including a parameter for a CSI report. For example, a parameter for a CSI report or a CSI report trigger state may include a slot interval between a PDCCH including DCI and a PUSCH including the CSI report or a set including possible slot intervals, a reference signal ID for channel state measurement, and/or the type of channel information.

In an example, when a base station indicates some of multiple CSI report trigger states to a UE through DCI, the UE reports channel information according to a CSI report configuration of a report setting configured in the indicated CSI report trigger states. For example, channel information reporting of the UE may be performed through a PUSCH scheduled by DCI format 0_1. For example, time axis resource allocation of a PUSCH including a CSI report of the UE may be performed based on a slot interval from a PDCCH indicated through DCI, and an indication of a starting symbol and/or a symbol length in a slot for time axis resource allocation of the PUSCH. For example, the position of a slot on which a PUSCH including a CSI report of a UE is transmitted may be indicated through a slot interval from a PDCCH indicated through DCI, and a starting symbol and a symbol length in the slot may be indicated through a time domain resource assignment field of the DCI.

For example, a base station may indicate a semi-persistent (SP) CSI report transmitted through a PUSCH to a UE, through DCI using DCI format 0_1. The base station may activate or deactivate a semi-persistent CSI report transmitted through a PUSCH, through DCI scrambled by an SP-CSI-RNTI. If a semi-persistent CSI report is activated, a UE may periodically report channel information according to a configured slot interval. If the semi-persistent CSI report is deactivated, the UE may stop periodic channel information reporting having been activated. A base station may configure, through higher layer signaling, a parameter for a semi-persistent CSI report of the UE or multiple CSI report trigger states including a parameter for a semi-persistent CSI report.

According to an embodiment of the disclosure, a parameter for a CSI report or a CSI report trigger state may include a slot interval between a PDCCH including DCI indicating the CSI report and a PUSCH including the CSI report or a set including possible slot intervals, a slot interval between a slot on which higher layer signaling indicating the CSI report is activated and the PUSCH including the CSI report, a slot interval period of the CSI report, and/or the type of channel information included therein. If a base station activates some of multiple CSI report trigger states or some of multiple report settings for a UE through higher layer signaling or DCI, the UE may report channel information according to a CSI report configuration configured in a report setting included in the indicated CSI report trigger states or the activated report settings. Channel information reporting may be performed through a PUSCH semi-persistently scheduled by DCI format 0_1 scrambled by an SP-CSI-RNTI. Time axis resource allocation of a PUSCH including a CSI report of the UE may be performed through a slot interval period of the CSI report, a slot interval from a slot on which higher layer signaling is activated, or a slot interval from a PDCCH indicated through DCI and/or an indication of a starting symbol and a symbol length in a slot for time axis resource allocation of the PUSCH. For example, the position of a slot on which a PUSCH including a CSI report of the UE is transmitted may be indicated through a slot interval from a PDCCH indicated through DCI, and a starting symbol and symbol length in the slot may be indicated through a time domain resource assignment field of DCI format 0_1 described above.

For example, a base station may indicate a semi-persistent CSI report transmitted through a PUCCH to a UE, through higher layer signaling, such as a MAC-CE. The base station may activate or deactivate a semi-persistent CSI report transmitted through a PUCCH, through MAC-CE signaling.

In an example, if a semi-persistent CSI report is activated, a UE may periodically report channel information according to a configured slot interval. If the semi-persistent CSI report is deactivated, the UE may stop periodic channel information reporting having been activated. A base station may configure a parameter for a semi-persistent CSI report of the UE through higher layer signaling. The parameter for a CSI report may include a PUCCH resource on which the CSI report is transmitted, a slot interval period of the CSI report, and/or the type of channel information. The UE may transmit the CSI report through a PUCCH. Alternatively, in a case where a PUCCH for a CSI report overlaps with a PUSCH, the UE may transmit the CSI report through the PUSCH.

For example, the position of a PUCCH transmission slot including a CSI report may be indicated through a slot interval period of the CSI report configured through higher layer signaling, and/or a slot interval between a slot on which higher layer signaling is activated and the PUCCH including the CSI report. A starting symbol and a symbol length in the slot may be indicated through a starting symbol and a symbol length for which a PUCCH resource configured through higher layer signaling is allocated.

For example, a base station may indicate a periodic CSI report to a UE through higher layer signaling. The base station may activate or deactivate a periodic CSI report through higher layer signaling including RRC signaling. If a periodic CSI report is activated, a UE may periodically report channel information according to a configured slot interval. If the periodic CSI report is deactivated, the UE may stop periodic channel information reporting having been activated. The base station may configure a report setting including a parameter for a periodic CSI report of the UE through higher layer signaling.

For example, a parameter for a CSI report may include a PUCCH resource configuration for the CSI report, a slot interval between a slot on which higher layer signaling indicating the CSI report is activated and a PUCCH including the CSI report, a slot interval period of the CSI report, a reference signal ID for channel state measurement, and/or the type of channel information.

According to an embodiment of the disclosure, a UE may transmit the CSI report through a PUCCH. Alternatively, in a case where a PUCCH for a CSI report overlaps with a PUSCH, the UE may transmit the CSI report through the PUSCH. For example, the position of a slot on which a PUCCH including a CSI report is transmitted may be indicated through a slot interval period of the CSI report configured through higher layer signaling, and/or a slot interval between a slot on which higher layer signaling is activated and the PUCCH including the CSI report. A starting symbol and a symbol length in the slot may be indicated through a starting symbol and a symbol length for which a PUCCH resource configured through higher layer signaling is allocated.

According to an embodiment of the disclosure, with respect to a CSI report setting (CSI-ReportConfig), each report setting CSI-ReportConfig may be associated with one downlink (DL) bandwidth part identified by a higher layer parameter bandwidth part identifier (bwp-id) given by CSI-ResourceConfig, and/or a CSI resource setting associated with the report setting.

According to an embodiment of the disclosure, as a time domain reporting operation for each report setting CSI-ReportConfig, an "aperiodic", "semi-persistent", or "periodic" scheme may be supported, and a reporting scheme (e.g., aperiodic, semi-persistent, or periodic) may be configured for a UE by a base station through a reportConfigType parameter configured from a higher layer.

For example, a semi-persistent CSI reporting method may support or include "PUCCH-based semi-persistent (semi-PersistentOnPUCCH)", and "PUSCH-based semi-persistent (semi-PersistentOnPUSCH)". For example, in a periodic or semi-persistent CSI reporting method, PUCCH or PUSCH resources on which CSI is to be transmitted may be configured for a UE by a base station through higher layer signaling. The period and slot offset of PUCCH or PUSCH resources on which CSI is to be transmitted may be given by the numerology of an uplink (UL) bandwidth part configured to transmit a CSI report. For example, in an aperiodic CSI reporting method, PUSCH resources on which CSI is to be transmitted may be scheduled for the UE by the base station through L1 signaling (DCI format 0_1 described above).

According to an embodiment of the disclosure, with respect to a CSI resource setting (CSI-ResourceConfig), each CSI resource setting CSI-ReportConfig may include S (≥1) number of CSI resource sets (given by the higher layer parameter csi-RS-ResourceSetList). For example, a CSI resource set list may include a non-zero power (NZP) CSI-RS resource set and a SS/PBCH block set, or may include a CSI-interference measurement (CSI-IM) resource set.

According to an embodiment of the disclosure, each CSI resource setting may be positioned in a downlink (DL) bandwidth part identified by the higher layer parameter bwp-id, and may be connected to (or mapped to or correspond to) a CSI report setting of the same downlink bandwidth part.

According to an embodiment of the disclosure, a time domain operation of a CSI-RS resource in a CSI resource setting may be configured to be one of "aperiodic", "periodic", or "semi-persistent" by the higher layer parameter resourceType. With respect to a periodic or semi-persistent CSI resource setting, the number of CSI-RS resource sets may be limited to S=1, and a configured period and slot offset may be given by the numerology of a downlink bandwidth part identified by a bwp-id. One or more CSI resource settings for channel or interference measurement may be configured for a UE by a base station through higher layer signaling. For example, a CSI resource setting configured for the UE may include at least one of the following CSI resources.

CSI-IM resource for interference measurement

NZP CSI-RS resource for interference measurement

NZP CSI-RS resource for channel measurement

According to an embodiment of the disclosure, with respect to CSI-RS resource sets associated with a resource setting having the higher layer parameter resourceType, configured to be "aperiodic", "periodic", or "semi-persistent", the trigger state of a CSI report setting having reportType configured to be "aperiodic", and a resource setting for channel or interference measurement on one or multiple component cells (CCs) may be configured by the higher layer parameter CSI-AperiodicTriggerStateList.

According to an embodiment of the disclosure, a UE may use a PUSCH to perform aperiodic CSI reporting, may use a PUCCH to perform periodic CSI reporting, may use a PUSCH to perform semi-persistent CSI reporting when the reporting is triggered or activated by DCI, and may use a PUCCH to perform semi-persistent CSI reporting after the reporting is activated by a MAC control element (MAC CE). As described above, a CSI resource setting may be also configured to be aperiodic, periodic, and semi-persistent. A combination of a CSI report setting and a CSI resource configuration may be supported based on Table 9 below.

TABLE 9

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

According to an embodiment of the disclosure, aperiodic CSI reporting may be triggered by a "CSI request" field in DCI format 0_1 described above corresponding to scheduling DCI for a PUSCH. A UE may monitor a PDCCH, obtain DCI format 0_1, and obtain scheduling information for a PUSCH and a CSI request indicator. A CSI request indicator may be configured to have NTS(=0, 1, 2, 3, 4, 5, or 6) number of bits, and may be determined by higher layer signaling (reportTriggerSize). One trigger state among one or multiple aperiodic CSI report trigger states which may be configured by higher layer signaling (CSI-AperiodicTriggerStateList) may be triggered by a CSI request indicator.

If all bits in a CSI request field are 0, this may imply that CSI reporting is not requested.

If the number (M) of CSI trigger states in configured CSI-AperiodicTriggerStateList is greater than 2NTs-1, M number of CSI trigger states may be mapped to 2NTs-1 trigger states according to a pre-defined mapping relation, and one trigger state among the 2NTs-1 trigger states may be indicated by a CSI request field.

If the number (M) of CSI trigger states in configured CSI-AperiodicTriggerStateList is smaller than or equal to 2NTs-1, one of M number of CSI trigger states may be indicated by a CSI request field.

According to an embodiment of the disclosure, Table 10 shows an example of a relation between a CSI request indicator and a CSI trigger state indicatable by the indicator.

TABLE 10

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1<br>CSI report#2 | CSI resource#1,<br>CSI resource#2 |
| 10 | CSI trigger state#2 | CSI report#3 | CSI resource#3 |
| 11 | CSI trigger state#3 | CSI report#4 | CSI resource#4 |

According to an embodiment of the disclosure, a UE may measure a CSI resource in a CSI trigger state triggered by a CSI request field, and then generate CSI (e.g., the CSI includes at least one of a CQI, a PMI, a CRI, an SSBRI, an LI, an RI, or an L1-RSRP) from the measurement.

According to an embodiment of the disclosure, the UE may transmit the obtained CSI by using a PUSCH scheduled by a corresponding DCI format 0_1. If one bit corresponding to an uplink data indicator (UL-SCH indicator) in DCI format 0_1 indicates "1", the UE may multiplex the obtained CSI and uplink data (UL-SCH) on a PUSCH resource scheduled by DCI format 0_1, to transmit same. If one bit corresponding to an uplink data indicator (UL-SCH indicator) in DCI format 0_1 indicates "0", the UE may map only the CSI to a PUSCH resource scheduled by DCI format 0_1 without uplink data (UL-SCH), to transmit same.

Figure 7:
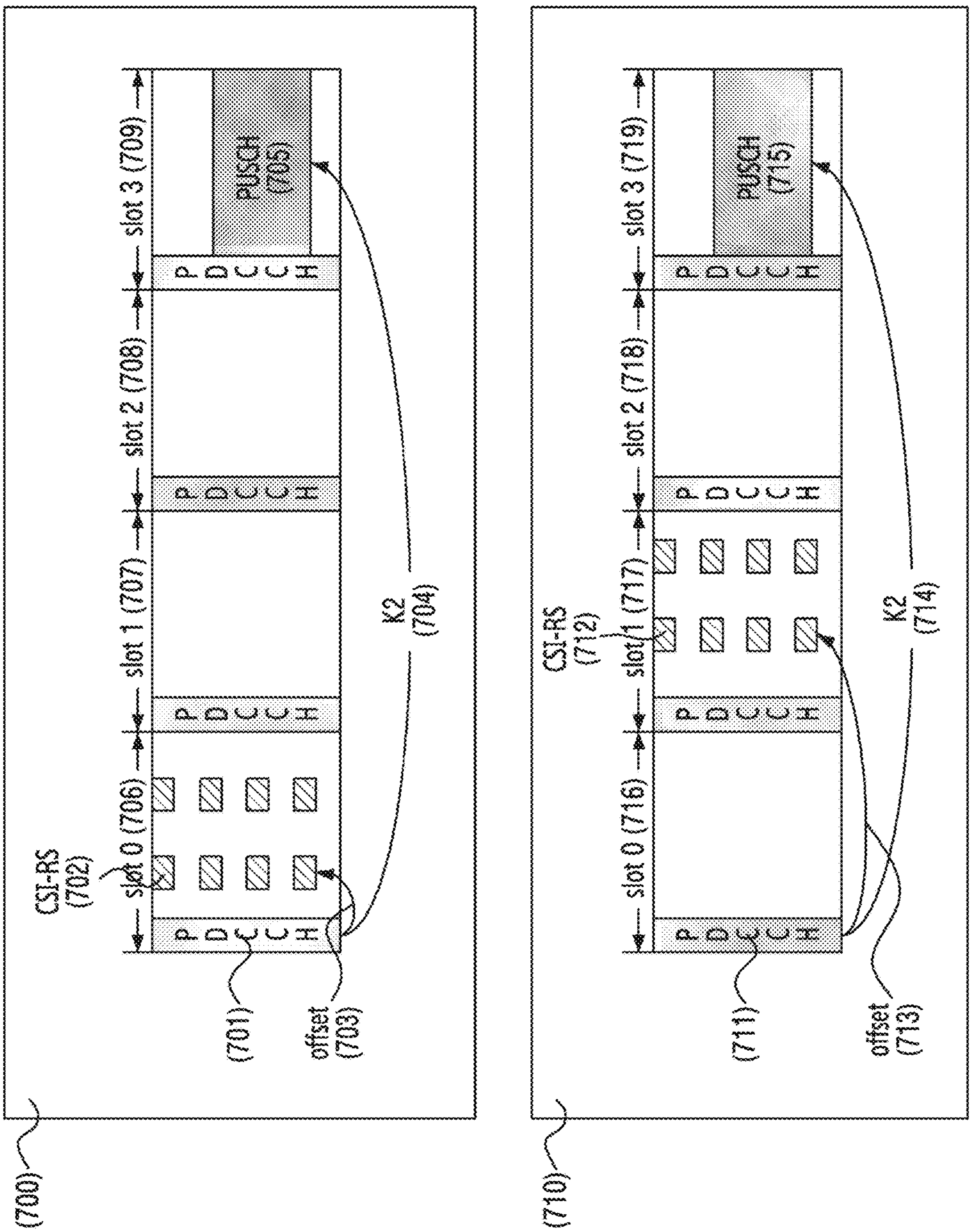
FIG. 7 is a diagram illustrating an aperiodic CSI reporting method according to an embodiment of the disclosure.

FIG. 7 is a diagram illustrating an aperiodic CSI reporting method according to an embodiment of the disclosure.

Referring to FIG. 7, in an example 700 of FIG. 7, a UE may monitor a PDCCH 701 to obtain DCI format 0_1, and obtain scheduling information for a PUSCH 705 and CSI request information, based on the obtained DCI.

According to an embodiment of the disclosure, the UE may obtain resource information for a CSI-RS 702 to be measured, from a received CSI request indicator. The UE may determine a time point at which the resource of the CSI-RS 702 required to be measured is transmitted, based on a time point at which DCI format 0_1 is received, and an offset-related parameter (e.g., aperiodicTriggeringOffset) in a CSI resource set configuration (e.g., NZP CSI-RS resource set configuration (NZP-CSI-RS-ResourceSet)). For example, the UE may determine a CSI-RS resource measurement time point, based on the time point at which DCI format 0_1 is received, and the CSI resource set configuration.

For example, the offset value X of the parameter aperiodicTriggeringOffset in an NZP-CSI-RS resource set configuration may be configured for the UE by a base station through higher layer signaling. For example, the configured offset value X may indicate an offset (703 and 713) between a slot having received DCI triggering an aperiodic CSI report and a slot transmitting the CSI-RS resource. For example, the value of the aperiodicTriggeringOffset parameter and the offset value X may have a mapping relation described in Table 11 below.

TABLE 11

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

According to an embodiment of the disclosure, the example 700 of FIG. 7 shows an example in which the offset value described above is configured to be X=0. In this case, the UE may receive the CSI-RS 702 in a slot (e.g., slot 0 706 and 716 in FIG. 7) having received DCI format 0_1 triggering an aperiodic CSI report, and may report CSI information measured using the received CSI-RS to the base station through the PUSCH 705.

According to an embodiment of the disclosure, the UE may obtain, from DCI format 0_1, scheduling information (e.g., pieces of information corresponding to respective fields of DCI format 0_1) for the PUSCH 705 for CSI reporting. For example, the UE may obtain information on a slot on which the PUSCH 705 is to be transmitted, from time domain resource allocation information for the PUSCH 705 described above in the DCI format 0_1. For example, in the example 700 of FIG. 7, the UE may obtain 3 as a K2 value (704 and 714) corresponding to a slot offset value for PDCCH-to-PUSCH, and the PUSCH 705 may be transmitted on slot 3 709 (or 719) positioned 3 slots apart from slot 0 706 (adjacent to slot 1 707 or 717 and slot 2 708 or 718) corresponding to the time point at which the PDCCH 701 is received.

In an example 710 of FIG. 7, the UE may monitor a PDCCH 711 to obtain DCI format 0_1, and obtain scheduling information for a PUSCH 715 and CSI request information from the obtained DCI (or DCI format 0_1). The UE may obtain resource information for a CSI-RS 712 to be measured, from a received CSI request indicator. In the example 710 in FIG. 7, an offset value for the CSI-RS as described above is configured to be X=1. The UE may receive the CSI-RS 712 on a slot (e.g., slot 0 716 in FIG. 7) having received DCI format 0_1 triggering an aperiodic CSI report, and may report CSI information measured using the received CSI-RS to the base station through the PUSCH 715.

According to an embodiment of the disclosure, an aperiodic CSI report may include at least one of CSI part 1 or CSI part 2 or both, and if an aperiodic CSI report is transmitted through a PUSCH, the aperiodic CSI report may be multiplexed with a transport block. In order for an aperiodic CSI report to be multiplexed with a transport block, a CRC may be inserted in an input bit of aperiodic CSI, then the aperiodic CSI may be encoded and rate-matched and then be mapped to a resource element in a PUSCH according to a particular pattern and be transmitted. The CRC insertion may be omitted according to a coding method or the length of input bits. The number of modulation symbols calculated for rate matching when CSI part 1 or CSI part 2 included in an aperiodic CSI report is multiplexed may be obtained as shown in Table 12 below.

TABLE 12

For CSI part 1 transmission on PUSCH not using repetition type B with UL-SCH, the number of coded modulation symbols per layer for CSI part 1 transmission, denoted as $Q'_{CSI-part1}$, if determined as follows:

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} \right\}$$

...

For CSI part 1 transmission on an actual repetition of a PUSCH with repetition Type B with UL-SCH, the number of coded modulation symbols per layer for CSI part 1 transmission, denoted as $Q'_{CSI-part1}$ is determined as follows:

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nominal}^{UCI}(l) \right\rceil - Q'_{ACK/CG-UC}, \sum_{l=0}^{N_{symb,actual}^{PUSCH}-1} M_{sc,actual}^{UCI}(l) - Q'_{ACK/CG-UCI} \right\}$$

...

For CSI part 1 transmission on PUSCH without UL-SCH, the number of coded modulation symbols per layer for *CSI* part 1 transmission, denoted as $Q'_{CSI-part1}$ is determined as follows:

if there is CSI part 2 to be transmitted on the PUSCH, $$Q'_{CSI-1} = \min\left\{\left\lceil \frac{(O_{CSI-1} + L_{CSI-1}) \cdot \beta_{offset}^{PUSCH}}{R \cdot Q_m} \right\rceil, \sum_{l=0}^{N_{symb,all}^{PUSCH}-1} M_{SC}^{UCI}(l) - Q'_{ACK} \right\}$$

else $$Q'_{CSI-1} = \sum_{l=0}^{N_{symb,all}^{PUSCH}-1} M_{sc}^{UCI}(l) - Q'_{ACK}$$

end if

...

For CSI part 2 transmission on PUSCH not using repetition type B with UL-SCH, the number of coded modulation symbols per layer for CSI part 2 transmission, denoted TABLE 12-continued as $Q'_{CSI-part2}$, if determined as follows:

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,all}^{PUSCH}-1} M_{SC}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK/CG-UCI} - Q'_{CSI-1} \right\}$$

For CSI part 2 transmission on an actual repetition of a PUSCH with repetition Type B with UL-SCH, the number of coded modulation symbols per layer for CSI part 2 transmission, denoted as $Q'_{CSI-part2}$ is determined as follows:

$$Q'_{CSI-2} = \min\left\{\left\lceil \frac{(O_{CSI-2} + L_{CSI-2}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil, \left\lceil \alpha \cdot \sum_{l=0}^{N_{symb,nominal}^{PUSCH}-1} M_{sc,nominal}^{UCI}(l) \right\rceil - Q'_{ACK/CG-UCI} - Q'_{CSI-1}, \sum_{l=0}^{N_{symb,actual}^{PUSCH}-1} M_{sc,actual}^{UCI}(l) - Q'_{ACK/CG-UCI} - Q'_{CSI-1} \right\}$$

...

For CSI part 2 transmission on PUSCH without UL-SCH, the number of coded modulation symbols per layer for *CSI* part 2 transmission, denoted as $Q'_{CSI-part2}$ is determined as follows:

$$Q'_{CSI-2} = \sum_{l=0}^{N_{symb,all}^{PUSCH}-1} M_{sc}^{UCI}(l) - Q'_{ACK} - Q'_{CSI-1}$$

According to an embodiment of the disclosure, in a case of PUSCH repetition schemes A and B, a UE may multiplex and transmit an aperiodic CSI report only at the first repetition among PUSCH repetitions. Since aperiodic CSI report information that is multiplexed is encoded in a polar code scheme, when the aperiodic CSI report information is multiplexed at several PUSCH repetitions, each PUSCH repetition is required to have the same frequency and time resource allocation. In particular, in a case of PUSCH repetition type B, each actual repetition may have a different OFDM symbol length, and thus an aperiodic CSI report may be multiplexed and transmitted only at the first PUSCH repetition.

According to an embodiment of the disclosure, with respect to PUSCH repetition scheme B, in a case where a UE schedules an aperiodic CSI report without scheduling a transport block or receives DCI activating a semi-persistent CSI report, even if a PUSCH repetition count configured through higher layer signaling is greater than 1, the value of a nominal repetition may be assumed to be 1. In addition, in a case where the UE schedules or activates an aperiodic or semi-persistent CSI report without scheduling a transport block, based on PUSCH repetition scheme B, the UE may expect that the first nominal repetition is the same as the first actual repetition. With respect to a PUSCH which includes semi-persistent CSI and is transmitted based on PUSCH repetition scheme B without scheduling of DCI after a semi-persistent CSI report is activated through DCI, if the first nominal repetition is different from the first actual repetition, transmission at the first nominal repetition may be disregarded.

According to an embodiment of the disclosure, when a base station indicates an aperiodic CSI report or a semi-persistent CSI report to a UE through DCI, the UE may determine or identify whether the UE is able to perform valid channel reporting through the indicated CSI report, by considering a channel computation time (CSI computation time) required for the CSI report.

According to an embodiment of the disclosure, with respect to an aperiodic CSI report or a semi-persistent CSI report indicated through DCI, a UE may perform valid CSI reporting starting from an uplink symbol after Z symbols after end of the last symbol included in a PDCCH including the DCI indicating the CSI report.

For example, Z symbols may be determined based on the numerology of downlink bandwidth part corresponding to a PDCCH including DCI indicating a CSI report, the numerology of an uplink bandwidth part corresponding to a PUSCH transmitting the CSI report, and the type and/or the characteristic (report quantity, frequency band granularity, the number of ports of a reference signal, the type of a codebook, or the like) of channel information reported in the CSI report. For example, in order for a CSI report to be determined as a valid CSI report (or a CSI report to be a valid CSI report), uplink transmission of the CSI report needs to be not performed before Zref symbols including a timing advance. Zref symbols may be uplink symbols on which a cyclic prefix (CP) is started after the time $T_{proc,CSI}$=(Z) (2048+144). $K2^{-\mu} \cdot T_C$ from the moment at which the last symbol of the triggering PDCCH is ended.

According to an embodiment of the disclosure, a value of Z follows the description below, $T_c=1/(\Delta f_{max}\cdot N_f)$, $\Delta f_{max}=480\cdot 10^3$ Hz, $N_f=4096$, and $\kappa=64$, and μ indicates numerology. μ may be promised to be one among ($\mu_{PDCCH}$, $\mu_{CSI\text{-}RS}$, $\mu_{UL}$), which causes the greatest $T_{proc,CSI}$ value. $\mu_{PDCCH}$ may be referred to as a subcarrier spacing used for PDCCH transmission, $\mu_{CSI\text{-}RS}$ may be referred to as a subcarrier spacing used for CSI-RS transmission, and $\mu_{UL}$ may be referred to as a subcarrier spacing of an uplink channel used in uplink control information (UCI) transmission for CSI reporting. For example, μ may be one among ($\mu_{PDCCH}$, $\mu_{UL}$), which causes the greatest $T_{proc,CSI}$ value. The definitions of $\mu_{PDCCH}$ and $\mu_{UL}$ refers to the above description. For convenience of explanation in the future, satisfying the above condition is called satisfying CSI reporting validity condition 1.

According to an embodiment of the disclosure, if a reference signal for channel measurement for an aperiodic CSI report indicated to a UE through DCI is an aperiodic reference signal, a UE may perform valid CSI reporting starting from an uplink symbol after Z' symbols after end of the last symbol including the reference signal.

For example, Z' symbols described above may be determined based on the numerology of downlink bandwidth part corresponding to a PDCCH including DCI indicating a CSI report, the numerology of a bandwidth corresponding to a reference signal for channel measurement for the CSI report, the numerology of an uplink bandwidth part corresponding to a PUSCH transmitting the CSI report, and the type and/or the characteristic (e.g., report quantity, frequency band granularity, the number of ports of a reference signal, the type of a codebook, or the like) of channel information reported in the CSI report. For example, in order for a CSI report to be determined as a valid CSI report (a CSI report to be a valid CSI report), uplink transmission of the CSI report needs to be not performed before Zref symbols including a timing advance.

For example, Zref symbols may be uplink symbols on which a cyclic prefix (CP) is started after the time $$T'_{proc,CSI}=(Z')(2048+144)\cdot\kappa 2^{-\mu}\cdot T_C$$

from the moment at which the last symbol of an aperiodic CSI-RS or an aperiodic CSI-IM triggered by the triggering PDCCH is ended. According to an embodiment of the disclosure, a value of Z' follows the description below, $T_c=1/(\Delta f_{max}\cdot N_f)$, $\Delta f_{max}=480\cdot 10^3$ Hz, $N_f=4096$, and $\kappa=64$, and μ indicates numerology.

μ may be promised to be one among ($\mu_{PDCCH}$, $\mu_{CSI\text{-}RS}$, $\mu_{UL}$), which causes the greatest $T_{proc,CSI}$ value. $\mu_{PDCCH}$ may be referred to as a subcarrier spacing used for triggering PDCCH transmission, $\mu_{CSI\text{-}RS}$ may be referred to as a subcarrier spacing used for CSI-RS transmission, and $\mu_{UL}$ may be referred to as a subcarrier spacing of an uplink channel used in uplink control information (UCI) transmission for CSI reporting. For example, μ may be promised to be one among ($\mu_{PDCCH}$, $\mu_{UL}$), which causes the greatest $T_{proc,CSI}$ value. The definitions of $\mu_{PDCCH}$ and $\mu_{UL}$ refers to the above description. For convenience of explanation in the future, satisfying the above condition is called satisfying CSI reporting validity condition 2.

According to an embodiment of the disclosure, in a case where a base station indicates an aperiodic CSI report for an aperiodic reference signal to a UE through DCI, the UE may perform valid CSI reporting starting from a first uplink symbol satisfying both a time point after Z symbols after end of the last symbol included in a PDCCH including the DCI indicating the CSI report and a time point after Z' symbols after end of the last symbol including the reference signal. For example, in a case of aperiodic CSI reporting based on an aperiodic reference signal, the CSI report is required to satisfy both CSI reporting validity conditions 1 and 2 so that the UE determines the CSI report as a valid CSI report.

According to an embodiment of the disclosure, if a CSI report time point indicated by a base station fails to satisfy a CSI computation time requirement, a UE may determine that the CSI report is not valid and may not consider update of a channel information state for the CSI report.

According to an embodiment of the disclosure, Z and Z' symbols for calculation of a CSI computation time may be based on Table 13 and Table 14 below. For example, if channel information reported by a CSI report includes only wideband information, the number of ports of a reference signal is equal to or smaller than 4, the number of reference signal resources is 1, and the type of a codebook is "typeI-SinglePanel" or the type (report quantity) of the reported channel information is "cri-RI-CQI", Z and Z' symbols follow $$Z_1, Z'_1$$

values in Table 14. Hereinafter, this is called delay requirement 2.

Furthermore, if a PUSCH including a CSI report does not include a TB or an HARQ-ACK and the CPU occupation of a UE is 0, Z and Z' symbols follow $$Z_1, Z'_1$$

values in Table 13 and this is called delay requirement 1. A description of the CPU occupation is given below. In addition, if report quantity is "cri-RSRP" or "ssb-Index-RSRP", Z and Z' symbols follow $$Z_3, Z'_3$$

values in Table 14. X1, X2, X3, and X4 in Table 14 indicates UE (UE) capability for a beam reporting time, and KB1 and KB2 in Table 14 mean UE capability for a beam change time. If channel information does not correspond to the type or characteristic of the channel information reported in a CSI report, Z and Z' symbols follow $$Z_2, Z'_2$$

values in Table 14.

TABLE 13

| | $Z_1$ [symbols] | |
|---|---|---|
| μ | $Z_1$ | $Z'_1$ |
| 0 | 10 | 8 |
| 1 | 13 | 11 |

TABLE 13-continued

| | $Z_1$ [symbols] | |
|---|---|---|
| μ | $Z_1$ | $Z'_1$ |
| 2 | 25 | 21 |
| 3 | 43 | 36 |

TABLE 14

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3 + KB_1$) | $X_3$ |
| 3 | 97 | 85 | 152 | 140 | min(97, $X_4 + KB_2$) | $X_4$ |

[CSI Reference Resource]

According to an embodiment of the disclosure, when a base station indicates an aperiodic/semi-persistent/periodic CSI report to a UE, the base station may configure a CSI reference resource to determine a reference time and frequency for a channel to be reported in a CSI report.

For example, the frequency of a CSI reference resource may be information on a carrier or subband in which CSI is to be measured, which is indicated in a CSI report configuration, and carrier information and subband information may correspond to carrier and reportFreqConfiguration in the higher layer signaling CSI-ReportConfig, respectively.

According to an embodiment of the disclosure, the time of a CSI reference resource may be defined based on a time at which a CSI report is transmitted. For example, if CSI report #X is indicated to be transmitted on uplink slot n' of a carrier and a BWP in which a CSI report is to be transmitted, the time of a CSI reference resource of CSI report #X may be defined to be downlink slot n-nCSI-ref of a carrier and a BWP in which CSI is measured. Downlink slot n is calculated by $n=\lfloor n'\cdot 2^{\mu_{DL}}/2^{\mu_{UL}}\rfloor$ when the numerology of a carrier and a BWP in which CSI is measured is called μDL and the numerology of a carrier and a BWP in which CSI report #X is transmitted is called μUL.

According to an embodiment of the disclosure, nCSI-ref, which is a slot interval between downlink slot n and a CSI reference signal, may be determined according to the number of CSI-RS/SSB resources for channel measurement when CSI report #X transmitted on uplink slot n' is a semi-persistent or periodic CSI report. For example, nCSI-ref, which is a slot interval between downlink slot n and a CSI reference signal, may follow $n_{CSI\text{-}ref}=4\cdot 2^{\mu_{DL}}$ if a single CSI-RS/SSB resource is connected to (or mapped to or correspond to) a CSI report, and may follow $n_{CSI\text{-}ref}=5\cdot 2^{\mu_{DL}}$ if multiple CSI-RS/SSB resources are connected to a CSI report. If CSI report #X transmitted on uplink slot n' is an aperiodic CSI report, nCSI-ref may be calculated to be $$n_{CSI-ref} = \lfloor Z'/N_{symb}^{slot} \rfloor$$

by considering CSI computation time Z' for channel measurement.

$$N_{symb}^{slot}$$

described above is the number of symbols included in one slot, and $$N_{symb}^{slot} = 14$$

is assumed in NR.

According to an embodiment of the disclosure, in a case where a base station indicates, through higher layer signaling or DCI, a UE to transmit a CSI report on uplink slot n', the UE may report CSI by performing channel measurement or interference measurement for a CSI-RS resource, a CSI-IM resource, or an SSB resource, among CSI-RS resources, CSI-IM resources, or SSB resources associated with (or mapped to or corresponding to) the CSI report, which has been transmitted no later than a CSI reference resource slot of the CSI report transmitted on uplink slot n'.

For example, a CSI-RS resource, a CSI-IM resource, or an SSB resource associated with (or mapped to or corresponding to) the CSI report may be a CSI-RS resource, a CSI-IM resource, or an SSB resource included in a resource set configured in a resource setting referred to by a report setting for the CSI report of a UE configured through higher layer signaling. A CSI-RS resource, a CSI-IM resource, or an SSB resource associated with the CSI report may be a CSI-RS resource, a CSI-IM resource, or an SSB resource referred to by a CSI report trigger state including a parameter for the CSI report. A CSI-RS resource, a CSI-IM resource, or an SSB resource associated with the CSI report may be a CSI-RS resource, a CSI-IM resource, or an SSB resource indicated by an ID of a reference signal (RS) set.

According to an embodiment of the disclosure, a CSI-RS/CSI-IM/SSB occasion may be referred to as a transmission time point of a CSI-RS/CSI-IM/SSB resource(s) determined by a higher layer configuration or a combination of a higher layer configuration and DCI triggering. For example, a slot on which a semi-persistent or periodic CSI-RS resource is transmitted may be determined according to a slot period and a slot offset configured through higher layer signaling, and a transmission symbol(s) in the slot may be determined according to resource mapping information (resourceMapping). As another example, a slot on which an aperiodic CSI-RS resource is transmitted may be determined according to a slot offset from a PDCCH including DCI indicating channel reporting configured through higher layer signaling, and a transmission symbol(s) in the slot may be determined according to resource mapping information (resourceMapping).

According to an embodiment of the disclosure, a CSI-RS occasion may be determined by independently considering a transmission time point of each CSI-RS resource or collectively considering transmission time points of one or more CSI-RS resource(s) included in a resource set, and therefore, the following two interpretations for a CSI-RS occasion according to each resource set configuration are possible.

Interpretation 1-1: From the start time point of the earliest symbol to the end time point of the latest symbol on which one particular resource is transmitted among one or more CSI-RS resources included in a resource set(s) configured in a resource setting referred to by a report setting configured for a CSI report.

Interpretation 1-2: From the start time point of the earliest symbol on which the earliest transmitted CSI-RS resource is transmitted among all CSI-RS resources included in a resource set(s) configured in a resource setting referred to by a report setting configured for a CSI report, to the end time point of the latest symbol on which the latest transmitted CSI-RS resource is transmitted.

Hereinafter, embodiments of the disclosure are applicable individually based on both of the two interpretations for a CSI-RS occasion. In addition, the two interpretations as considered for a CSI-RS occasion are also considerable for a CSI-IM occasion and an SSB occasion. However, the principle thereof is similar to the above description, and thus an overlapped description will be omitted.

According to an embodiment of the disclosure, "a CSI-RS/CSI-IM/SSB occasion for CSI report #X transmitted on uplink slot n'" may be referred to as a set of CSI-RS occasions, CSI-IM occasions, and/or SSB occasions not later than a CSI reference resource of CSI report #X transmitted on uplink slot n' among CSI-RS occasions, CSI-IM occasions, and SSB occasions of CSI-RS resources, CSI-IM resources, and SSB resources included in a resource set configured in a resource setting referred to by a report setting configured for CSI report #X.

According to an embodiment of the disclosure, the following two interpretations for "the latest CSI-RS/CSI-IM/SSB occasion among CSI-RS/CSI-IM/SSB occasions for CSI report #X transmitted on uplink slot n'" are possible.

Interpretation 2-1: A set of occasions including the latest CSI-RS occasion among CSI-RS occasions for CSI report #X transmitted on uplink slot n', the latest CSI-IM occasion among CSI-IM occasions for CSI report #X transmitted on uplink slot n', and the latest SSB occasion among SSB occasions for CSI report #0 transmitted on uplink slot n'

Interpretation 2-2: The latest occasion among all CSI-RS occasions, CSI-IM occasions, and SSB occasions for CSI report #0 transmitted on uplink slot n'

According to an embodiment of the disclosure, the two interpretations for "the latest CSI-RS/CSI-IM/SSB occasion among CSI-RS/CSI-IM/SSB occasions for CSI report #X transmitted on uplink slot n" are individually applicable. In addition, based on the above two interpretations (interpretation 1-1 and interpretation 1-2) for CSI-RS occasions, CSI-IM occasions, and SSB occasions, four different interpretations (application of interpretation 1-1 and interpretation 2-1, application of interpretation 1-1 and interpretation 2-2, application of interpretation 1-2 and interpretation 2-1, and application of interpretation 1-2 and interpretation 2-2) are all individually applicable with respect to "the latest CSI-RS/CSI-IM/SSB occasion among CSI-RS/CSI-IM/SSB occasions for CSI report #X transmitted on uplink slot n'" in embodiments of the disclosure.

According to an embodiment of the disclosure, a base station may indicate a CSI report, based on the amount of channel information which a UE is able to simultaneously calculate for the CSI report. For example, the base station may indicate a CSI report, based on the number of channel information calculation units (CSI processing units, CPUs) of the UE. If the number of channel information calculation units which the UE is able to simultaneously calculate is $N_{CPU}$, the UE may not expect a CSI report indication from the base station, which requires calculation of channel information larger than $N_{CPU}$, or may not consider update of channel information requiring calculation of channel information larger than $N_{CPU}$. $N_{CPU}$ may be reported by the UE to the base station through higher layer signaling or may be configured by the base station through higher layer signaling.

According to an embodiment of the disclosure, it may be assumed that a CSI report indicated by a base station to a UE occupies some or all of CPUs for channel information calculation among $N_{CPU}$, the total number related to channel information which the UE is able to simultaneously calculate. If the number of channel information calculation units required in each CSI report, for example, CSI report n (n=0, 1, . . . , N−1), is $$O_{CPU}^{(n)},$$

the number of channel information calculation units required for a total of N CSI reports may be referred to as $$\sum_{n=0}^{N-1} O_{CPU}^{(n)}.$$

Channel information calculation units required for each reportQuantity configured in a CSI report may be configured as in Table 15 below.

TABLE 15

| |
|---|
| $O_{CPU}^{(n)} = 0$: A case where reportQuantity configured in a CSI report is configured to be 'none', and trs-Info is configured in a CSI-RS resource set connected to the CSI report |
| $O_{CPU}^{(n)} = 1$: A case where reportQuantity configured in a CSI report is configured to be 'none', 'cri-RSRP', or 'ssb-Index-RSRP', and trs-Info is not configured in a CSI-RS resource set connected to the CSI report<br>A case where reportQuantity configured in a CSI report is configured to be 'cri-RI-PMI-CQI', 'cri-RI-il', 'cri-RI-il-CQI', 'cri-RI-CQI', or 'cri-RI-LI-PMI-CQI' |
| >> $O_{CPU}^{(n)} = N_{CPU}$: A case where an aperiodic CSI report is triggered and is not multiplexed with one of a TB/HARQ-ACK or both. A case where the CSI report includes wideband CSI, corresponds to a maximum of 4 CSI-RS ports, and corresponds to a single resource without a CRI report, codebookType corresponds to "typeI-SinglePanel" or reportQuantity corresponds to "cri-RI-CQI" (The case correspond to the above delay requirement 1, and herein, the UE quickly calculates CSI by using all available CPUs and then reports same). |
| >> $O_{CPU}^{(n)} = K_s$: All the remaining cases other than the above case $K_s$ indicates the number of CSI-RS resources in a CSI-RS resource set for channel measurement. |

According to an embodiment of the disclosure, when the number of channel information calculation required by a UE for multiple CSI reports at a particular time point is greater than the number $N_{CPU}$ of channel information calculation units that the UE is able to simultaneously calculate, the UE may not consider or perform update of channel information for some CSI reports. A CSI report, among multiple indicated CSI reports, for which update of channel information is not considered or performed may be determined by considering at least the priority of reported channel information and/or a time for which channel information calculation required for the CSI report occupies CPUs. For example, update of channel information for a CSI report for which a time for which channel information calculation required for the CSI report occupies CPUs starts at the latest time point may not be considered or performed, and update of channel information for a CSI report having a low priority of channel information may not be preferentially considered or performed.

The priority of channel information may be determined by referring to Table 16 below.

TABLE 16

| |
|---|
| CSI priority value $Pri_{iCSI}(y, k, c, s) = 2 \cdot N_{cells} \cdot M_s \cdot y + N_{cells} \cdot M_s \cdot k + M_s \cdot c + s$ |
| - y = 0 in a case of an aperiodic CSI report transmitted through a PUSCH, y = 1in a case of a semi-persistent CSI report transmitted through a PUSCH, y = 2 in a case of a semi-persistent CSI report transmitted through a PUCCH, and y = 3 in a case of a periodic CSI report transmitted through a PUCCH; |
| - k = 0 when a CSI report includes L1-RSRP, and k = 1 when a CSI report does not include L1-RSRP; |
| - c : Serving cell index, and $N_{cells}$ : A maximum number (maxNrofServingCells) of serving cells configured through higher layer signaling; |
| - s : CSI report configuration index (reportConfigID), and $M_s$: A maximum number (maxNrofCSI-ReportConfigurations)of CSI report configurations configured through higher layer signaling. |

According to an embodiment of the disclosure, a CSI priority for a CSI report may be determined based on the priority value PriiCSI(y,k,c,s) in Table 16. Referring to Table 16, a CSI priority value may be determined based on the type of channel information included in a CSI report, the time axis reporting characteristic (aperiodic, semi-persistent, or periodic) of the CSI report, a channel (PUSCH or PUCCH) through which the CSI report is transmitted, a serving cell index, and/or a CSI report configuration index. In relation to a CSI priority for a CSI report, the priority values of PriiCSI (y,k,c,s) are compared, whereby the CSI priority of a CSI report having a small priority value may be determined to be high.

According to an embodiment of the disclosure, when a time for which channel information calculation required for a CSI report indicated by a base station to a UE occupies CPUs is a CPU occupation time, the CPU occupation time may be determined based on the type (report quantity) of channel information included in the CSI report, the time axis characteristic (aperiodic, semi-persistent, or periodic) of the CSI report, a slot or symbol occupied by higher layer signaling or DCI indicating the CSI report, and/or some or all of symbols or slots occupied by a reference signal for channel state measurement.

[PDCCH: Regarding DCI]

Hereinafter, downlink control information (DCI) in a 5G communication system will be described below.

According to an embodiment of the disclosure, in a 5G system, scheduling information regarding uplink data (or physical uplink shared channel (PUSCH)) or downlink data (or physical downlink shared channel (PDSCH)) may be included in DCI and transferred from a base station to a UE through the DCI. The UE may monitor, with regard to the PUSCH or PDSCH, a fallback DCI format and a non-fallback DCI format. The fallback DCI format may include a fixed field predefined between the base station and the UE, and the non-fallback DCI format may include a configurable field.

According to an embodiment of the disclosure, the DCI may be subjected to channel coding and modulation processes and then transmitted through or on a physical downlink control channel (PDCCH). A cyclic redundancy check (CRC) may be attached to the DCI message payload, and the CRC may be scrambled by a radio network temporary identifier (RNTI) corresponding to the identity of the UE. Different RNTIs may be used according to the purpose of the DCI message (for example, UE-specific data transmission, power control command, or random access response, or the like). For example, the RNTI may not be explicitly transmitted, but may be transmitted while being included in a CRC calculation process. Upon receiving a DCI message transmitted on the PDCCH, the UE may identify the CRC by using the allocated RNTI, and if the CRC identification result is right, the UE may identify or know that the corresponding message has been transmitted to the UE.

For example, DCI for scheduling a PDSCH regarding system information (SI) may be scrambled by an SI-RNTI. DCI for scheduling a PDSCH regarding a random access response (RAR) message may be scrambled by an RA-RNTI. DCI for scheduling a PDSCH regarding a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

According to an embodiment of the disclosure, DCI format 0_0 may be used as fallback DCI for scheduling a PUSCH, and in this case, the CRC may be scrambled by a C-RNTI. DCI format 0_0 in which the CRC is scrambled by a C-RNTI may include at least some of the following pieces of information given in Table 17 below, for example.

TABLE 17

| |
|---|
| Identifier for DCI formats - [1] bit |
| Frequency domain resource assignment - $\left[\left\lceil \log_2\left(N_{RB}^{UL,BWP}\left(N_{RB}^{UL,BWP}+1\right)/2\right)\right\rceil\right]$ bits |
| Time domain resource assignment - X bits |
| Frequency hopping flag - 1 bit. |
| Modulation and coding scheme - 5 bits |
| New data indicator - 1 bit |
| Redundancy version - 2 bits |
| HARQ process number - 4 bits |
| Transmit power control (TPC) command for scheduled PUSCH - [2] bits |
| Uplink/supplementary uplink (UL/SUL) indicator - 0 or 1 bit |

DCI format 0_1 may be used as non-fallback DCI for scheduling a PUSCH, and in this case, the CRC may be scrambled by a C-RNTI. DCI format 0_1 in which the CRC is scrambled by a C-RNTI may include at least some of the following pieces of information given in Table 18 below, for example.

TABLE 18

| |
|---|
| Carrier indicator - 0 or 3 bits |
| UL/SUL indicator - 0 or 1 bit |
| Identifier for DCI formats - [1] bits |
| Bandwidth part indicator - 0, 1 or 2 bits |
| Frequency domain resource assignment |
| * For resource allocation type 0, $\lceil N_{RB}^{UL,BWP}/P \rceil$ bits |
| * For resource allocation type 1, $\lceil \log_2(N_{RB}^{UL,BWP}(N_{RB}^{UL,BWP}+1)/2) \rceil$ bits |
| Time domain resource assignment -1, 2, 3, or 4 bits |
| Virtual resource block (VRB)-to-physical resource block (PRB) mapping - 0 or 1 bit, only for resource allocation type 1. |
| * 0 bit if only resource allocation type 0 is configured; |
| * 1 bit otherwise. |
| Frequency hopping flag - 0 or 1 bit, only for resource allocation type 1. |
| * 0 bit if only resource allocation type 0 is configured; |
| * 1 bit otherwise. |
| Modulation and coding scheme - 5 bits |
| New data indicator - 1 bit |
| Redundancy version - 2 bits |
| HARQ process number - 4 bits |
| 1st downlink assignment index- 1 or 2 bits |
| * 1 bit for semi-static HARQ-ACK codebook; |
| * 2 bits for dynamic HARQ-ACK codebook with single HARQ-ACK codebook. |
| 2nd downlink assignment index - 0 or 2 bits |
| * 2 bits for dynamic HARQ-ACK codebook with two HARQ-ACK sub-codebooks; |
| * 0 bit otherwise. |
| TPC command for scheduled PUSCH - 2 bits |
| $SRS$ resource indicator $- \left\lceil \log_2\left(\sum_{k=1}^{L_{max}} \binom{N_{SRS}}{k}\right)\right\rceil$ or $\lceil \log_2(N_{SRS}) \rceil$ bits |
| $* \left\lceil \log_2\left(\sum_{k=1}^{L_{max}} \binom{N_{SRS}}{k}\right)\right\rceil$ bits for non-codebook based $PUSCH$ transmission; |
| * $\lceil \log_2(N_{SRS}) \rceil$ bits for codebook based PUSCH transmission. |
| Precoding information and number of layers - up to 6 bits |
| Antenna ports - up to 5 bits |
| SRS request - 2 bits |
| Channel state information (CSI) request - 0, 1, 2, 3, 4, 5, or 6 bits |
| Code block group (CBG) transmission information - 0, 2, 4, 6, or 8 bits |
| Phase tracking reference signal (PTRS)-demodulation reference signal (DDMRS) association - 0 or 2 bits. |
| beta_offset indicator - 0 or 2 bits |
| DMRS sequence initialization - 0 or 1 bit |

DCI format 1_0 may be used as fallback DCI for scheduling a PDSCH, and in this case, the CRC may be scrambled by a C-RNTI. DCI format 1_0 in which the CRC is scrambled by a C-RNTI may include at least some of the following pieces of information given in Table 19 below, for example.

TABLE 19

| |
|---|
| Identifier for DCI formats - [1] bit |
| Frequency domain resource assignment - |
| $[\lceil \log_2(N_{RB}^{DL,BWP}(N_{RB}^{DL,BWP}+1)/2) \rceil]$ bits |
| Time domain resource assignment - X bits |
| VRB-to-PRB mapping - 1 bit. |
| Modulation and coding scheme - 5 bits |
| New data indicator - 1 bit |
| Redundancy version - 2 bits |
| HARQ process number - 4 bits |
| Downlink assignment index - 2 bits |

TABLE 19-continued

| |
|---|
| TPC command for scheduled PUCCH - [2] bits |
| Pysical uplink control channel (PUCCH) resource indicator - 3 bits |
| PDSCH-to-HARQ feedback timing indicator - [3] bits |

DCI format 1_1 may be used as non-fallback DCI for scheduling the PDSCH, and in this case, the CRC may be scrambled by a C-RNTI. DCI format 1_1 in which the CRC is scrambled by a C-RNTI may include at least some of the following pieces of information given in Table 20 below, for example.

TABLE 20

| |
|---|
| Carrier indicator - 0 or 3 bits |
| Identifier for DCI formats - [1] bits |
| Bandwidth part indicator - 0, 1 or 2 bits |
| Frequency domain resource assignment |
| For resource allocation type 0, $\lceil N_{RB}^{DL,BWP}/P \rceil$ bits |
| For resource allocation type 1, $\lceil \log_2(N_{RB}^{DL,BWP}(N_{RB}^{DL,BWP}+1)/2) \rceil$ bits |
| Time domain resource assignment -1, 2, 3, or 4 bits |
| VRB-to-PRB mapping - 0 or 1 bit, only for resource allocation type 1. |
| 0 bit if only resource allocation type 0 is configured; |
| 1 bit otherwise. |
| Physical resource block (PRB) bundling size indicator - 0 or 1 bit |
| Rate matching indicator - 0, 1, or 2 bits |
| Zero power (ZP) channel state information (CSI)-reference signal (RS) trigger - 0, 1, or 2 bits |
| For transport block 1: |
| Modulation and coding scheme - 5 bits |
| New data indicator - 1 bit |
| Redundancy version - 2 bits |
| For transport block 2: |
| Modulation and coding scheme - 5 bits |
| New data indicator - 1 bit |
| Redundancy version - 2 bits |
| HARQ process number - 4 bits |
| Downlink assignment index - 0 or 2 or 4 bits |
| TPC command for scheduled PUCCH - 2 bits |
| PUCCH resource indicator - 3 bits |
| PDSCH-to-HARQ_feedback timing indicator - 3 bits |
| Antenna ports - 4, 5 or 6 bits |
| Transmission configuration indication - 0 or 3 bits |
| SRS request - 2 bits |
| CBG transmission information - 0, 2, 4, 6, or 8 bits |
| CBG flushing out information - 0 or 1 bit |
| DMRS sequence initialization - 1 bit |

Hereinafter, a downlink control channel in a 5G communication system will be described with reference to the accompanying drawings.

Figure 8:
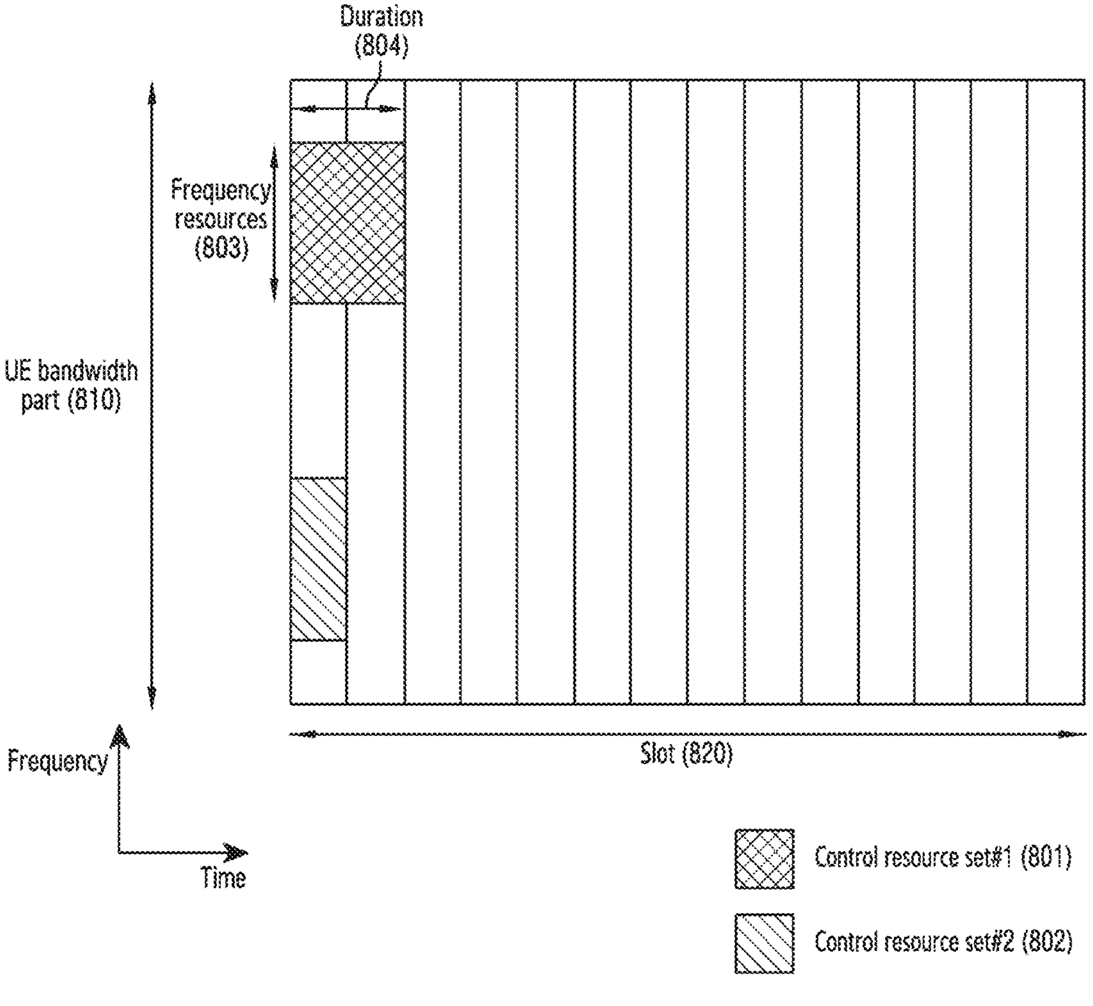
FIG. 8 illustrates control resource set configuration of a downlink control channel in a wireless communication system according to an embodiment of the disclosure.

FIG. 8 illustrates a control resource set (CORESET) used to transmit a downlink control channel in a 5G wireless communication system according to an embodiment of the disclosure.

Referring to FIG. 8, it illustrates an example in which a UE bandwidth part 810 is configured along the frequency axis, and two control resource sets (control resource set #1 801 and control resource set #2 802) are configured within one slot 820 along the time axis. The control resource sets 801 and 802 may be configured in a specific frequency resource 803 within the entire UE bandwidth part 810 along the frequency axis. One or multiple OFDM symbols may be configured along the time axis, and this may be defined as a control resource set duration 804. Referring to the example illustrated in FIG. 8, control resource set #1 801 is configured to have a control resource set duration corresponding to two symbols, and control resource set #2 802 is configured to have a control resource set duration corresponding to one symbol.

According to an embodiment of the disclosure, a control resource set in 5G described above may be configured for a UE by a base station through upper layer signaling (for example, system information, master information block (MIB), radio resource control (RRC) signaling). The description that a control resource set is configured for a UE means that information, such as a control resource set identity, the control resource set's frequency location, and/or the control resource set's symbol duration is provided. For example, configuration information regarding the control resource set may include at least some of the following pieces of information given in Table 21.

TABLE 21

```
ConControlResourceSet ::=            SEQUENCE {
        -- Corresponds to L1 parameter 'CORESET-ID'
        controlResourceSetId          ControlResourceSetId
,
   (control resource set identity)
        frequencyDomainResources      BIT STRING (SIZE (
45)),
   (frequency domain resource assignment information)
        duration                         INTEGER (1..
maxCoReSetDuration),
   (time domain resource assignment information)
        cce-REG-MappingType              CHOIC
E {
   (CCE-to-REG mapping type)
           interleaved                   SEQUE
NCE {
              reg-BundleSize                E
NUMERATED {n2, n3, n6},
       (REG bundle size)
              precoderGranularity        ENUM
ERATED {sameAsREG-bundle, allContiguousRBs},
              interleaverSize               E
NUMERATED {n2, n3, n6}
              (interleaver size)
              shiftIndex                    I
NTEGER(0..maxNrofPhysicalResourceBlocks-1)
                 OPTIONAL
             (interleaver shift)
    },
        nonInterleaved                   NULL
        },
        tci-StatesPDCCH                  SEQUENCE(S
IZE (1..maxNrofTCI-StatesPDCCH)) OF TCI-StateId
        OPTIONAL,
(QCL configuration information)
        tci-PresentInDCI              ENUMERATED {ena
bled}
OPTIONAL, -- Need S
}
```

In Table 21, tci-StatesPDCCH (simply referred to as transmission configuration indication (TCI) state) configuration information may include information of one or multiple SS/PBCH block indexes and/or channel state information reference signal (CSI-RS) indexes, which are quasi-co-located (OCLed) with a DMRS transmitted in a corresponding control resource set.

Figure 9:
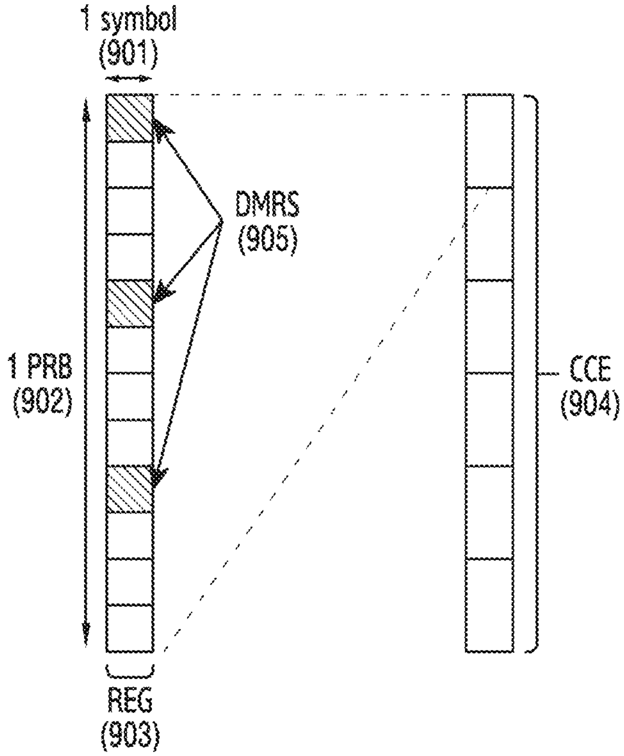
FIG. 9 illustrates a structure of a downlink control channel in a wireless communication system according to an embodiment of the disclosure.

FIG. 9 illustrates a basic unit of time and frequency resources constituting a downlink control channel available in a 5G system according to an embodiment of the disclosure.

Referring to FIG. 9, the basic unit of time and frequency resources constituting a control channel may be referred to as a resource element group (REG) 903. The REG 903 may be defined by one OFDM symbol 901 along the time axis and one physical resource block (PRB) 902 (for example, 12 subcarriers) along the frequency axis. The base station may configure a downlink control channel allocation unit by concatenating the REGs 903.

According to an embodiment of the disclosure, provided that the basic unit of downlink control channel allocation in 5G is a control channel element (CCE) 904, one CCE 904 may include multiple REGs 903. To describe the REG 903 illustrated in FIG. 9, for example, the REG 903 may include 12 REs, and if one CCE 904 includes six REGs 903, one CCE 904 may then include 72 REs.

According to an embodiment of the disclosure, a downlink control resource set, once configured, may include multiple CCEs 904, and a specific downlink control channel may be mapped to one or multiple CCEs 904 and then transmitted according to the aggregation level (AL) in the control resource set. The CCEs 904 in the control resource set are distinguished by numbers, and the numbers of CCEs 904 may be allocated or indicated according to a logical mapping scheme.

The basic unit of the downlink control channel illustrated in FIG. 9, that is, the REG 903 may include both REs to which DCI is mapped, and an area to which a reference signal DMRS 905 for decoding the same is mapped. As in FIG. 9, three DRMSs 905 may be transmitted inside one REG 903.

According to an embodiment of the disclosure, the number of CCEs necessary to transmit a PDCCH may be 1, 2, 4, 8, or 16 according to the aggregation level (AL), and different number of CCEs may be used to implement link adaption of the downlink control channel. For example, when AL=L, one downlink control channel may be transmitted through L CCEs. The UE needs to detect a signal while being no information regarding the downlink control channel, and thus a search space indicating a set of CCEs has been defined for blind decoding. The search space is a set of downlink control channel candidates including CCEs which the UE needs to attempt to decode at a given AL, and since 1, 2, 4, 8, or 16 CCEs may constitute a bundle at various ALs, the UE may have multiple search spaces. A search space set may be defined as a set of search spaces at all configured ALs.

According to an embodiment of the disclosure, search spaces may be classified into common search spaces and UE-specific search spaces. A group of UEs or all UEs may search a common search space of the PDCCH in order to receive cell-common control information, such as a paging message. For example, PDSCH scheduling allocation information for transmitting an SIB including a cell operator information or the like may be received by searching the common search space of the PDCCH. For example, in the case of a common search space, a group of UEs or all UEs need to receive the PDCCH, and the common search space may thus be defined as a predetermined set of CCEs. Scheduling allocation information regarding a UE-specific PDSCH or PUSCH may be received by scanning the UE-specific search space of the PDCCH. The UE-specific search space may be defined UE-specifically as a function of various system parameters and the identity of the UE.

According to an embodiment of the disclosure, in 5G, a parameter for a search space regarding a PDCCH may be configured for the UE by the base station through upper layer signaling (for example, SIB, MIB, or RRC signaling). For example, the base station may configure, for the UE, the number of PDCCH candidates at each aggregation level L, the monitoring cycle regarding the search space, the monitoring occasion with regard to each symbol in a slot regarding the search space, the search space type (common search space or UE-specific search space), a combination of an RNTI and a DCI format to be monitored in the corresponding search space, and/or a control resource set index for monitoring the search space, or the like. For example, the information configured for the UE may include at least some of the following pieces of information given in Table 22 below.

TABLE 22

```
SearchSpace ::=                                    SEQUENCE {
        -- Identity of the search space. SearchSpaceId = 0 identifies the SearchSpace
configured via PBCH (MIB) or ServingCellConfigCommon.
        searchSpaceId                                   SearchSpaceId
,
   (search space identity)
        controlResourceSetId                            ControlResourceSetId
,
   (control resource set identity)
        monitoringSlotPeriodicityAndOffset          CHOICE {
   (monitoring slot level periodicity)
           sl1
        NULL,
           sl2                                            I
NTEGER (0..1),
           sl4                                            I
NTEGER (0..3),
           sl5                                            INTEG
ER (0..4),
           sl8                                            I
NTEGER (0..7),
           sl10                                           INTEG
ER (0..9),
           sl16                                           INTEG
ER (0..15),
           sl20                                           INTEG
ER (0..19)
        }
                                                   OPTIONAL,
   duration (monitoring duration)                   INTEGER (2..2559)
        monitoringSymbolsWithinSlot                     BIT STRING (
SIZE (14))
           OPTIONAL,
   (monitoring symbols within slot)
        nrofCandidates                                  SEQUENCE {
   (number of PDCCH candidates for each aggregation level)
           aggregationLevel1
        ENUMERATED {n0, n1, n2, n3, n4, n5, n6, n8},
           aggregationLevel2
        ENUMERATED {n0, n1, n2, n3, n4, n5, n6, n8},
           aggregationLevel4
        ENUMERATED {n0, n1, n2, n3, n4, n5, n6, n8},
           aggregationLevel8
        ENUMERATED {n0, n1, n2, n3, n4, n5, n6, n8},
           aggregationLevel16
        ENUMERATED {n0, n1, n2, n3, n4, n5, n6, n8}
        },
        searchSpaceType                                 CHOICE {
        (search space type)
           -- Configures this search space as common search space (CSS) and DCI
formats to monitor.
           common
        SEQUENCE {
        (common search space)
     }
           ue-Specific
        SEQUENCE {
        (UE-specific search space)
              -- Indicates whether the UE monitors in this USS for DCI
formats 0-0 and 1-0 or for formats 0-1 and 1-1.
              formats
        ENUMERATED {formats0-0-And-1-0, formats0-1-And-1-1},
           ...
           }
```

According to an embodiment of the disclosure, based on configuration information, the base station may configure one or multiple search space sets for the UE. According to an embodiment of the disclosure, the base station may configure search space set 1 and search space set 2 for the UE, may configure DCI format A scrambled by an X-RNTI to be monitored in a common search space in search space set 1, and may configure DCI format B scrambled by a Y-RNTI to be monitored in a UE-specific search space in search space set 2.

According to an embodiment of the disclosure, one or multiple search space sets may exist in a common search space or a UE-specific search space according to configuration information. For example, search space set #1 and search space set #2 may be configured as a common search space, and search space set #3 and search space set #4 may be configured as a UE-specific search space.

Combinations of DCI formats and RNTIs given below may be monitored in a UE-specific search space. Of course, the examples given below are not limiting.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI According to an embodiment of the disclosure, combinations of DCI formats and RNTIs given below may be monitored in a UE-specific search space. Obviously, the example given below is not limiting.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

Enumerated RNTIs may follow the definition and usage given below Cell RNTI (C-RNTI): used to schedule a UE-specific PDSCH Temporary cell RNTI (TC-RNTI): used to schedule a UE-specific PDSCH Configured scheduling RNTI (CS-RNTI): used to schedule a semi-statically configured UE-specific PDSCH Random access RNTI (RA-RNTI): used to schedule a PDSCH in a random access step Paging RNTI (P-RNTI): used to schedule a PDSCH in which paging is transmitted System information RNTI (SI-RNTI): used to schedule a PDSCH in which system information is transmitted Interruption RNTI (INT-RNTI): used to indicate whether a PDSCH is punctured Transmit power control for PUSCH RNTI (TPC-PUSCH-RNTI): used to indicate a power control command regarding a PUSCH Transmit power control for PUCCH RNTI (TPC-PUCCH-RNTI): used to indicate a power control command regarding a PUCCH Transmit power control for SRS RNTI (TPC-SRS-RNTI): used to indicate a power control command regarding an SRS The DCI formats enumerated above may follow the definitions given in Table 23 below.

TABLE 23

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no t ransmission is intended for the UE |
| 2_2 | Transmission of TPC commands for PUCCH and PUSCH |
| 2_3 | Transmission of a group of TPC commands f or SRS transmissions by one or more UEs |

In 5G, the search space at aggregation level L in connection with control resource set p and search space set s may be expressed by Equation 1 below:

$$L\cdot\left\{\left(Y_{p,n^{\mu}_{s,f}}+\left\lfloor\frac{m_{s,n_{CI}}\cdot N_{CCE,p}}{L\cdot M^{(L)}_{s,max}}\right\rfloor+n_{CI}\right)\bmod\left\lfloor\frac{N_{CCE,p}}{L}\right\rfloor\right\}+i \quad \text{Equation 1}$$

L: aggregation level $n_{CI}$: carrier index $N_{CCE,p}$: total number of CCEs existing in control resource set p $$n^{\mu}_{s,f}:$$

slot index $$M^{(L)}_{s,max}:$$

number of PDCCH candidates at aggregation level L $$m_{s,n_{CI}}=0,\ \ldots\ ,M^{(L)}_{s,max}-1:$$

PDCCH candidate index at aggregation level L i=0, . . . , L−1

$$Y_{p,n^{\mu}_{s,f}}=\left(A_p\cdot Y_{p,n^{\mu}_{s,f}-1}\right)\bmod D,$$

$Y_{p,-1}=n_{RNTI}\neq 0$, $A_p=39827$ for p mod 3=0, $A_p=39829$ for p mod 3=1, $A_p=39839$ for p mod 3=2, D=65537

$n_{RNTI}$: UE identity

The $$Y_{p,n^{\mu}_{s,f}}$$

value may correspond to 0 in the case of a common search space.

The $$Y_{p,n^{\mu}_{s,f}}$$

value may correspond to a value changed by the UE's identity (C-RNTI or ID configured for the UE by the base station) and the time index in the case of a UE-specific search space.

According to an embodiment of the disclosure, in 5G, multiple search space sets may be configured by different parameters (for example, parameters in Table 22), and the group of search space sets monitored by the UE at each timepoint may differ accordingly. For example, if search space set #1 is configured at by X-slot cycle, if search space set #2 is configured at by Y-slot cycle, and if X and Y are different, the UE may monitor search space set #1 and search space set #2 both in a specific slot, and may monitor one of search space set #1 and search space set #2 both in another specific slot.

[PDSCH/PUSCH: Related to Frequency Resource Allocation]

Next, frequency axis resource allocation (frequency domain resource assignment, FDRA) for a physical downlink shared channel (PDSCH) and a physical uplink shared channel (PUSCH) in NR is described.

Figure 10:
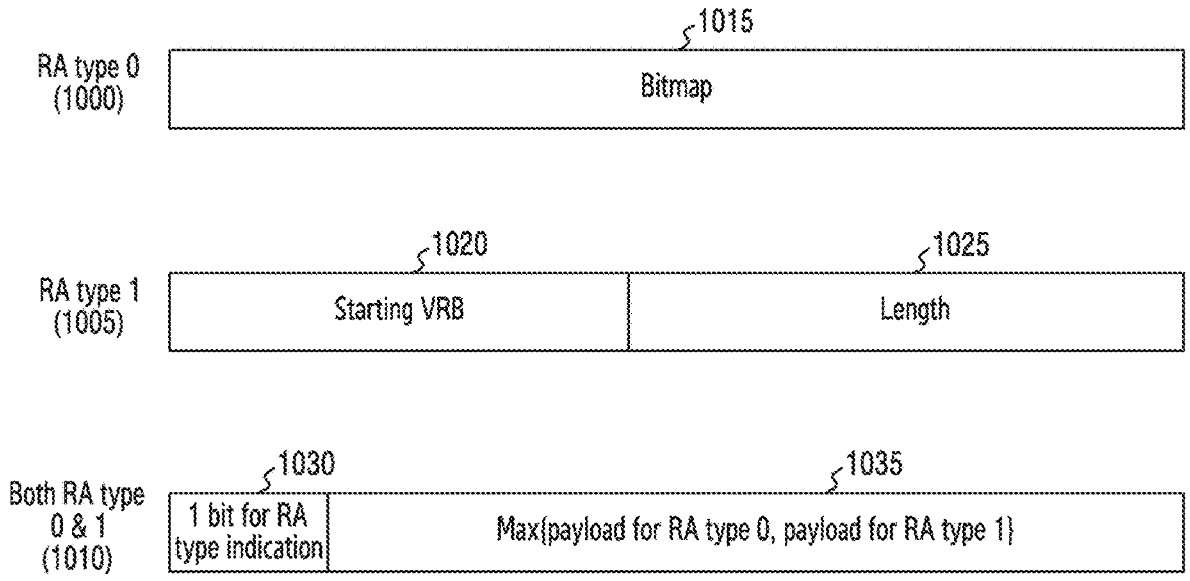
FIG. 10 is a diagram illustrating frequency axis resource allocation of a physical downlink shared channel (PDSCH) or PUSCH in a wireless communication system according to an embodiment of the disclosure.

FIG. 10 is a diagram illustrating frequency axis resource allocation of a PDSCH or PUSCH in a wireless communication system according to an embodiment of the disclosure.

Referring to FIG. 10, it relates to three frequency axis resource allocation methods including FDRA type 0 1000, FDRA type 1 1005, and a dynamic switch 1010 configurable through a higher layer in an NR wireless communication system.

Referring to FIG. 10, if a UE is configured, through higher layer signaling, to use only FDRA type 0, partial downlink control information (DCI) scheduling a PDSCH or PUSCH to the UE includes a bitmap configured by non-deterministic random bit generator (NRBG) bits. A condition therefor will be described below. NRBG indicates the number of resource block groups (RBGs) determined as shown in Table 24 below according to the higher layer parameter rbg-Size and a bandwidth part size allocated by a bandwidth part indicator, and data is transmitted on a RBG indicated by number 1 through a bitmap.

TABLE 24

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The size of a frequency resource in a bandwidth part may be defined to be the number of RBs included in the bandwidth part. Specifically, when FDRA type 0 resource allocation is indicated to a UE, the length of a FDRA field of DCI received by the UE is the same as the number (NRBG) of RBGs in a bandwidth part, and is $$N_{RBG} = \lceil (N_{BWP}^{size} + (N_{BWP}^{start} \bmod P)) / P \rceil.$$

Here, the first RBG in the bandwidth part includes $$RBG_0^{size} = P - N_{BWP}^{size} \bmod P$$

number of RBs, and the last RBG in the bandwidth part includes $$RBG_{last}^{size} = (N_{BWP}^{start} + N_{BWP}^{size}) \bmod P$$

number of RBs if $$(N_{BWP}^{start} + N_{BWP}^{size}) \bmod P > 0$$

is satisfied and, otherwise (i.e., $$(N_{BWP}^{start} + N_{BWP}^{size}) \bmod P > 0$$

is not satisfied), includes $$RBG_{last}^{size} = P$$

number of RBs. The remaining RBGs in the bandwidth part includes P number of RBs. Here, P is the number of nominal RBGs determined according to Table 24 above.

If a UE is configured to use only FDRA type 1 through higher layer signaling (1005), DCI allocating a PDSCH or a PUSCH to the UE includes frequency domain resource allocation information (FDRA) configured by $$\lceil \log_2 (N_{RB}^{BWP} * (N_{RB}^{BWP} + 1)/2 \rceil$$

number of bits. Here, $$N_{RB}^{BWP}$$

indicates the number of RBs included in a bandwidth part. A base station may configure, through the information, a starting VRB 1020 and a frequency axis resource length 1025 continuously allocated therefrom.

If a UE is configured, through higher layer signaling, to use both FDRA type 0 resource allocation and FDRS type 1 resource allocation, partial DCI allocating a PDSCH/PUSCH to the UE may include frequency axis resource allocation information configured by bits of a greater value 1035 among a payload 1015 for configuring FDRA type 0 resource allocation and a payload 1020 and 1025 for configuring FDRA type 1 resource allocation. A condition therefor will be described later. A bit may be added to the foremost part (MSB) of the frequency axis resource allocation information in the DCI, if the bit has a value of 0, this may indicate that FDRA type 0 resource allocation is used, and if the bit has a value of 1, this may indicate that FDRA type 1 resource allocation is used.

If a FDRA type 2 resource allocation method is configured for a UE through higher layer signaling, the UE may receive an indication 1030 for the FDRA type 2 resource allocation method from a base station according to the following method.

The UE may receive an indication of a set of M interlace indexes from the base station as RB allocation information.

The interlace index $m \in \{0, 1, \ldots, M-1\}$ may be configured by common RBs {m, M+m, 2M+m, 3M+m, . . . }, and M may be defined as in Table 25.

TABLE 25

| μ | M |
|---|---|
| 0 | 10 |
| 1 | 5 |

A relation between a common $$RB\ n^{\mu}_{CRB} \text{ and an } RB\ n^{\mu}_{IRB,m} \in \{0, 1, \ldots\}$$

in bandwidth part i and interlace m may be defined as below.

$$(1)\ n^{\mu}_{CRB} = Mn^{\mu}_{IRB,m} + N^{start,\mu}_{BWP,i} + \left(\left(m - N^{start,\mu}_{BWP,i}\right) \bmod M\right)$$

(2) where $$N^{start,\mu}_{BWP,i}$$

is the common resource block where bandwidth part starts relative to common resource block 0. u is subcarrier spacing index If a subcarrier spacing is 15 kHz (u=0), RB allocation information for an interlace set may be notified of to a UE from a base station by using m0+1 indexes. In addition, a resource allocation field may be configured by a resource indication value (RIV). If a resource indication value is 0≤ RIV<M (M+1)/2 and l=0, 1, . . . L−1, same may be configured by the starting interlace m0 and the number L (L≥1) of consecutive interlaces, and the value is as below.

$$\text{if } (L-1) \le \lfloor M/2 \rfloor \text{ then}$$

$$RIV = M(L-1) + m_0$$

$$\text{else}$$

$$RIV = M(M-L+1) + (M-1-m_0)$$

If a resource indication value is RIV≥M (M+1)/2, the resource indication value may be configured by the starting interlace indexes m0 and 1 values, and may be configured as shown in Table 26.

TABLE 26

| RIV − M(M + 1)/2 | m0 | 1 |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

If a subcarrier spacing is 30 kHz (u=1), RB allocation information may be notified of to a UE from a base station in a bitmap form indicating interlaces allocated to the UE. The size of the bitmap is M, and one bit of the bitmap corresponds to each interlace. In the sequence of the interlace bitmap, interlace index 0 to M−1 may be mapped to the MSB to LSB.

In addition, the least significant bit $$(LSB)\ Y = \left\lceil \log 2 \frac{N^{BWP}_{RB-set}\left(N^{BWP}_{RB-set} + 1\right)}{2} \right\rceil$$

of a FDRA field for 15 kHz and 30 kHz may imply consecutive RB sets of a PUSCH scheduled by DCI format 0_1. Y bits may be configured by a resource indication value (RIVRBset). In $$0 \le RIV_{RBset} < N^{BWP}_{RB-set}\left(N^{BWP}_{RB-set} + 1\right)/2 \text{ and } l = 0, 1, \ldots L_{RBset} - 1,$$

a RIVRBset value may be determined by a starting RB set ($RBset_{START}$) and the number ($L_{RBset}$($L_{RBset}$≥1)) of consecutive RB sets. The RIVRBset value may be defined as follows.

$$\text{if } (L_{RBset} - 1) \le \left\lfloor N^{BWP}_{RB-set}/2 \right\rfloor \text{ then}$$

$$RIV_{RBset} = N^{BWP}_{RB-set}(L_{RBset} - 1) + RBset_{START}$$

$$\text{else}$$

$$RIV_{RBset} = N^{BWP}_{RB-set}\left(N^{BWP}_{RB-set} - L_{RBset} + 1\right) + \left(N^{BWP}_{RB-set} - 1 - RBset_{START}\right)$$

$$N^{BWP}_{RB-set}$$

Indicates the number of RB sets included in a bandwidth part, and may be determined by the number of guard gaps (or bands) in a carrier configured through higher signaling (or previously configured).

[PDSCH/PUSCH: Regarding Time Resource Allocation]

Hereinafter, a time domain resource allocation method regarding a data channel in a next-generation mobile communication system (5G or NR system) will be described.

A base station may configure a table for time domain resource allocation information regarding a physical downlink shared channel (PDSCH) and a physical uplink shared channel (PUSCH) for a UE through upper layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. In an embodiment of the disclosure, the time domain resource allocation information may include PDCCH-to-PDSCH slot timing (for example, corresponding to a slot-unit time interval between a timepoint at which a PDCCH is received and a timepoint at which a PDSCH scheduled by the received PDCCH is transmitted; labeled K0), PDCCH-to-PUSCH slot timing (for example, corresponding to a slot-unit time interval between a timepoint at which a PDCCH is received and a timepoint at which a PUSCH scheduled by the received PDCCH is transmitted; hereinafter, labeled K2), information regarding the location and length of the start symbol by which a PDSCH or PUSCH is scheduled inside a slot, the mapping type of a PDSCH or PUSCH, and the like. For example, information, such as in Table 27 or Table 28 below may be transmitted from the base station to the UE.

TABLE 27

```
PDSCH-TimeDomainResourceAllocationList information element
PDSCH-TimeDomainResourceAllocationList ::=   SEQUENCE (SIZE(1..maxNrofDL-
Allocations)) OF
PDSCH-TimeDomainResourceAllocation
PDSCH-TimeDomainResourceAllocation ::=       SEQUENCE {
      k0                                         INTEGER(0..32)
  OPTIONAL,   -- Need S
      (PDCCH-to-PDSCH timing, slot unit)
 mappingType                            ENUMERATED {typeA, typeB},
     (PDSCH mapping type)
startSymbolAndLength                      INTEGER (0..127)
(start symbol and length of PDSCH)
}
```

TABLE 28

```
PUSCH-TimeDomainResourceAllocationList information element
PUSCH-TimeDomainResourceAllocationList ::=   SEQUENCE (SIZE(1..maxNrofUL-
Allocations)) OF
PUSCH-TimeDomainResourceAllocation
PUSCH-TimeDomainResourceAllocation ::=      SEQUENCE {
  k2                                 INTEGER(0..32)        OPTIONAL,   --
Need S
(PDCCH-to-PUSCH timing, slot unit)
    mappingType                      ENUMERATED {typeA, typeB},
     (PUSCH mapping type)
 startSymbolAndLength              INTEGER (0..127)
     (start symbol and length of PUSCH)
}
```

The base station may notify the UF of one of the entries of the table regarding time domain resource allocation information described above through L1 signaling (for example, DCI) (for example, "time domain resource allocation" field in DCI may indicate the same). The UE may acquire time domain resource assignment information regarding a PDSCH or PUSCH, based on the DCI acquired from the base station.

Figure 11:
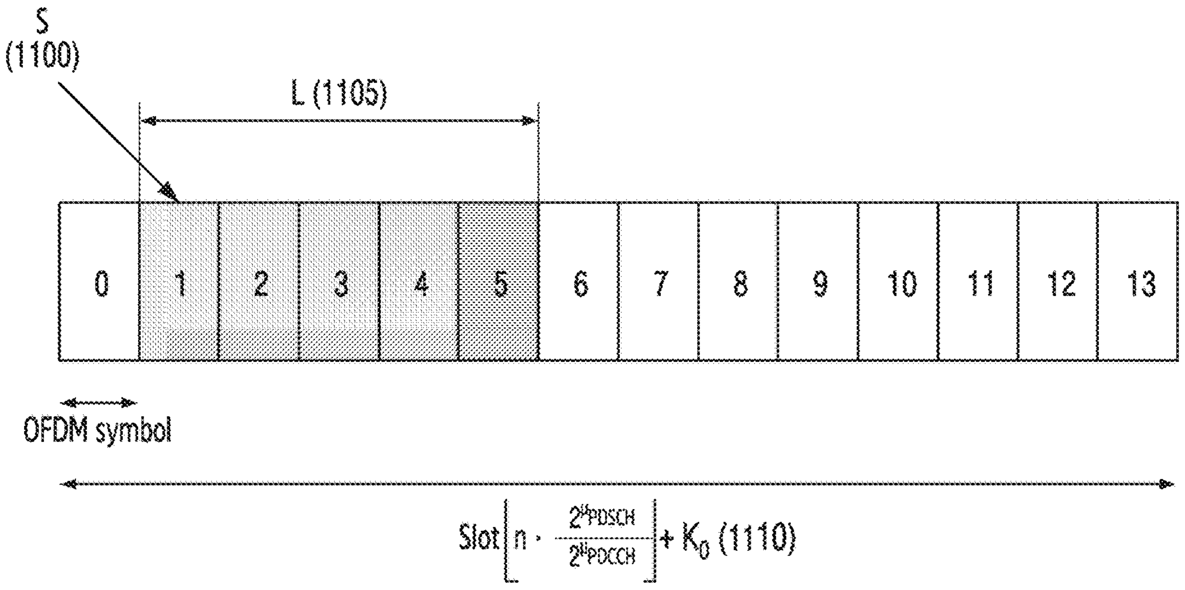
FIG. 11 illustrates time domain resource assignment with regard to a PDSCH in a wireless communication system according to an embodiment of the disclosure.

FIG. 11 illustrates time domain resource assignment with regard to a PDSCH in a wireless communication system according to an embodiment of the disclosure.

Referring to FIG. 11, the base station may indicate the time domain location of a PDSCH resource according to the subcarrier spacing (SCS) (μPDSCH, μPDCCH) of a data channel and a control channel configured by using an upper layer, the scheduling offset (K0) value, and the OFDM symbol start location 1100 and length 1105 within one slot dynamically indicated through DCI 1110.

[PUSCH: Regarding Transmission Scheme]

Next, a PUSCH transmission scheduling scheme will be described. PUSCH transmission may be dynamically scheduled by a UL grant inside DCI, or operated by means of configured grant Type 1 or Type 2. Dynamic scheduling indication regarding PUSCH transmission may be made by DCI format 0_0 or 0_1.

Configured grant Type 1 PUSCH transmission may be configured semi-statically by receiving configuredGrant-Config including rrc-ConfiguredUplinkGrant in Table 29 through upper signaling, without receiving a UL grant inside DCI. Configured grant Type 2 PUSCH transmission may be scheduled semi-persistently by a UL grant inside DCI after receiving configuredGrantConfig not including rrc-Config-uredUplinkGrant in Table 29 through upper signaling. If PUSCH transmission is operated by a configured grant, parameters applied to the PUSCH transmission are applied through configuredGrantConfig (upper signaling) in Table 29 except for dataScramblingIdentityPUSCH, txConfig, codebookSubset, maxRank, and scaling of UCI-OnPUSCH, which are provided by pusch-Config (upper signaling) in Table 30. If provided with transformPrecoder inside configuredGrantConfig (upper signaling) in Table 29, the UE applies tp-pi2BPSK inside pusch-Config in Table 30 to PUSCH transmission operated by a configured grant.

TABLE 29

```
ConfiguredGrantConfig ::=                  SEQUENCE {
   frequencyHopping                               ENUMERATED {intraSlot, interSlot}
OPTIONAL,    -- Need S,
   cg-DMRS-Configuration                      DMRS-UplinkConfig,
   mcs-Table                                    ENUMERATED {qam256, qam64LowSE}
OPTIONAL,    -- Need S
   mcs-TableTransformPrecoder                   ENUMERATED {qam256, qam64LowSE}
OPTIONAL,    -- Need S
   uci-OnPUSCH                                    SetupRelease { CG-UCI-OnPUSCH }
OPTIONAL,    -- Need M
   resourceAllocation                         ENUMERATED { resourceAllocationType0,
resourceAllocationType1, dynamicSwitch },
```

TABLE 29-continued

```
  rbg-Size                                             ENUMERATED {config2}
OPTIONAL,   -- Need S
  powerControlLoopToUse                   ENUMERATED {n0, n1},
  p0-PUSCH-Alpha                        P0-PUSCH-AlphaSetId,
  transformPrecoder                              ENUMERATED {enabled, disabled}
OPTIONAL,   -- Need S
  nrofHARQ-Processes                     INTEGER(1..16),
  repK                            ENUMERATED {n1, n2, n4, n8},
  repK-RV                                ENUMERATED {s1-0231, s2-0303, s3-0000}
OPTIONAL,   -- Need R
  periodicity                      ENUMERATED {
                                    sym2, sym7, sym1x14, sym2x14, sym4x14, sym5x14,
sym8x14, sym10x14, sym16x14, sym20x14,
                                    sym32x14, sym40x14, sym64x14, sym80x14,
sym128x14, sym160x14, sym256x14, sym320x14, sym512x14,
                                    sym640x14, sym1024x14, sym1280x14,
sym2560x14, sym5120x14,
                                    sym6, sym1x12, sym2x12, sym4x12, sym5x12,
sym8x12, sym10x12, sym16x12, sym20x12, sym32x12,
                                    sym40x12, sym64x12, sym80x12, sym128x12,
sym160x12, sym256x12, sym320x12, sym512x12, sym640x12,
                                    sym1280x12, sym2560x12
  },
  configuredGrantTimer                           INTEGER (1..64)
OPTIONAL,   -- Need R
  rrc-ConfiguredUplinkGrant                 SEQUENCE {
    timeDomainOffset                       INTEGER (0..5119),
    timeDomainAllocation                     INTEGER (0..15),
    frequencyDomainAllocation                  BIT STRING (SIZE(18)),
    antennaPort                        INTEGER (0..31),
    dmrs-SeqInitialization                         INTEGER (0..1)
OPTIONAL,   -- Need R
    precodingAndNumberOfLayers                 INTEGER (0..63),
    srs-ResourceIndicator                          INTEGER (0..15)
OPTIONAL,   -- Need R
    mcsAndTBS                        INTEGER (0..31),
    frequencyHoppingOffset                          INTEGER (1..
maxNrofPhysicalResourceBlocks-1)               OPTIONAL,   -- Need R
    pathlossReferenceIndex                         INTEGER (0..maxNrofPUSCH-
PathlossReferenceRSs-1),
    ...
  }                                                  OPTIONAL,
-- Need R
  ...
}
```

Next, a PUSCH transmission method will be described. The DMRS antenna port for PUSCH transmission is identical to an antenna port for SRS transmission. PUSCH transmission may follow a codebook-based transmission method and a non-codebook-based transmission method according to whether the value of txConfig inside pusch-Config in Table 30, which is upper signaling, is "codebook" or "nonCodebook".

As described above, PUSCH transmission may be dynamically scheduled through DCI format 0_0 or 0_1, and may be operated semi-statically configured by a configured grant. Upon receiving indication of scheduling regarding PUSCH transmission through DCI format 0_0, the UE performs beam configuration for PUSCH transmission by using pucch-spatialRelationInfoID corresponding to a UE-specific PUCCH resource corresponding to the minimum ID inside an activated uplink BWP inside a serving cell, and the PUSCH transmission is based on a single antenna port. The UE does not expect scheduling regarding PUSCH transmission through DCI format 0_0 inside a BWP having no configured PUCCH resource including pucch-spatialRelationInfo. If the UE has no configured txConfig inside pusch-Config in Table 30, the UE does not expect scheduling through DCI format 0_1.

TABLE 30

```
PUSCH-Config ::=                         SEQUENCE {
  dataScramblingIdentityPUSCH                    INTEGER (0..1023)
OPTIONAL,   -- Need S
  txConfig                                ENUMERATED {codebook, nonCodebook}
OPTIONAL,   -- Need S
  dmrs-UplinkForPUSCH-MappingTypeA              SetupRelease { DMRS-
UplinkConfig }                            OPTIONAL,   -- Need M
  dmrs-UplinkForPUSCH-MappingTypeB              SetupRelease { DMRS-
UplinkConfig }                            OPTIONAL,   -- Need M
  pusch-PowerControl                              PUSCH-PowerControl
OPTIONAL,   -- Need M
  frequencyHopping                          ENUMERATED {intraSlot, interSlot}
OPTIONAL,   -- Need S
```

TABLE 30-continued

```
  frequencyHoppingOffsetLists              SEQUENCE (SIZE (1..4)) OF INTEGER (1..
maxNrofPhysicalResourceBlocks−1)
                                                      OPTIONAL,
-- Need M
  resourceAllocation                       ENUMERATED { resourceAllocationType0,
resourceAllocationType1, dynamicSwitch},
  pusch-TimeDomainAllocationList                SetupRelease { PUSCH-
TimeDomainResourceAllocationList }           OPTIONAL,   -- Need M
  pusch-AggregationFactor                      ENUMERATED { n2, n4, n8 }
OPTIONAL,   -- Need S
  mcs-Table                                 ENUMERATED {qam256, qam64LowSE}
OPTIONAL,   -- Need S
  mcs-TableTransformPrecoder                ENUMERATED {qam256, qam64LowSE}
OPTIONAL,   -- Need S
  transformPrecoder                          ENUMERATED {enabled, disabled}
OPTIONAL,   -- Need S
  codebookSubset                          ENUMERATED {fullyAndPartialAndNonCoherent,
partialAndNonCoherent,nonCoherent}
                                                   OPTIONAL, -- Cond
codebookBased
  maxRank                              INTEGER (1..4)             OPTIONAL,
-- Cond codebookBased
  rbg-Size                            ENUMERATED { config2}         OPTIONAL,
-- Need S
  uci-OnPUSCH                               SetupRelease { UCI-OnPUSCH}
OPTIONAL, -- Need M
  tp-pi2BPSK                                  ENUMERATED {enabled}
OPTIONAL, -- Need S
  ...
}
```

Next, codebook-based PUSCH transmission will be described. The codebook-based PUSCH transmission may be dynamically scheduled through DCI format 0_0 or 0_1, and may be operated semi-statically by a configured grant. If a codebook-based PUSCH is dynamically scheduled through DCI format 0_1 or configured semi-statically by a configured grant, the UE determines a precoder for PUSCH transmission, based on an SRS resource indicator (SRI), a transmission precoding matrix indicator (TPMI), and a transmission rank (the number of PUSCH transmission layers).

The SRI may be given through the SRS resource indicator (a field inside DCI) or configured through srs-ResourceIndicator (upper signaling). During codebook-based PUSCH transmission, the UE has at least one SRS resource configured therefor, and may have a maximum of two SRS resources configured therefor. If the UE is provided with the SRI through DCI, the SRS resource indicated by the corresponding SRI refers to the SRS resource corresponding to the SRI, among SRS resources transmitted prior to the PDCCH including the corresponding SRI. In addition, the TPMI and the transmission rank may be given through "precoding information and number of layers" (a field inside DCI) or configured through precodingAndNumberOfLayers (upper signaling). The TPMI is used to indicate a precoder to be applied to PUSCH transmission. If one SRS resource is configured for the UE, the TPMI may be used to indicate a precoder to be applied in the configured one SRS resource. If multiple SRS resources are configured for the UE, the TPMI is used to indicate a precoder to be applied in an SRS resource indicated through the SRI.

The precoder to be used for PUSCH transmission is selected from an uplink codebook having the same number of antenna ports as the value of nrofSRS-Ports inside SRS-Config (upper signaling). In connection with codebook-based PUSCH transmission, the UE determines a codebook subset, based on codebookSubset inside pusch-Config (upper signaling) and TPMI. The codebookSubset inside pusch-Config (upper signaling) may be configured to be one of "fully AndPartialAndNonCoherent", "partialAndNonCoherent", or "noncoherent", based on UE capability reported by the UE to the base station. If the UE reported "partialAndNonCoherent" as UE capability, the UE does not expect that the value of codebook Subset (upper signaling) will be configured as "fullyAndPartialAndNonCoherent". In addition, if the UE reported "nonCoherent" as UE capability, UE does not expect that the value of codebookSubset (upper signaling) will be configured as "fully AndPartialAndNonCoherent" or "partialAndNonCoherent". If nrofSRS-Ports inside SRS-ResourceSet (upper signaling) indicates two SRS antenna ports, the UE does not expect that the value of codebookSubset (upper signaling) will be configured as "partialAndNonCoherent".

The UE may have one SRS resource set configured therefor, wherein the value of usage inside SRS-ResourceSet (upper signaling) is "codebook", and one SRS resource may be indicated through an SRI inside the corresponding SRS resource set. If multiple SRS resources are configured inside the SRS resource set wherein the value of usage inside SRS-ResourceSet (upper signaling) is "codebook", the UE expects that the value of nrofSRS-Ports inside SRS-Resource (upper signaling) is identical for all SRS resources.

The UE transmits, to the base station, one or multiple SRS resources included in the SRS resource set wherein the value of usage is configured as "codebook" according to upper signaling, and the base station selects one from the SRS resources transmitted by the UE and indicates the UE to be able to transmit a PUSCH by using transmission beam information of the corresponding SRS resource. In connection with the codebook-based PUSCH transmission, the SRI is used as information for selecting the index of one SRS resource, and is included in DCI. Additionally, the base station adds information indicating the rank and TPMI to be used by the UE for PUSCH transmission to the DCI. Using the SRS resource indicated by the SRI, the UE applies, in performing PUSCH transmission, the precoder indicated by the rank and TPMI indicated based on the transmission beam of the corresponding SRS resource, thereby performing PUSCH transmission.

Next, non-codebook-based PUSCH transmission will be described. The non-codebook-based PUSCH transmission may be dynamically scheduled through DCI format 0_0 or 0_1, and may be operated semi-statically by a configured grant.

If at least one SRS resource is configured inside an SRS resource set wherein the value of usage inside SRS-ResourceSet (upper signaling) is "nonCodebook", non-codebook-based PUSCH transmission may be scheduled for the UE through DCI format 0_1. With regard to the SRS resource set wherein the value of usage inside SRS-ResourceSet (upper signaling) is "nonCodebook", one connected NZP CSI-RS resource (non-zero power CSI-RS) may be configured for the UE. The UE may calculate a precoder for SRS transmission by measuring the NZP CSI-RS resource connected to the SRS resource set. If the difference between the last received symbol of an aperiodic NZP CSI-RS resource connected to the SRS resource set and the first symbol of aperiodic SRS transmission in the UE is less than 42 symbols, the UE does not expect that information regarding the precoder for SRS transmission will be updated.

If the configured value of resourceType inside SRS-ResourceSet (upper signaling) is "aperiodic", the connected NZP CSI-RS is indicated by an SRS request which is a field inside DCI format 0_1 or 1_1. If the connected NZP CSI-RS resource is an aperiodic NZP CSI-RS resource, the existence of the connected NZP CSI-RS may be indicated with regard to the case in which the value of SRS request (a field inside DCI format 0_1 or 1_1) is not "00". The corresponding DCI should not indicate cross carrier or cross BWP scheduling. In addition, if the value of SRS request indicates the existence of a NZP CSI-RS, the NZP CSI-RS is positioned in the slot used to transmit the PDCCH including the SRS request field. In this case, TCI states configured for the scheduled subcarrier are not configured as QCL-TypeD.

If there is a periodic or semi-persistent SRS resource set configured, the connected NZP CSI-RS may be indicated through associatedCSI-RS inside SRS-ResourceSet (upper signaling). With regard to non-codebook-based transmission, the UE does not expect that spatialRelationInfo which is upper signaling regarding the SRS resource and associatedCSI-RS inside SRS-ResourceSet (upper signaling) will be configured together.

If multiple SRS resources are configured for the UE, the UE may determine a precoder to be applied to PUSCH transmission and the transmission rank, based on an SRI indicated by the base station. The SRI may be indicated through the SRS resource indicator (a field inside DCI) or configured through srs-ResourceIndicator (upper signaling). Similarly to the above-described codebook-based PUSCH transmission, if the UE is provided with the SRI through DCI, the SRS resource indicated by the corresponding SRI refers to the SRS resource corresponding to the SRI, among SRS resources transmitted prior to the PDCCH including the corresponding SRI. The UE may use one or multiple SRS resources for SRS transmission, and the maximum number of SRS resources that can be transmitted simultaneously in the same symbol inside one SRS resource set and the maximum number of SRS resources are determined by UE capability reported to the base station by the UE. SRS resources simultaneously transmitted by the UE occupy the same RB. The UE configures one SRS port for each SRS resource. There may be only one configured SRS resource set wherein the value of usage inside SRS-ResourceSet (upper signaling) is "nonCodebook", and a maximum of four SRS resources may be configured for non-codebook-based PUSCH transmission.

The base station transmits one NZP-CSI-RS connected to the SRS resource set to the UE, and the UE calculates the precoder to be used when transmitting one or multiple SRS resources inside the corresponding SRS resource set, based on the result of measurement when the corresponding NZP-CSI-RS is received. The UE applies the calculated precoder when transmitting, to the base station, one or multiple SRS resources inside the SRS resource set wherein the configured usage is "nonCodebook", and the base station selects one or multiple SRS resources from the received one or multiple SRS resources. In connection with the non-codebook-based PUSCH transmission, the SRI indicates an index that may express one SRS resource or a combination of multiple SRS resources, and the SRI is included in DCI. The number of SRS resources indicated by the SRI transmitted by the base station may be the number of transmission layers of the PUSCH, and the UE transmits the PUSCH by applying the precoder applied to SRS resource transmission to each layer.

[PUSCH: Preparation Procedure Time]

Next, a PUSCH preparation procedure time will be described. If a base station schedules a UE so as to transmit a PUSCH by using DCI format 0_0, 0_1, or 0_2, the UE may require a PUSCH preparation procedure time such that a PUSCH is transmitted by applying a transmission method (SRS resource transmission precoding method, the number of transmission layers, spatial domain transmission filter) indicated through DCI. The PUSCH preparation procedure time is defined in an NR system in consideration thereof. The PUSCH preparation procedure time of the UE may follow Equation 2 given below.

Equation 2

$$T_{proc,2} = \max((N_2 + d_{2,1} + d_2)(2048 + 144)\kappa 2^{-\mu} T_c + T_{ext} + T_{switch},\ d_{2,2})$$

Each parameter in $T_{proc,2}$ described above in Equation 2 may have the following meaning.

$N_2$: the number of symbols determined according to UE processing capability 1 or 2, based on the UE's capability, and numerology μ. $N_2$ may have a value in Table 31 if UE processing capability 1 is reported according to the UE's capability report, and may have a value in Table 32 if UE processing capability 2 is reported, and if availability of UE processing capability 2 is configured through upper layer signaling.

TABLE 31

| μ | PUSCH preparation time $N_2$ [symbols] |
|---|---|
| 0 | 10 |
| 1 | 12 |
| 2 | 23 |
| 3 | 36 |

TABLE 32

| μ | PUSCH preparation time $N_2$ [symbols] |
|---|---|
| 0 | 5 |
| 1 | 5.5 |
| 2 | 11 for frequency range 1 |

$d_{2,1}$: the number of symbols determined to be 0 if all resource elements of the first OFDM symbol of PUSCH transmission include DM-RSs, and to be 1 otherwise.

κ: 64

μ: follows a value, among $\mu_{DL}$ and $\mu_{UL}$, which makes $T_{proc,2}$ larger. $\mu_{DL}$ refers to the numerology of a downlink used to transmit a PDCCH including DCI that schedules a PUSCH, and $\mu_{UL}$ refers to the numerology of an uplink used to transmit a PUSCH.

$T_c$: has $1/(\Delta f_{max} \cdot N_f)$, $\Delta f_{max}=480 \cdot 10^3$ Hz, $N_f=4096$ . . .

$d_{2,2}$: follows a BWP switching time if DCI that schedules a PUSCH indicates BWP switching, and has 0 otherwise.

$d_2$: if OFDM symbols overlap temporally between a PUSCH having a high priority index and a PUCCH having a low priority index, the de value of the PUSCH having a high priority index is used. Otherwise, $d_2$ is 0.

$T_{ext}$: if the UE uses a shared spectrum channel access scheme, the UE may calculate $T_{ext}$ and apply the same to a PUSCH preparation procedure time. Otherwise, $T_{ext}$ is assumed to be 0.

$T_{switch}$: if an uplink switching spacing has been triggered, $T_{switch}$ is assumed to be the switching spacing time. Otherwise, $T_{switch}$ is assumed to be 0.

The base station and the UE determine that the PUSCH preparation procedure time is insufficient if the first symbol of a PUSCH starts earlier than the first uplink symbol in which a CP starts after $T_{proc,2}$ from the last symbol of a PDCCH including DCI that schedules the PUSCH, in view of the influence of timing advance between the uplink and the downlink and time domain resource mapping information of the PUSCH scheduled through the DCI. Otherwise (if the first symbol of a PUSCH does not start earlier than the first uplink symbol in which a CP starts after $T_{proc,2}$ from the last symbol of a PDCCH including DCI that schedules the PUSCH), the base station and the UE determine that the PUSCH preparation procedure time is sufficient. The UE may transmit the PUSCH only if the PUSCH preparation procedure time is sufficient, and may ignore the DCI that schedules the PUSCH if the PUSCH preparation procedure time is insufficient.

[PUSCH: Related to Repetition]

Hereinafter, repeated transmission of an uplink data channel in a 5G system will be described below. A 5G system supports two types of methods for repeatedly transmitting an uplink data channel, PUSCH repeated transmission type A and PUSCH repeated transmission type B. One of PUSCH repeated transmission type A and type B may be configured for a UE through upper layer signaling.

1. PUSCH Repeated Transmission Type A

As described above, the symbol length of an uplink data channel and the location of the start symbol may be determined by a time domain resource allocation method in one slot, and a base station may notify a UE of the number of repeated transmissions through upper layer signaling (for example, RRC signaling) or L1 signaling (for example, DCI).

Based on the number of repeated transmissions received from the base station, the UE may repeatedly transmit an uplink data channel having the same length and start symbol as the configured uplink data channel, in a continuous slot. If the base station configured a slot as a downlink for the UE, or if at least one of symbols of the uplink data channel configured for the UE is configured as a downlink, the UE omits uplink data channel transmission, but counts the number of repeated transmissions of the uplink data channel. For example, although included in the number of repeated transmissions of the uplink data channel, the uplink data channel may not be transmitted. Contrarily, the UE supporting Rel-17 uplink data repeated transmission may determine a slot capable of uplink data repeated transmission as an available slot, and may count the number of transmissions during uplink data channel repeated transmission in the slot determined as an available slot. If uplink data channel repeated transmission is omitted in the slot determined as an available slot, the UE may postpone uplink data channel repeated transmission till a next available slot without counting the corresponding omitted repeated transmission and then transmit same.

In order to determine an available slot as described above, if at least one symbol configured for a PUSCH by time domain resource allocation (TDRA) in a slot for PUSCH transmission overlaps a symbol for purposes other than uplink transmission (for example, downlink transmission), the corresponding slot is determined as an unavailable slot (for example, a slot other than an available slot, which is determined as being unavailable for PUSCH transmission). In addition, an available slot may be considered a resource for PUSCH transmission and an uplink resource for determining a transport block size (TBS) in PUSCH repeated transmission and multi-slot PUSCH transmission including one TB (transport block on multiple slots (TBoMS)).

2. PUSCH Repetition Type B

As described above, the starting symbol and the length of an uplink data channel may be determined in one slot by the time domain resource allocation method, and a base station may notify a UE of numberofrepetitions, which is a repetition count, through higher signaling (e.g., RRC signaling) or L1 signaling (e.g., DCI).

First, a nominal repetition of the uplink data channel is determined as below, based on the configured starting symbol and the length of the uplink data channel. A slot on which the n-$^{th}$ nominal repetition starts is given by $$K_S + \left\lfloor \frac{S + n \cdot L}{N_{symb}^{slot}} \right\rfloor,$$

and a symbol on which the nominal repetition starts in the slot is given by $$\mathrm{mod}(S + n \cdot L, N_{symb}^{slot}).$$

A slot on which the n-th nominal repetition ends is given by $$K_S + \left\lfloor \frac{S + (n+1)\cdot L - 1}{N_{symb}^{slot}} \right\rfloor,$$

and a symbol on which the nominal repetition ends in the slot is given by $$\mathrm{mod}\left(S + (n+1)\cdot L - 1,\ N_{symb}^{slot}\right).$$

Herein, n is equal to 0, . . . , numberofrepetitions−1 (n=0, . . . , numberofrepetitions−1), S denotes the configured starting symbol of the uplink data channel, and L denotes the configured symbol length of the uplink data channel. $K_s$ indicates a slot on which the PUSCH transmission starts, and $$N_{symb}^{slot}$$

indicates the number of symbols per slot.

The UE may determine an invalid symbol as a particular OFDM symbol in the following cases for PUSCH repetition type B.

A configured as downlink by tdd-UL-DL-symbol ConfigurationCommon or tdd-UL-DL-ConfigurationDedicated may be determined to be an invalid symbol for PUSCH repetition type B.

Symbols indicated by ssb-PositionsInBurst in the higher layer signaling ServingCellConfigCommon or ssb-PositionsInBurst in SIB1 for SSB reception in an unpaired spectrum (TDD spectrum) may be determined to be invalid symbols for PUSCH repetition type B.

Symbols indicated through pdcch-ConfigSIB1 in an MIB to transmit a control resource set connected to a Type0-PDCCH CSS set in an unpaired spectrum (TDD spectrum) may be determined to be invalid symbols for PUSCH repetition type B.

In an unpaired spectrum (TDD spectrum), if the higher layer signaling numberOfInvalidSymbolsForDL-UL-Switching is configured, symbols including as many symbols as indicated by numberOfInvalidSymbols-ForDL-UL-Switching starting from symbols configured to be downlink by tdd-UL-DL-Configuration-Common or tdd-UL-DL-ConfigurationDedicated may be determined to be invalid symbols.

Additionally, an invalid symbol may be configured based on a higher layer parameter (e.g., InvalidSymbolPattern). An invalid symbol may be configured by a higher layer parameter (e.g., InvalidSymbolPattern) providing a symbol level bitmap over one slot or two slots. In the bitmap, 1 indicates an invalid symbol. Additionally, the period and the pattern of the bitmap may be configured through a higher layer parameter (e.g., periodicityAndPattern). In a case where a higher layer parameter (e.g., InvalidSymbolPattern) is configured, if the parameter InvalidSymbolPatternIndicator-ForDCIFormat0_1 or InvalidSymbolPatternIndicator-ForDCIFormat0_2 indicates 1, the UE applies an invalid symbol pattern, and if the parameter indicates 0, the UE does not apply an invalid symbol pattern. If a higher layer parameter (e.g., InvalidSymbolPattern) is configured, and the parameter InvalidSymbolPatternIndicator-ForDCIFormat0_1 or InvalidSymbolPatternIndicator-ForDCIFormat0_2 is not configured, the UE applies an invalid symbol pattern.

After invalid symbols are determined, the UE may consider symbols other than the invalid symbols to be valid symbols with respect to each nominal repetition. If one or more valid symbols are included in each nominal repetition, the nominal repetition may include one or more actual repetitions. Each actual repetition includes consecutive sets of valid symbols available for PUSCH repetition type B in one slot. If the OFDM symbol length of a nominal repetition is not 1 and the length of an actual repetition is 1, the UE may disregard transmission on the actual repetition.

Figure 12:
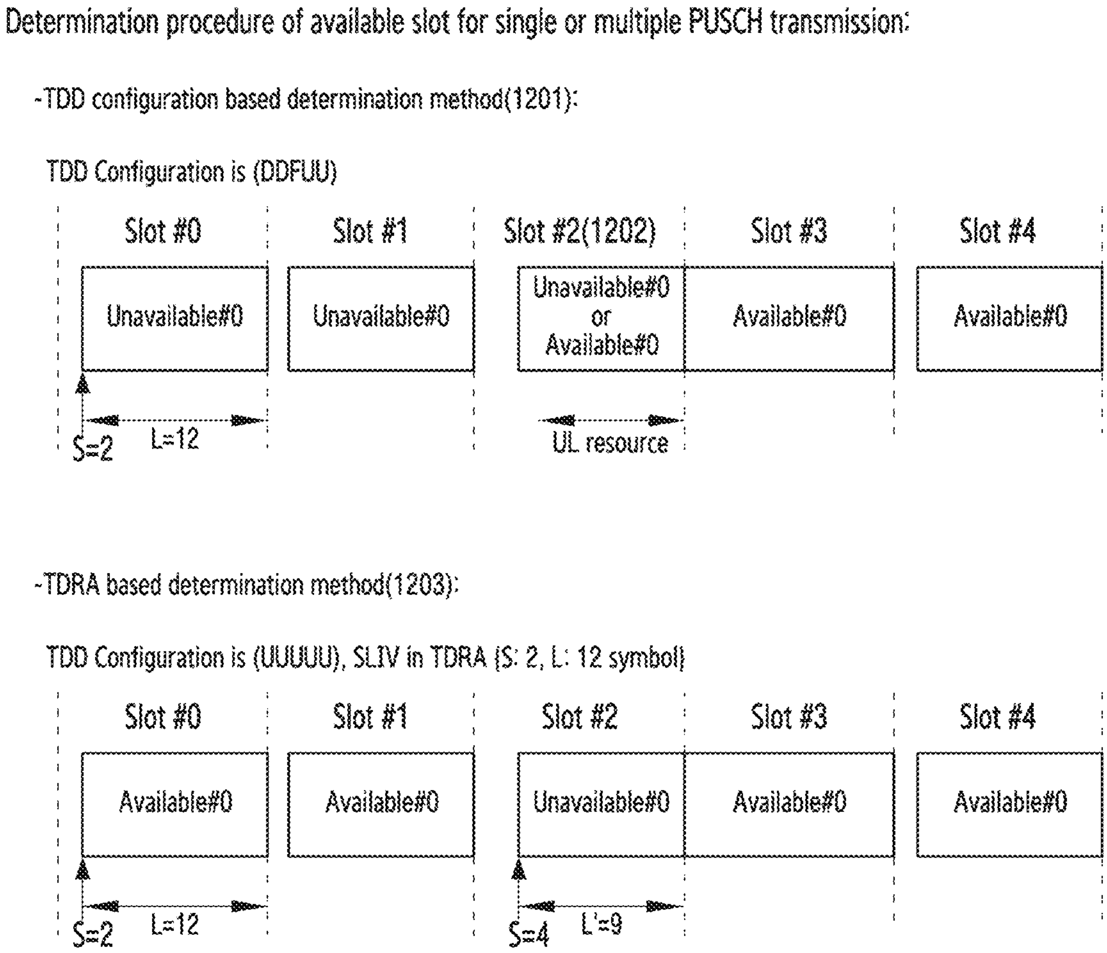
FIG. 12 is a diagram illustrating a method for determining an available slot at a time of PUSCH repetition type A transmission of a terminal in a 5G system according to an embodiment of the disclosure.

FIG. 12 is a diagram illustrating a method for determining an available slot at a time of PUSCH repetition type A transmission of a UE in a 5G system according to an embodiment of the disclosure.

Referring to FIG. 12, when a base station configures an uplink resource through higher layer signaling (e.g., tdd-UL-DL-ConfigurationCommon or tdd-UL-DL-ConfigurationDedicated) or L1 signaling (e.g., dynamic slot format indicator), the base station and a UE may determine an available slot according to the following two methods with respect to the configured uplink resource.

(1) Available slot determination method based on TDD configuration (2) Available slot determination method considering TDD configuration and time domain resource allocation (TDRA), configured grant (CG) configuration, or activation DCI As an example of an available slot determination method based on a TDD configuration, as illustrated in FIG. 12, if a TDD configuration is configured as "DDFUU" through higher layer signaling, the base station and the UE may determine slot #3 and slot #4 configured as "U" indicating uplink as available slots, based on the TDD configuration (1201). Slot #2 1202 configured as "F" indicating a flexible slot, based on the TDD configuration may be determined as an unavailable slot or an available slot, and for example, may be predefined through a base station configuration.

As an example of an available slot determination method considering a TDD configuration and time domain resource allocation (TDRA), and a CG configuration or activation DCI, as illustrated in FIG. 12, if a TDD configuration is configured as "UUUUU" through higher layer signaling and the start and length indicator value (SLIV) of a PUSCH transmission is configured as {S: 2, L: 12 symbol} through L1 signaling, the base station and the UE may determine, for the configured uplink slots "U", slot #0, slot #1, slot #3, and slot #4 satisfying the SLIV of the PUSCH as available slots. The base station and the UE may determine, as an unavailable slot, slot #2 ("L=9"≤ SLIV "L=12") not satisfying the SLIV that is a TDRA condition for PUSCH transmission (1203). This is merely for an example and does not limit the scope of the disclosure to PUSCH transmission, and may be also applied to PUCCH transmission, PUSCH/PUCCH repetition, nominal repetition of PUSCH repetition type B, and TBoMS.

Figure 13:
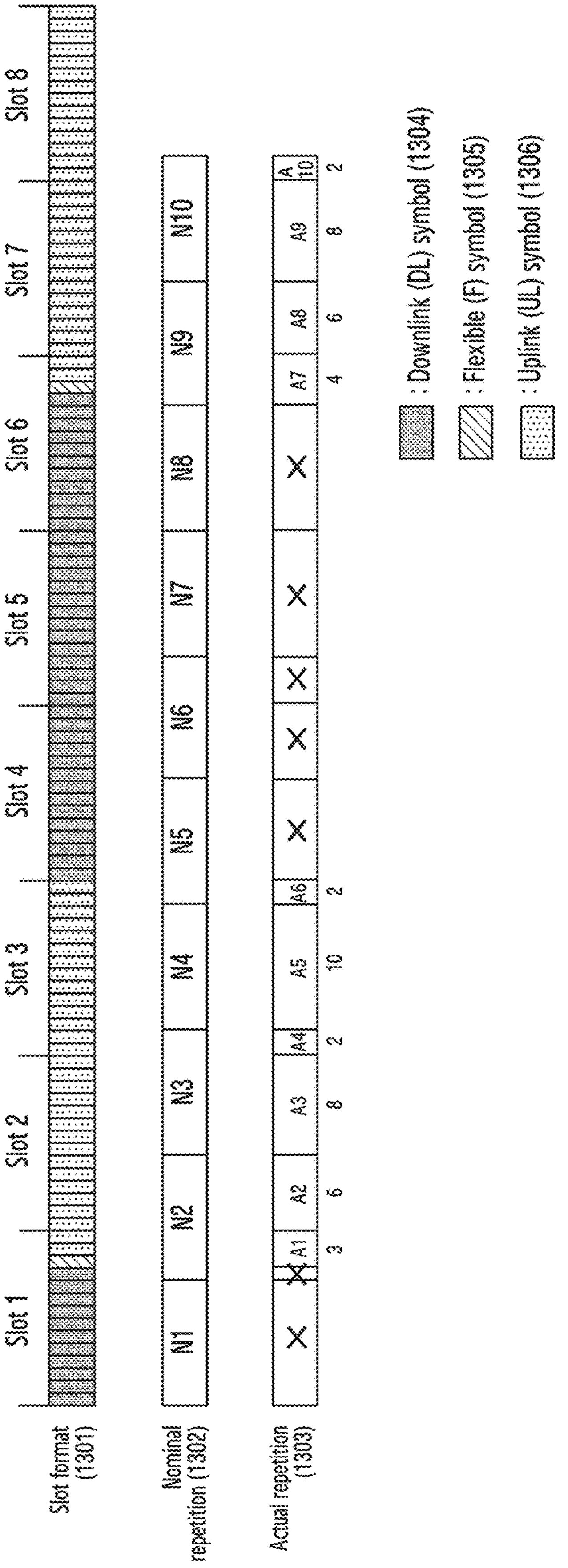
FIG. 13 illustrates physical uplink shared channel (PUSCH) repeated transmission type B in a wireless communication system according to an embodiment of the disclosure.

FIG. 13 is a diagram illustrating PUSCH repetition type B in a wireless communication system according to an embodiment of the disclosure.

Referring to FIG. 13, it illustrates an example of a case where 0 is configured as the transmission starting symbol S and 10 is configured as the transmission symbol length for the UE for nominal repetitions, and 10 is configured as a repetition count, and the nominal repetitions may be represented by N1 to N10 in FIG. 13 (1302). The UE may determine invalid symbols based on a slot format 1301 to determine actual repetitions, and the actual repetitions may be represented by A1 to A10 in the diagram (1303). According to the above method of determining invalid symbols and actual repetitions, PUSCH repetition type B is not transmitted on a symbol determined to be DL as a slot format, and if there is a slot boundary in a nominal repetition, the nominal repetition may be divided into two actual repetitions, based on the slot boundary and then be transmitted. For example, A1 meaning the first actual repetition is configured by three OFDM symbols, and A2 transmittable next may be configured by six OFDM symbols.

In addition, with regard to PUSCH repeated transmission, additional methods may be defined in NR Release 16 with regard to UL grant-based PUSCH transmission and configured grant-based PUSCH transmission, across slot boundaries, as follows:

- Method 1 (mini-slot level repetition): through one UL grant, two or more PUSCH repeated transmissions are scheduled inside one slot or across the boundary of consecutive slots. In connection with method 1, time domain resource allocation information inside DCI indicates resources of the first repeated transmission. In addition, time domain resource information of remaining repeated transmissions may be determined according to time domain resource information of the first repeated transmission, and the uplink (1306) or downlink (1304) direction determined with regard to each symbol (e.g., flexible (F) symbol 1305) of each slot. Each repeated transmission occupies consecutive symbols.
- Method 2 (multi-segment transmission): through one UL grant, two or more PUSCH repeated transmissions are scheduled in consecutive slots. Transmission no. 1 is designated for each slot, and the start point or repetition length differs between respective transmissions. In method 2, time domain resource allocation information inside DCI indicates the start point and repetition length of all repeated transmissions. In the case of performing repeated transmissions inside a single slot through method 2, if there are multiple bundles of consecutive uplink symbols in the corresponding slot, respective repeated transmissions may be performed with regard to respective uplink symbol bundles. If there is a single bundle of consecutive uplink symbols in the corresponding slot, PUSCH repeated transmission is performed once according to the method of NR Release 15.
- Method 3: two or more PUSCH repeated transmissions are scheduled in consecutive slots through two or more UL grants. Transmission no. 1 is designated for each slot, and the nth UL grant may be received before PUSCH transmission scheduled by the (n−1)th UL grant is over.
- Method 4: through one UL grant or one configured grant, one or multiple PUSCH repeated transmissions inside a single slot, or two or more PUSCH repeated transmissions across the boundary of consecutive slots may be supported. The number of repetitions indicated to the UE by the base station is only a nominal value, and the UE may actually perform a larger number of PUSCH repeated transmissions than the nominal number of repetitions. Time domain resource allocation information inside DCI or configured grant refers to resources of the first repeated transmission indicated by the base station. Time domain resource information of remaining repeated transmissions may be determined with reference to resource information of the first repeated transmission and the uplink or downlink direction of symbols. If time domain resource information of a repeated transmission indicated by the base station spans a slot boundary or includes an uplink/downlink switching point, the corresponding repeated transmission may be divided into multiple repeated transmissions. One repeated transmission may be included in one slot with regard to each uplink period.

[PUSCH: Frequency Hopping Process]

Hereinafter, frequency hopping of a physical uplink shared channel (PUSCH) in a 5G system will be described below.

5G supports two kinds of PUSCH frequency hopping methods with regard to each PUSCH repeated transmission type. First of all, in PUSCH repeated transmission type A, intra-slot frequency hopping and inter-slot frequency hopping are supported, and in PUSCH repeated transmission type B, inter-repetition frequency hopping and inter-slot frequency hopping are supported.

The intra-slot frequency hopping method supported in PUSCH repeated transmission type A is a method in which a UE transmits allocated resources in the frequency domain, after changing the same by a configured frequency offset, by two hops in one slot. The start RB of each hop in connection with intra-slot frequency hopping may be expressed by Equation 3 below.

$$RB_{start} = \begin{cases} RB_{start} & i = 0 \\ (RB_{start} + RB_{offset}) \bmod N_{BWP}^{size} & i = 1 \end{cases} \quad \text{Equation 3}$$

In Equation 3, i=0 and i=1 denotes the first and second hops, respectively, and $RB_{start}$ denotes the start RB in a UL BWP and is calculated from a frequency resource allocation method. $RB_{offset}$ denotes a frequency offset between two hops through an upper layer parameter. The number of symbols of the first hop may be represented by $$\lfloor N_{symb}^{PUSCH,s}/2 \rfloor,$$

and number of symbols of the second hop may be represented by $$\lfloor N_{symb}^{PUSCH,s} - \lfloor N_{symb}^{PUSCH,s}/2 \rfloor \cdot N_{symb}^{PUSCH,s}$$

is the length of PUSCH transmission in one slot and is expressed by the number of OFDM symbols.

Next, the inter-slot frequency hopping method supported in PUSCH repeated transmission types A and B is a method in which the UE transmits allocated resources in the frequency domain, after changing the same by a configured frequency offset, in each slot. The start RB during $$n_s^{\mu}$$

slots in connection with inter-slot frequency hopping may be expressed by Equation 4 below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{Equation 4}$$

In Equation 4, $$n_s^\mu$$

denotes the current slot number during multi-slot PUSCH transmission, and $RB_{start}$ denotes the start RB inside a UL BWP and may be calculated from a frequency resource allocation method. $RB_{offset}$ may denote a frequency offset between two hops through an upper layer parameter.

The inter-repetition frequency hopping method supported in PUSCH repeated transmission type B is a method in which resources allocated in the frequency domain regarding one or multiple actual repetitions in each nominal repetition are moved by a configured frequency offset and then transmitted. The index $RB_{start}(n)$ of the start RB in the frequency domain regarding one or multiple actual repetitions in the nth nominal repetition may follow Equation 5 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 5}$$

In Equation 5, n denotes the index of nominal repetition, and $RB_{offset}$ denotes an RB offset between two hops through an upper layer parameter.

[PUSCH: Related to Transmission Power]

Hereinafter, a method of determining the transmission power of an uplink data channel in a 5G system will be described below.

In a 5G system, the transmission power of an uplink data channel may be determined through Equation 6 as follows.

Equation 6

$$P_{PUSCH,b,f,c}(i, j, q_d, l) = \min\left\{ \begin{matrix} P_{CMAX,f,c}(i), \\ P_{0\_PUSCH,b,f,c}(j) + 10\log_{10}\left(2^\mu \cdot M_{RB,b,f,c}^{PUSCH}(i)\right) + \alpha_{b,f,c}(j) \cdot \\ PL_{b,f,c}(q_d) + \Delta_{TF,b,f,c}(i) + f_{b,f,c}(i, l) \end{matrix} \right\} [\text{dBm}]$$

In Equation 6, j denotes the grant type of a PUSCH. Specifically, j=0 indicates a PUSCH grant for a random access response, j=1 indicates a configured grant, and $j \in \{2, 3, \ldots J-1\}$ indicates a dynamic grant. $P_{CMAX,f,c}(i)$ denotes a maximum output power configured for a UE at a carrier f of a supported cell c for PUSCH transmission occasion i. $P_{0\_PUSCH,b,f,c}(j)$ is a parameter configured by the sum of $P_{0\_NOMINAL\_PUSCH,f,c}(j)$ configured as a higher layer parameter and $P_{0\_UE\_PUSCH,b,f,c}(j)$ which may be determined through a higher layer configuration and an SRI (in a case of a dynamic grant PUSCH).

$$M_{RB,b,f,c}^{PUSCH}(i)$$

denotes a bandwidth for resource allocation represented by the number of resource blocks for PUSCH transmission occasion i, and $\Delta_{TF,b,f,c}(i)$ denotes a value determined according to a modulation coding scheme (MCS) and the type (e.g., whether UL-SCH is included or CSI is included) of information transmitted through a PUSCH. $\alpha_{b,f,c}(j)$ is a value for compensating for path loss and indicates a value that may be determined through a higher layer configuration and a SRS resource indicator (SRI) (in a case of a dynamic grant PUSCH). $PL_{b,f,c}(q_d)$ denotes a downlink path loss estimation estimated by a UE through a reference signal having a reference signal index of qd, and the reference signal index qd may be determined by a UE through a higher layer configuration and an SRI (in a case of a dynamic grant PUSCH or a configured grant PUSCH (type 2 configured grant PUSCH) based on ConfiguredGrantConfig not including the higher layer configuration rrc-ConfiguredUplinkGrant) or through a higher layer configuration. $f_{b,f,c}(i, l)$ is a closed loop power control value and may be supported in an accumulation scheme and an absolute scheme. If the higher layer parameter tpc-Accumulation is not configured for a UE, a closed loop power control value may be determined in the accumulation scheme. $f_{b,f,c}(i, l)$ is determined by $$f_{b,f,c}(i - i_0, l) + \sum_{m=0}^{S(D_i)-1} \delta_{PUSCH,b,f,c}(m, l)$$

that indicates a sum of a closed loop power control value of the previous PUSCH transmission occasion i-i0 and TPC command values for closed loop index 1 received through DCI, between a symbol before KPUSCH(i-i0)−1 symbols before transmission of a PUSCH transmission occasion i-i0 and a symbol before KPUSCH(i) symbols before transmission of PUSCH transmission occasion i. If the higher layer parameter tpc-Accumulation is configured for a UE, $f_{b,f,c}(i, l)$ is determined as $\delta_{PUSCH,b,f,c}(i, l)$ that indicates a TPC command value for closed loop index 1 received through DCI. Closed loop index 1 may be configured to be 0 or 1 if the higher layer parameter twoPUSCH-PC-AdjustmentStates is configured for a UE, and the value thereof may be determined through a higher layer configuration and an SRI (in a case of a dynamic grant PUSCH). The mapping relation between a TPC command field in DCI and a TPC value $\delta_{PUSCH,b,f,c}$ according to the accumulation scheme and the absolute scheme may be defined as shown in Table 33 as below.

TABLE 33

| TPC command field | Accumulated $\delta_{PUSCH,b,f,c}$[dB] | Absolute $\delta_{PUSCH,b,f,c}$[dB] |
|---|---|---|
| 0 | −1 | −4 |
| 1 | 0 | −1 |
| 2 | 1 | 1 |
| 3 | 3 | 4 |

[Regarding UE Capability Report]

In LTE and NR, a UE may perform a procedure in which, while being connected to a serving base station, the UE may report capability supported by the UE to the corresponding base station. In the following description, the above-described procedure will be referred to as a UE capability report.

According to an embodiment of the disclosure, the base station may transfer a UE capability enquiry message to the UE in a connected state so as to request a capability report. The message may include a UE capability request with regard to each radio access technology (RAT) type of the base station. The RAT type-specific request may include supported frequency band combination information and the like. In addition, in the case of the UE capability enquiry message, UE capability with regard to multiple RAT types may be requested through one RRC message container transmitted by the base station, or the base station may transfer a UE capability enquiry message including multiple UE capability requests with regard to respective RAT types. For example, a capability enquiry may be repeated multiple times in one message, and the UE may configure a UE capability information message corresponding thereto and report the same multiple times.

According to an embodiment of the disclosure, in next-generation mobile communication systems, a UE capability request may be made regarding multi-RAT dual connectivity (MR-DC), such as NR, LTE, E-UTRA-NR dual connectivity (EN-DC). The UE capability enquiry message may be transmitted initially after the UE is connected to the base station, in general, but may be requested in any condition if needed by the base station.

According to an embodiment of the disclosure, upon receiving the UE capability report request from the base station, the UE may configure UE capability according to band information and RAT type requested by the base station. The method in which the UE configures UE capability in an NR system is summarized below.

1. If the UE receives a list regarding LTE and/or NR bands from the base station at a UE capability request, the UE may construct band combinations (BCs) regarding EN-DC and NR standalone (SA). For example, the UE may configure a candidate list of BCs regarding EN-DC and NR SA, based on bands received from the base station at a request through FreqBandList. Bands may have priority in the order described in FreqBandList.
2. If the base station has set "eutra-nr-only" flag or "eutra" flag and requested a UE capability report, the UE may remove everything related to NR SA BCs from the configured BC candidate list. Such an operation may occur only if an LTE base station (eNB) requests "eutra" capability.
3. The UE may then remove fallback BCs from the BC candidate list configured in the above step. As used herein, a fallback BC may refer to a BC that can be obtained by removing a band corresponding to at least one secondary cell (SCell) from a specific BC, and since a BC before removal of the band corresponding to at least one SCell can already cover a fallback BC, the same may be omitted. This step is applied in MR-DC as well, that is, LTE bands are also applied. BCs remaining after the above step constitute the final "candidate BC list".
4. The UE may select BCs appropriate for the requested RAT type from the final "candidate BC list" and select BCs to report. In this step, the UE may configure supportedBandCombinationList in a determined order. For example, the UE may configure BCs and UE capability to report according to a preconfigured rat-Type order. (nr->eutra-nr->eutra). In addition, the UE may configure featureSetCombination regarding the configured supportedBandCombinationList, and configure a list of "candidate feature set combinations" from a candidate BC list from which a list regarding fallback BCs (including capability of the same or lower step) is removed. The "candidate feature set combinations" may include all feature set combinations regarding NR and EUTRA-NR BCs, and may be acquired from feature set combinations of containers of UE-NR-Capabilities and UE-MRDC-Capabilities.
5. If the requested RAT type is eutra-nr and has an influence, featureSetCombinations may be included on both containers of UE-MRDC-Capabilities and UE-NR-Capabilities. However, the feature set of NR may be included only in UE-NR-Capabilities. According to an embodiment of the disclosure, after the UE capability is configured, the UE may transfer a UE capability information message including the UE capability to the base station. The base station performs scheduling and transmission/reception management appropriate for the UE, based on the UE capability received from the UE.

[Related to NC-JT]

According to an embodiment of the disclosure, non-coherent joint transmission (NC-JT) may be used to enable a UE to receive a PDSCH from multiple TRPs.

According to an embodiment of the disclosure, unlike the system of the related art, a 5G wireless communication system may support all services including a service having very short transmission delay and a service requiring high connection density, as well as a service requiring high data rate. In a wireless communication network including multiple cells, transmission and reception points (TRPs), or beams, cooperative communication (coordinated transmission) between cells, TRPs, and/or beams may increase the strength of a signal received by a UE or efficiently perform interference control between cells, TRPs, and/or beams so as to satisfy various service requirements.

According to an embodiment of the disclosure, joint transmission (JT) is a representative transmission technology for cooperative communication described above, and transmits a signal to one UE through multiple different cells, TRPs, and/or beams so as to increase the strength of the signal received by the UE or a processing rate. Channels between cells, TRPs, and/or beams and the UE may have large difference in the characteristic thereof. Particularly, in a case of non-coherent joint transmission (NC-JT) supporting non-coherent precoding between cells, TRPs, and/or beams, individual precoding, an MCS, resource allocation, and TCI indication may be required according to a channel characteristic for each of links between the UE and the cells, TRPs, and/or beams.

NC-JT described above may be applied to at least one channel among a downlink data channel (PDSCH), a downlink control channel (PDCCH), an uplink data channel (PUSCH), and an uplink control channel (PUCCH). Transmission information, such as precoding, MCS, resource allocation, and/or TCI, may be indicated by DL DCI at the time of PDSCH transmission. For NC-JT, the transmission information is required to be independently indicated for each cell, TRP, and/or beam. This is a main reason of increasing a payload required for DL DCI transmission and may adversely affect the reception performance of a PDCCH transmitting DCI. Therefore, in order to support JT of a PDSCH, careful design of the tradeoff between the amount of DCI information and the reception performance of control information is necessary.

Figure 14:
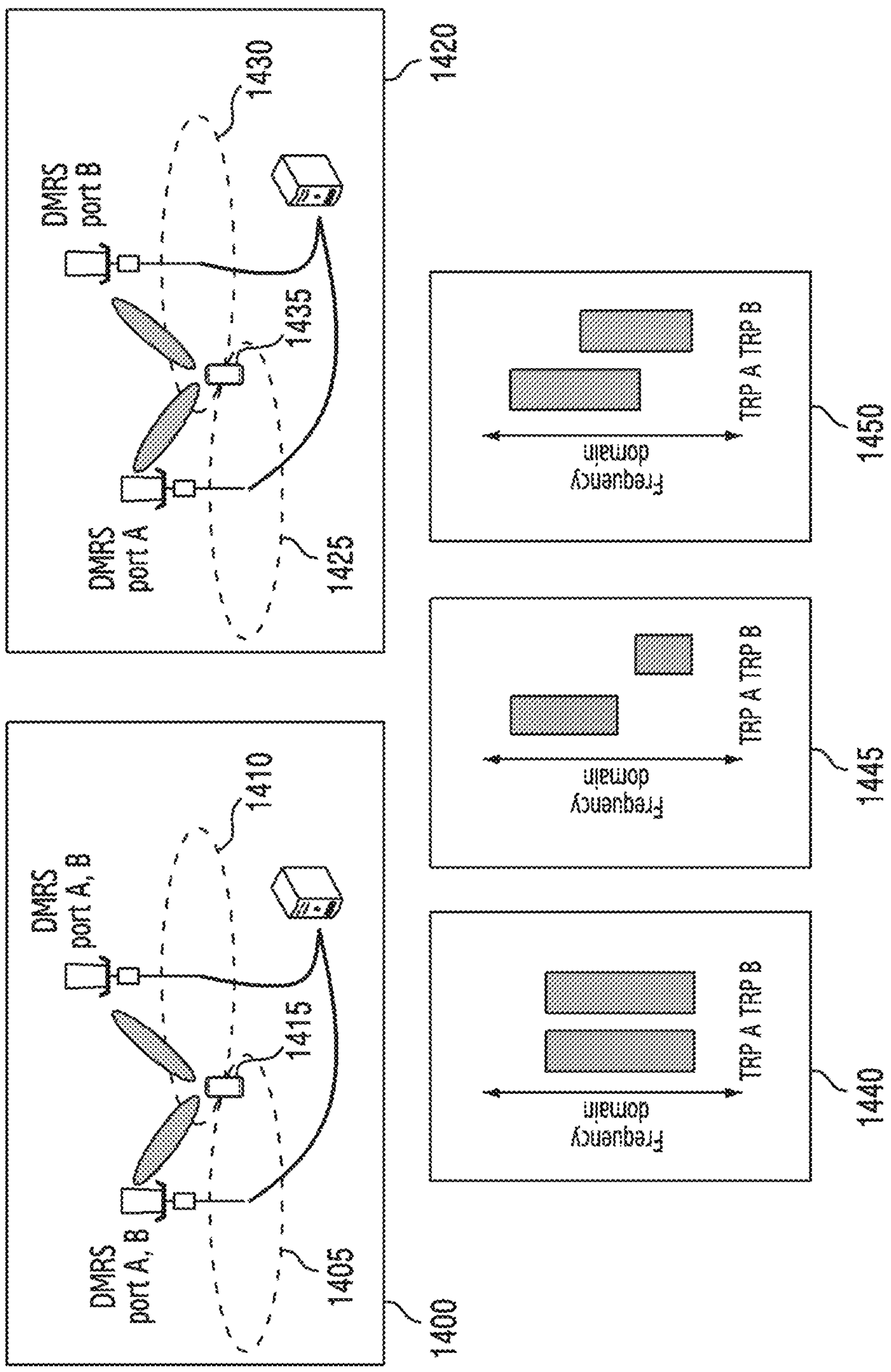
FIG. 14 is a diagram illustrating an antenna port configuration and resource allocation for cooperative communication in a wireless communication system according to an embodiment of the disclosure.

FIG. 14 is a diagram illustrating an antenna port configuration and resource allocation for transmitting a PDSCH by using cooperative communication in a wireless communication system according to an embodiment of the disclosure.

Referring to FIG. 14, an example for PDSCH transmission is described for each joint transmission (JT) technique, and embodiments for allocating a wireless resource for each TRP are illustrated.

Referring to FIG. 14, an example 1400 for coherent joint transmission (C-JT) supporting coherent precoding between cells, TRPs, and/or beams is illustrated.

According to an embodiment of the disclosure, in a case of C-JT, TRP A 1405 and TRP B 1400 transmit single data (PDSCH) to a UE 1415 or 1435, and multiple TRPs may perform joint precoding. This may imply that a DMRS is transmitted through the same DMRS ports to allow TRP A 1405 and TRP B 1410 to transmit the same PDSCH. For example, each of TRP A 1405 or 1425 and TRP B 1410 may transmit a DMRS to the UE through DMRS port A and DMRS B. In this case, the UE may receive one piece of DCI information for receiving one PDSCH demodulated based on the DMRS transmitted through DMRS port A and DMRS B.

FIG. 14 illustrates an example 1420 of non-coherent joint transmission (NC-JT) supporting non-coherent precoding between cells, TRPs, and/or beams for PDSCH transmission according to an embodiment.

According to an embodiment of the disclosure, in a case of NC-JT, cells, TRPs, and/or beams transmit respective PDSCHs to a UE 1435, and individual precoding may be applied to each PDSCH. Respective cells, TRPs, and/or beams may transmit different PDSCHs or different PDSCH layers to the UE so as to improve a processing rate compared to single cell, TRP, and/or beam transmission. In addition, respective cells, TRPs, and/or beams may repeat transmission of the same PDSCH to the UE so as to improve reliability compared to single cell, TRP, and/or beam transmission. For convenience of explanation, hereinafter, a cell, TRP, and/or beam are collectively called a TRP.

Various wireless resource allocations may be considered for a case 1440 where frequency and time resources used in multiple TRPs for PDSCH transmission are all the same, a case 1445 where frequency and time resources used in multiple TRPs do not overlap at all, and a case 1450 where some of frequency and time resources used in multiple TRPs overlap.

For NC-JT support, pieces of DCI having various types, structures, and relations may be considered to simultaneously allocate multiple PDSCHs to one UE.

Figure 15:
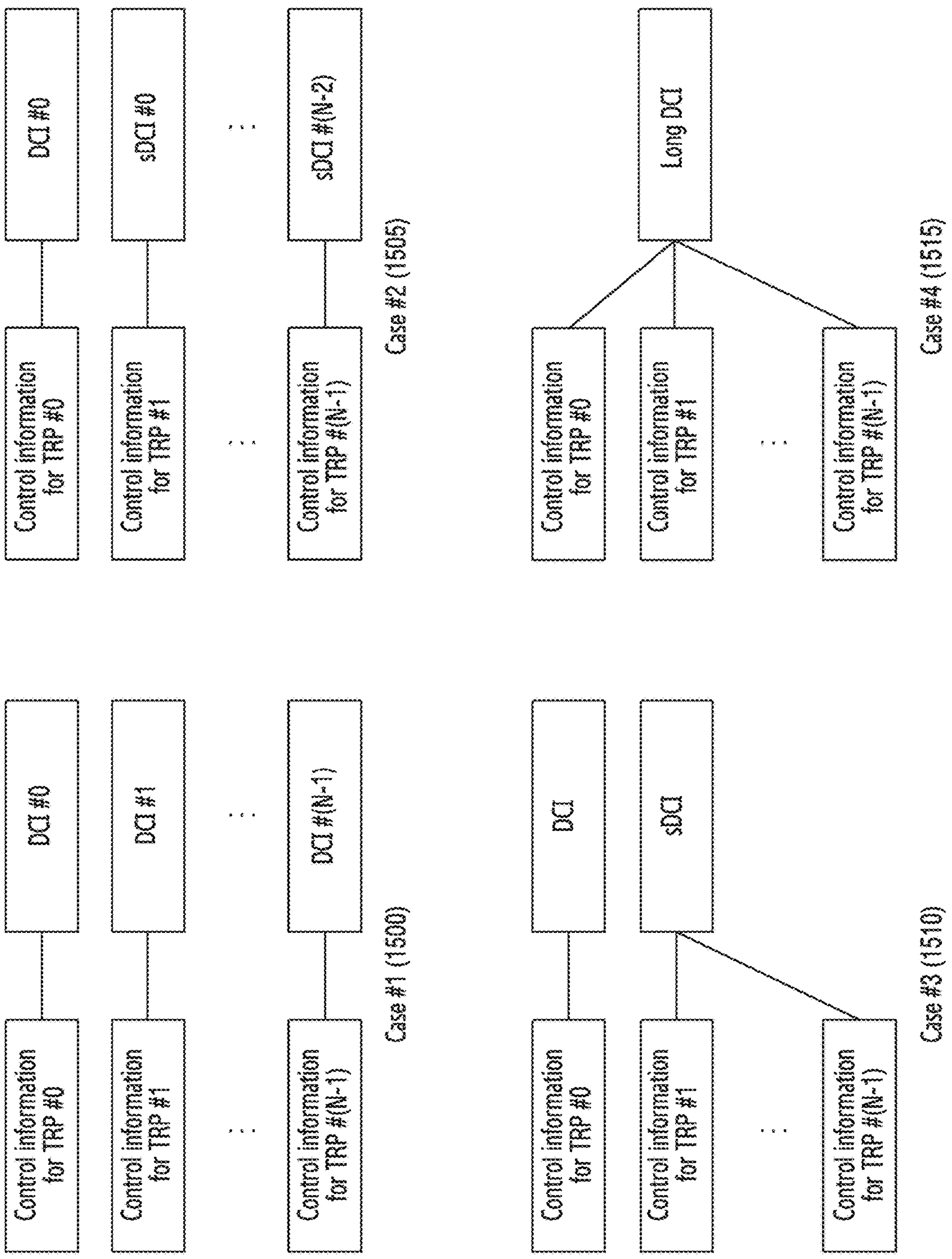
FIG. 15 is a diagram illustrating a configuration of downlink control information (DCI) for cooperative communication in a wireless communication system according to an embodiment of the disclosure.

FIG. 15 is a diagram illustrating a configuration downlink control information (DCI) for NC-JT wherein respective TRPs transmit different PDSCHs or different PDSCH layers to a UE in a wireless communication system according to an embodiment of the disclosure.

Referring to FIG. 15, case #1 1500 according to an embodiment is an example in which, in a situation where different (N−1) number of PDSCHs are transmitted from additional (N−1) number of TRPs (TRP #1 to TRP #(N−1)) other than a serving TRP (TRP #0) used at the time of single PDSCH transmission, control information for the PDSCHs transmitted from the additional (N-1) number of TRPs is transmitted independently to control information for a PDSCH transmitted from the serving TRP. For example, a UE may obtain control information for PDSCHs transmitted from different TRPs (TRP #0 to TRP #(N−1)) through independent pieces of DCI (DCI #0 to DCI #(N−1)). The formats of the independent pieces of DCI may be identical to or different from each other, and the payloads of the pieces of DCI may also be identical to or different from each other. In case #1 described above, free control or allocation of each PDSCH may be completely ensured, but when pieces of DCI are transmitted from different TRPs, there occurs a difference in coverage between the pieces of DCI and thus reception performance may be degraded.

According to an embodiment of the disclosure, case #2 1505 shows an example in which, in a situation where different (N−1) number of PDSCHs are transmitted from additional (N−1) number of TRPs (TRP #1 to TRP #(N−1)) other than a serving TRP (TRP #0) used at the time of single PDSCH transmission, pieces of control information (DCI) for the PDSCHs of the additional (N−1) number of TRPs are transmitted respectively, and each of the pieces of DCI is dependent on control information for a PDSCH transmitted from the serving TRP.

For example, DCI #0 that is the control information for the PDSCH transmitted from the serving TRP (TRP #0) includes all information elements of DCI format 1_0, DCI format 1_1, or DCI format 1_2, but shortened DCI (hereinafter, sDCI) (sDCI #0 to sDCI #(N−2)) that is control information for PDSCHs transmitted from cooperative TRPs (TRP #1 to TRP #(N−1)) may include only some of information elements of DCI format 1_0, DCI format 1_1, or DCI format 1_2. Therefore, sDCI transmitting control information for PDSCHs transmitted from the cooperative TRPs has a payload smaller than that of normal DCI (nDCI) transmitting control information related to a PDSCH transmitted from the serving TRP, and thus is able to include reserved bits compared to nDCI.

According to an embodiment of the disclosure, in case #2 described above, free control or allocation of each PDSCH may be limited according to the contents of information elements included in sDCI, but the reception performance of sDCI is superior to nDCI, and thus a probability of occurrence of a difference in coverage between pieces of DCI may be lowered.

According to an embodiment of the disclosure, case #3 1510 shows an example in which, in a situation where different (N−1) number of PDSCHs are transmitted from additional (N−1) number of TRPs (TRP #1 to TRP #(N−1)) other than a serving TRP (TRP #0) used at the time of single PDSCH transmission, one piece of control information for the PDSCHs of the additional (N−1) number of TRPs is transmitted, and this DCI is dependent on control information for a PDSCH transmitted from the serving TRP.

For example, DCI #0 that is the control information for the PDSCH transmitted from the serving TRP (TRP #0) may include all information elements of DCI format 1_0, DCI format 1_1, or DCI format 1_2. In a case of control information for PDSCHs transmitted from cooperative TRPs (TRP #1-TRP #(N−1)), only some of information elements of DCI format 1_0, DCI format 1_1, or DCI format 1_2 may be grouped into one piece of "secondary DCI" (sDCI) and then be transmitted. For example, sDCI may include at least one piece of information among pieces of HARQ-related information, such as frequency domain resource assignment, time domain resource assignment, or an MCS of cooperative TRPs. Other information not included in sDCI, such as a bandwidth part (BWP) indicator or a carrier indicator, may be determined based on DCI (DCI #0, normal DCI, or nDCI) of the serving TRP.

According to an embodiment of the disclosure, case #3 1510, free control or allocation of each PDSCH may be limited according to the contents of information elements included in sDCI, but the reception performance of sDCI is controllable and the complexity of DCI blind decoding of a UE may be reduced compared to case #1 1500 or case #2 1505.

According to an embodiment of the disclosure, case #4 1515 is an example in which, in a situation where different (N−1) number of PDSCHs are transmitted from additional (N−1) number of TRPs (TRP #1-TRP #(N−1)) other than a serving TRP (TRP #0) used at the time of single PDSCH transmission, control information for the PDSCHs transmitted from the additional (N−1) number of TRPs is transmitted through the same DCI (long DCI) as that of control information for a PDSCH transmitted from the serving TRP. For example, a UE may obtain control information for PDSCHs transmitted from different TRPs (TRP #0-TRP #(N−1)) through single DCI. In case #4 1515, the complexity of DCI blind decoding of the UE may not be increased, but a PDSCH may not be freely controlled or allocated like limitation of the number of cooperative TRPs caused by the limitation of a long DCI payload.

In the following description and embodiments of the disclosure, sDCI may be referred to as various pieces of auxiliary DCI, such as shortened DCI, secondary DCI, or normal DCI (DCI format 1_0 or 1_1 described above) including PDSCH control information transmitted from a cooperative TRP, and if there is no special explicit limitation, the corresponding description is similarly applicable to the various pieces of auxiliary DCI.

In the following description and embodiments of the disclosure, case #1 1500, case #2 1505, and case #3 1510 described above in which one or more pieces of DCI (PDCCHs) are used for NC-JT support may be classified as NC-JT based on multiple PDCCHs. Case #4 1515 described above in which single DCI (PDCCH) is used for NC-JT support may be classified as NC-JT based on a single PDCCH. In PDSCH transmission based on multiple PDCCHs, a CORESET in which DCI of a serving TRP (TRP #0) is scheduled may be distinguished from a CORESET in which DCI of cooperative TRPs (TRP #1 to TRP #(N−1)) is scheduled. As a method for distinguishing CORESETs, there may be a method of distinguishment using a higher layer indicator for each CORESET or a method of distinguishment using beam configuration for each CORESET. In addition, in NC-JT based on a single PDCCH, single DCI schedules a single PDSCH having multiple layers rather than scheduling multiple PDSCHs, and the multiple layers may be transmitted from multiple TRPs. The connection relation between a layer and a TRP transmitting the layer may be indicated through a transmission configuration indicator (TCI) indication for the layer.

In embodiments of the disclosure, a "cooperative TRP" may be replaced with various terms including a "cooperative panel" or a "cooperative beam", when actually applied.

In embodiments of the disclosure, "a case where NC-JT is applied" is variously interpretable in accordance with a situation as "a case where a UE simultaneously receives one or more PDSCHs in one BWP", "a case where a UE receives a PDSCH, based on two or more transmission configuration indicator (TCI) indications simultaneously, in one BWP", and "a case where a PDSCH received by a UE is associated with one or more DMRS port groups". However, for convenience of explanation, one expression is used.

In the disclosure, a wireless protocol structure for NC-JT may be variously used according to a TRP-based scenario. For example, if there is no or a small backhaul delay between cooperative TRPs, a method (CA-like method) using a structure based on MAC layer multiplexing similarly to S10 in FIG. 4 is possible. On the contrary, if a backhaul delay between cooperative TRPs is large enough not to be ignorable (e.g., a time of 2 ms or longer is required for exchange of information, such as CSI, scheduling, or HARQ-ACK, between cooperative TRPs), a method (DC-like method) of using a TRP-specific independent structure from an RLC layer, similarly to the structure S20 in FIG. 4, so as to ensure a characteristic resistant to delays is possible.

According to an embodiment of the disclosure, a UE supporting C-JT and/or NC-JT may receive a parameter or setting value related to C-JT and/or NC-JT from a higher layer configuration, and configure an RRC parameter of the UE, based on the parameter or setting value related to C-JT and/or NC-JT. The UE may use a UE capability parameter, for example, tci-StatePDSCH for the higher layer configuration. For example, the UE capability parameter (e.g., tci-StatePDSCH) may define TCI states for PDSCH transmission. The number of TCI states may be configured to be 4, 8, 16, 32, 64, or 128 in FR1, and may be configured to be 64 or 128 in FR2. A maximum of 8 states indicatable by 3 bits of a TCI field of DCI among the configured number of TCI states may be configured through a MAC CE message. The maximum value 128 may be referred to as a value indicated by max NumberConfiguredTCIstatesPerCC in a tci-StatePDSCH parameter included in capability signaling of the UE. As described above, a series of configuration processes from a higher layer configuration to a MAC CE configuration may be applied to a beamforming indication or beamforming change command for at least one PDSCH from one TRP.

[Related to SBFD (XDD)]

In a 5G mobile communication service, an additional coverage expansion technology has been introduced compared to an LTE communication service. However, a TDD system suitable for a service having generally a high proportion of downlink traffic may be used in an actual 5G mobile communication service. In addition, coverage enhancement may be a key requirement of a 5G mobile communication service because the coverage of a base station and a UE is reduced due to the increase of center frequency for extension of a frequency band. Particularly, uplink channel coverage enhancement may be important in that the transmission power of a base station is generally lower than that of a UE, a service having a high proportion of downlink traffic is required to be supported, and a ratio of downlink in the time domain is higher than that of uplink. The coverage of an uplink channel between a base station and a UE may be physically enhanced by using a method of increasing the time resources of an uplink channel, lowering the center frequency, or increasing the transmission power of a UE. However, changing frequency may be limited due to a determined frequency band for each network operator. In addition, increasing the maximum transmission power of a UE to improve coverage may be limited because the maximum transmission power of the UE has been regulatorily determined to reduce interference.

Therefore, in order to enhance the coverage of a base station and a UE, uplink resources and downlink resources may be separated even in the frequency domain as in a frequency division duplex (FDD) system as well as separating uplink and downlink resources in the time domain according to a proportion between uplink and downlink traffic as in a TDD system. In an embodiment of the disclosure, a system enabling flexible separation between uplink resources and downlink resources in the time domain and the frequency domain may be called an XDD system, a flexible TDD system, a hybrid TDD system, a TDD-FDD system, a hybrid TDD-FDD system, or the like. For convenience of explanation, this system will be described as an XDD system in the disclosure. According to an embodiment of the disclosure, X of XDD may mean time or frequency.

Figure 16:
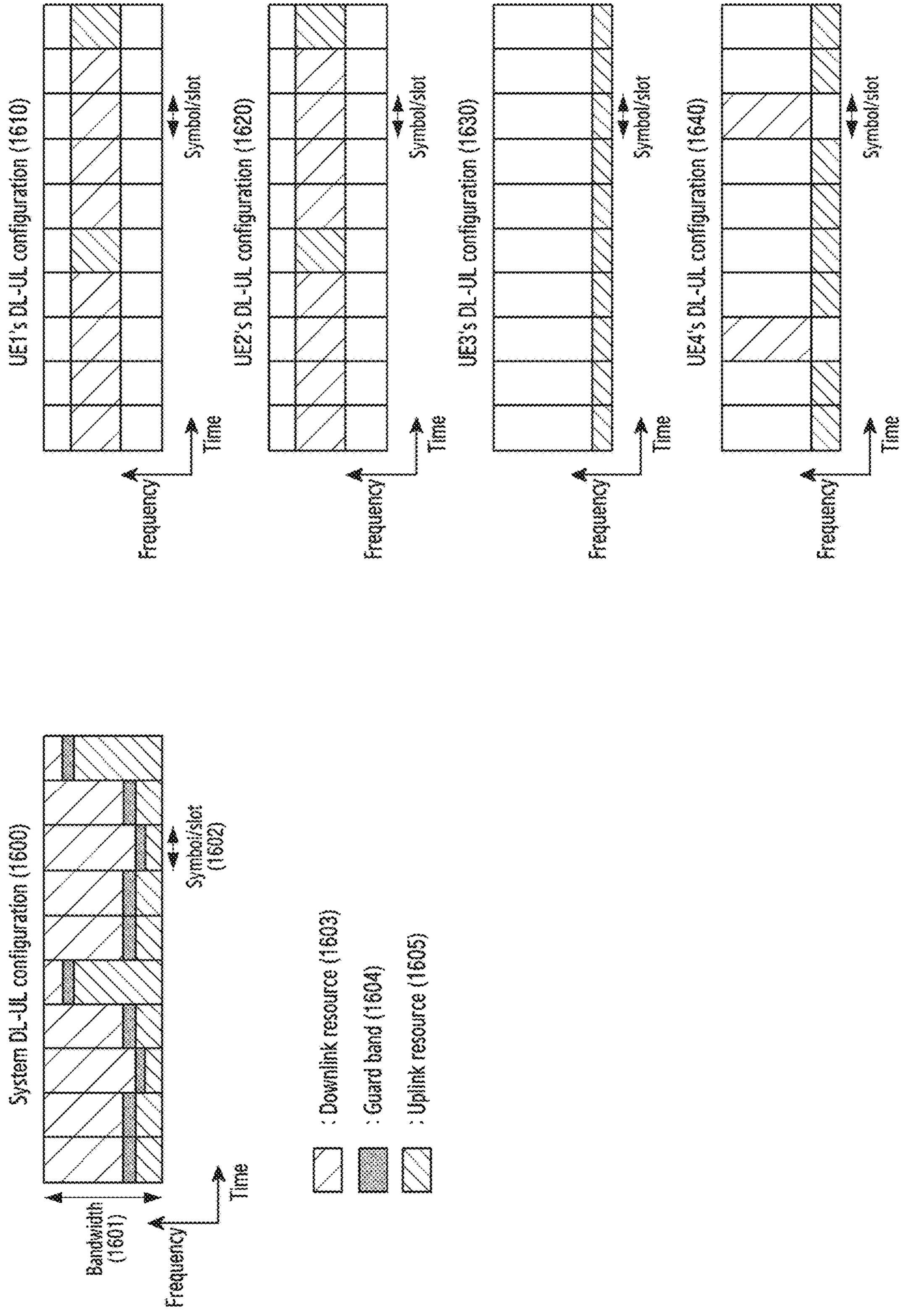
FIG. 16 is a diagram illustrating an uplink-downlink resource configuration of an extended device discovery (XDD) system in which uplink resources and downlink resources are flexibly distributed in a time domain and a frequency domain according to an embodiment of the disclosure.

FIG. 16 is a diagram illustrating an uplink-downlink resource configuration of an XDD system in which uplink resources and downlink resources are flexibly separated in a time domain and a frequency domain according to an embodiment of the disclosure.

Referring to FIG. 16, in view of a base station, in an uplink-downlink configuration 1600 of an overall XDD system, resources may be flexibly allocated for each symbol or slot 1602 according to a proportion between uplink and downlink traffic with respect to an entire frequency band 1601. However, this merely corresponds to an example, a unit of resource allocation is not limited to the symbol or slot 1602, and resources may also be flexibly allocated according to a unit, such as a mini slot. A guard band 1604 may be allocated between the frequency bands of a downlink resource 1603 and an uplink resource 1605. The guard band 1604 may be allocated as a method for reducing interference on reception of a signal or an uplink channel, which is caused by out-of-band emission occurring when a base station transmits a downlink channel or a signal in the downlink resource 1603. For example, UE 1 1610 and UE 2 1620, the downlink traffic of which is generally greater than uplink traffic according to a configuration of a base station, may be allocated downlink and uplink resources at a proportion of 4:1 in the time domain. At the same time, UE 3 1630 operating at a cell edge and thus having a lack of uplink coverage may be allocated only uplink resources in a particular time interval according to a configuration of a base station. Additionally, UE 4 1640 operating at a cell edge and thus having a lack of uplink coverage, but also having a relatively large downlink and uplink traffic may be allocated many uplink resources in the time domain for uplink coverage and may be allocated many downlink resources in the frequency domain. As in the example described above, there is an advantage in that UEs operating relatively at the cell center and having large downlink traffic may be allocated larger downlink resources in the time domain, and UEs operating relatively at the cell edge and having a lack of uplink coverage may be allocated larger uplink resources in the time domain.

Figure 17:
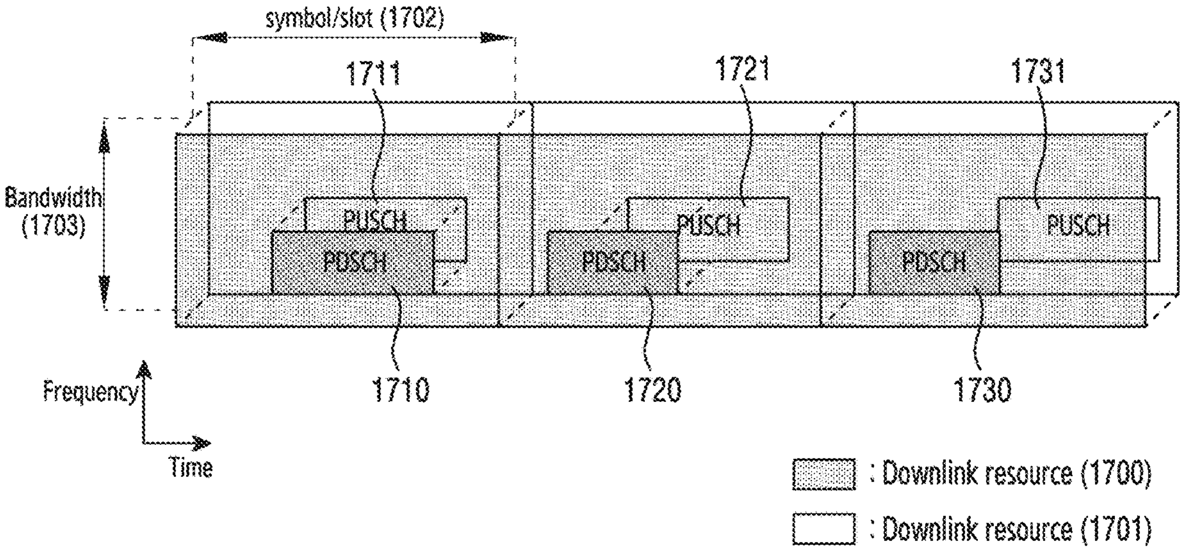
FIG. 17 is a diagram illustrating an uplink-downlink resource configuration of a full duplex communication system in which uplink resources and downlink resources are flexibly distributed in a time domain and a frequency domain according to an embodiment of the disclosure.

FIG. 17 is a diagram illustrating an uplink-downlink resource configuration of a full duplex communication system in which uplink resources and downlink resources are flexibly distributed in the time domain and the frequency domain according to an embodiment of the disclosure.

Referring to FIG. 17, downlink resources 1700 and uplink resources 1701 may be configured to entirely or partially overlap in the time and frequency domains. In a region configured as the downlink resources 1700, downlink transmission from a base station to a UE may be performed, and in a region configured as the uplink resources 1701, uplink transmission from a UE to a base station may be performed. In the example of FIG. 17, the downlink resources 1710 and the uplink resources 1711 may be configured to entirely overlap in a time resource corresponding to a symbol or slot 1702 and a frequency resource corresponding to a bandwidth 1703. The downlink resources 1710 and the uplink resources 1711 overlap in the time and frequency, and thus downlink and uplink transmission and reception of a base station or a UE may simultaneously occur in the same time and frequency resource.

In another example of FIG. 17, downlink resources 1720 and uplink resources 1721 may be configured to partially overlap in a time resource corresponding to a symbol or slot and a frequency resource corresponding to a bandwidth 1703. In a partial region in which the downlink resources 1720 and the uplink resources 1721 overlap with each other, downlink and uplink transmission and reception of a base station or a UE may simultaneously occur.

In another example of FIG. 17, downlink resources 1730 and uplink resources 1731 may be configured not to overlap with each other in a time resource corresponding to a symbol or slot and a frequency resource corresponding to a bandwidth 1703.

Figure 18:
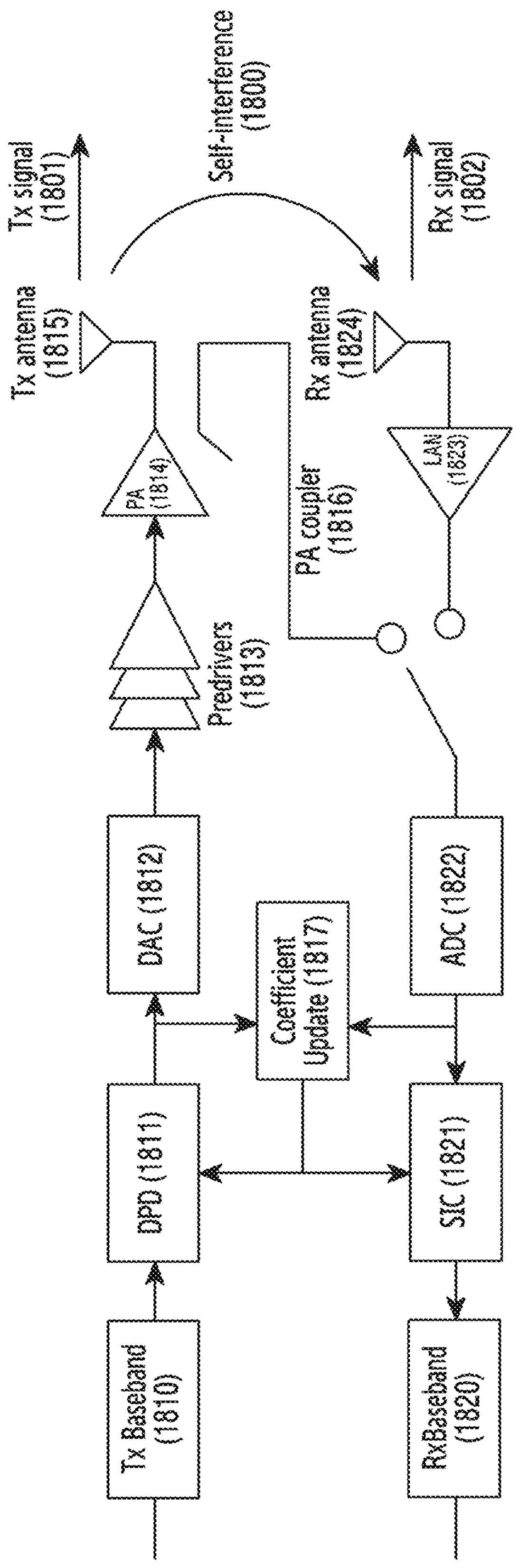
FIG. 18 is a diagram illustrating a transmission and reception structure for a duplex scheme according to an embodiment of the disclosure.

FIG. 18 is a diagram illustrating a transmission and reception structure for a duplex scheme according to an embodiment of the disclosure.

Referring to FIG. 18, the transmission and reception structure may be used for a base station device or a UE device. According to the transmission and reception structure illustrated in FIG. 18, a transmission node may be configured by blocks, such as a transmission baseband block (Tx baseband) 1810, a digital pre-distortion block or digital pre-distortion (DPD) 1811, a digital-to-analog converter (DAC) 1812, a pre-driver 1813, a power amplifier (PA) 1814, a transmission antenna (Tx antenna) 1815, or the like. Each block may perform the role as below.

Transmission baseband block 1810: A digital processing block for a transmission signal DPD block 1811: Pre-distortion of a digital transmission signal DAC 1812: Conversion of a digital signal into an analog signal Pre-driver 1813: Gradual power amplification of an analog transmission signal PA 1814: Power amplification of an analog transmission signal Tx antenna 1815: An antenna for signal transmission According to the transmission and reception structure illustrated in FIG. 18, a reception node may be configured by blocks, such as a reception antenna (Rx antenna) 1824, a low noise amplifier (LNA) 1823, an analog-to-digital converter (ADC) 1822, a successive interference canceller (SIC) 1821, a reception baseband block (Rx baseband) 1820, or the like. Each block may perform the role as below.

Reception antenna 1824: An antenna for signal reception

Low noise amplifier 1823: Amplification of power of an analog reception signal with minimization of noise amplification Analog-to-digital converter 1822: Conversion of an analog signal into a digital signal SIC 1821: An interference canceller for a digital signal Reception baseband block 1820: A digital processing block for a reception signal According to the transmission and reception structure illustrated in FIG. 18, a power amplifier coupler (PA coupler) 1816 and a coefficient update block (coefficient update) 1817 may exist for additional signal processing between the transmission node and the reception node. Each block may perform the role as below.

(1) Power amplifier coupler 1816: A block having a purpose of observing, by the reception node, a waveform of an analog transmission signal having passed through the power amplifier (2) Coefficient update block 1817: Update of various coefficients required for digital domain signal processing of the transmission node and the reception node, wherein calculated coefficients may be used for setting various types of parameters in the block of DPD 1811 of the transmission node and the block of SIC 1821 of the reception node The transmission and reception structure illustrated in FIG. 18 may be used for the purpose of effectively controlling interference between a transmission signal and a reception signal in case that a base station or a UE device simultaneously performs transmission and reception operations. For example, in case that transmission and reception simultaneously occur in a random device, a transmission signal 1801 transmitted through the transmission antenna 1815 of the transmission node may be received through the reception antenna 1824 of the reception node, and in this case, the transmission signal 1801 received by the reception node may give interference 1800 in a reception signal 1802 which the reception node was to receive originally. The interference between the reception signal 1802 and the transmission signal 1801 received by the reception node will be named self-interference 1800.

For example, specifically, in case that a base station device simultaneously performs downlink transmission and uplink reception, a downlink signal transmitted by the base station may be received by a reception node of the base station, and thus interference between the downlink signal transmitted by the base station and an uplink signal that the base station was to receive at the reception node originally may occur at the reception node of the base station. In case that a UE device simultaneously performs downlink reception and uplink transmission, an uplink signal transmitted by the UE may be received by a reception node of the UE, and thus interference between the uplink signal transmitted by the UE and a downlink signal that the UE was to receive at the reception node originally may occur at the reception node of the UE. As described above, interference between a downlink signal and an uplink signal, that is, links having different directions in a base station and a UE device is also named cross-link interference.

In an embodiment of the disclosure, self-interference between a transmission signal (or a downlink signal) and a reception signal (or uplink signal) may occur in a system allowing simultaneous occurrence of transmission and reception.

For example, self-interference may occur in an XDD system described above.

Figure 19:
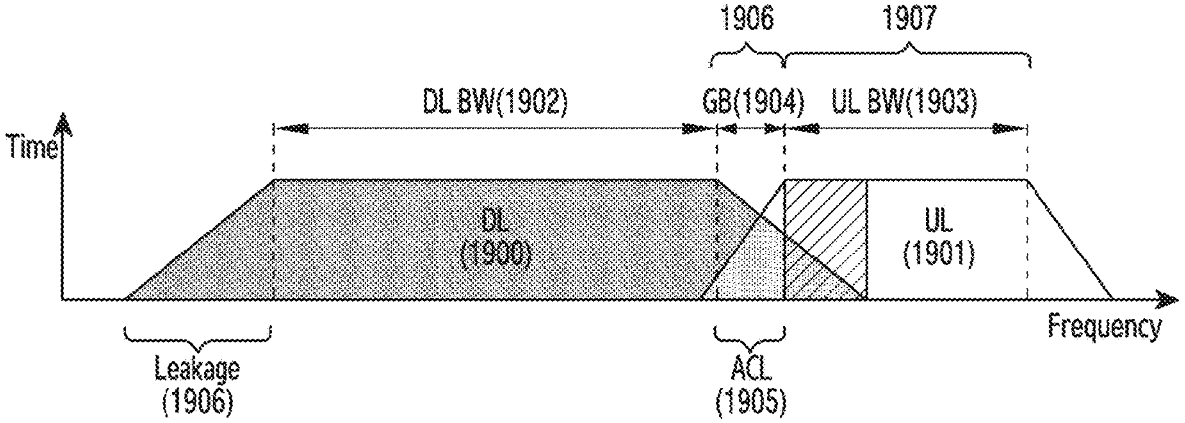
FIG. 19 is a diagram illustrating a configuration of downlink and uplink resources in an XDD system according to an embodiment of the disclosure.

FIG. 19 is a diagram illustrating a configuration of downlink and uplink resources in an XDD system according to an embodiment of the disclosure.

Referring to FIG. 19, in a case of XDD, resources for downlink 1900 and resources for uplink 1903 may be distinguished in the frequency domain, and a guard band (GB) 1904 may exist between the resources for downlink 1900 and the resources for uplink 1901. Actual downlink transmission may be performed in a downlink bandwidth 1902, and uplink transmission may be performed in an actual uplink bandwidth 1903. A 1906 may occur out of the uplink or downlink transmission band. In a region in which the downlink resources 1900 and the uplink resources 1901 are adjacent to each other, interference (this may be called an adjacent carrier leakage (ACL) 1905) caused by the leakage may occur.

FIG. 19 illustrates an example in which the ACL 1905 from the downlink 1900 to the uplink 1901 occurs. As the downlink bandwidth 1902 and the uplink bandwidth 1903 become closely adjacent to each other, the effect of signal interference caused by the ACL 1905 may increase, and thus performance deterioration may occur. For example, as illustrated in FIG. 19, a partial resource region 1906 in the uplink band 1903, which is adjacent to the downlink band 1902, may be largely affected by the interference caused by the ACL 1905. A partial resource region 1907 in the uplink band 1903, which is relatively far away from the downlink band 1902, may be less affected by the interference caused by the ACL 1905. For example, there are, in the uplink band 1903, the partial resource region 1906 relatively largely affected by interference and the partial resource region 1907 relatively less affected by interference.

The guard band 1904 may be inserted between the downlink bandwidth 1902 and the uplink bandwidth 1903 for the purpose of reducing performance deterioration caused by the ACL 1905. There is an advantage in that the larger the size of the guard band 1904, the smaller the interference effect caused by the ACL 1905 between the downlink bandwidth 1902 and the uplink bandwidth 1903. However, there may also be a disadvantage of degradation of resource efficiency in that the larger the size of the guard band 1904, the smaller the resources available for transmission or reception. On the contrary, there is an advantage of enhancement of resource efficiency in that the smaller the size of the guard band 1904, the larger the amount of the resources available for transmission or reception. However, there is a disadvantage in that the interference effect caused by the ACL 1905 between the downlink bandwidth 1902 and the uplink bandwidth 1903 may become large. Therefore, it may be important to determine a proper size of the guard band 1904 based on a trade-off.

Meanwhile, in 3GPP, subband non-overlapping full duplex (SBFD) in an NR-based new duplex scheme is being discussed. SBFD is a technology of using a part of a downlink resource as an uplink resource in a time division duplex (TDD) band (spectrum) of a frequency of 6 GHz or below or a frequency of 6 GHz or above, to receive, from a UE, uplink transmission as much as the amount of increased uplink resources so as to expand the uplink coverage of the UE, and receive a feedback for downlink transmission from the UE in the increased uplink resources so as to reduce feedback delay. In the disclosure, a UE capable of receiving, from a base station, information on whether service binding function controller (SBFC) is supported, and performing uplink transmission in some of downlink resources may be called an SBFD UE (SBFD-capable UE) for convenience. In order to define the SBFD scheme in a protocol and enable an SBFD UE to determine whether the SBFD is supported in a particular cell (or frequency or frequency band), the following method may be considered.

First method. Other than a frame structure type of the related art of an unpaired spectrum (or time division duplex, TDD) or a paired spectrum (or frequency division duplex, FDD), another frame structure type (e.g., frame structure type 2) may be introduced in order to define the SBFD. Frame structure type 2 described above may define being supported in the particular frequency or frequency band, or a base station may indicate whether SBFD is supported, to a UE by using system information. An SBFD UE may receive the system information including whether SBFD is supported, and determine whether SBFD is supported in the particular cell (or frequency or frequency band).

Second method. Without defining a new frame structure type, whether the SBFD is additionally supported in a particular frequency or frequency band of an unpaired spectrum (or TDD) of the related art may be indicated. The second method may define whether the SBFD is additionally supported in a particular frequency or frequency band of an unpaired spectrum of the related art, or a base station may indicate whether SBFD is supported, to a UE by using system information. An SBFD UE may receive the system information including whether SBFD is supported, and determine whether SBFD is supported in the particular cell (or frequency or frequency band).

The information on whether SBFD is supported in the first and second methods may be information (e.g., SBFD resource configuration information in FIGS. 20A, 20B, 20C, and 20D described later) indirectly indicating whether SBFD is supported, by means of additionally configuring a part of a downlink resource as an uplink resource together with configuring TDD uplink (UL)-downlink (DL) resource configuration information indicating a downlink slot (or symbol) resource and an uplink slot (or symbol) resource in TDD, or may be information directly indicating whether SBFD is supported.

In the disclosure, the SBFD UE may receive a synchronization signal block, in an initial cell access for accessing a cell (or a base station), to obtain cell synchronization. A process of obtaining the cell synchronization may be the same as for an SBFD UE and an existing TDD UE. Thereafter, the SBFD UE may determine whether the cell supports SBFD, through MIB acquisition, SIB acquisition, or a random access process.

The system information for transmitting information on whether SBFD is supported may be system information distinguished from and transmitted separately from system information for a UE (e.g., an existing TDD UE) supporting a different version of protocol in a cell, and the SBFD UE may obtain the entirety or part of the system information transmitted separately from the system information for the existing TDD UE, to determine whether SBFD is supported. When the SBFD UE obtains only the system information for the existing TDD UE or system information indicating that SBFD is not supported, the XDD UE may determine that the cell (or base station) supports only TDD.

When the information on whether SBFD is supported is included in system information for a UE (e.g., an existing TDD UE) supporting a different version of protocol, the information on whether SBFD is supported may be inserted in the last part of the system information not to affect acquisition of the system information of the existing TDD UE. When the SBFD UE fails to obtain the information on whether SBFD is supported, which is inserted in the last part, or obtains information indicating that SBFD is not supported, the SBFD UE may determine that the cell (or base station) supports only TDD.

When the information on whether SBFD is supported is included in system information for a UE (e.g., an existing TDD UE) supporting a different version of protocol, the information on whether SBFD is supported may be transmitted through a separate PDSCH not to affect acquisition of the system information of the existing TDD UE. For example, an SBFD non-supported device may receive a first SIB (or SIB1) including existing TDD-related system information through a first PDSCH. An SBFD-supported UE may receive a first SIB (or SIB1) including existing TDD-related system information through a first PDSCH, and receive a second SIB including SBFD-related system information through a second PDSCH. The first PDSCH and the second PDSCH may be scheduled by a first PDCCH and a second PDCCH, and cyclic redundancy codes (CRCs) of the first PDCCH and the second PDCCH may be scrambled by the same RNTI (e.g., SI-RNTI). A search space monitoring the second PDCCH may be obtained from the system information of the first PDSCH, and if the acquisition has failed (i.e., the system information of the first PDSCH does not include information on the search space), the UE may receive the second PDCCH in the same search space as that of the first PDCCH.

As described above, when the SBFD UE determines that the cell (or base station) supports only TDD, the SBFD UE may perform a random access procedure and transmit or receive a data/control signal like the existing TDD UE.

A base station may configure a separate random access resource for an existing TDD UE or an SBFD UE (e.g., an SBFD UE supporting duplex communication and an SBFD UE supporting half-duplex communication), and transmit configuration information (e.g., control information or configuration information indicating a time-frequency resource available for a PRACH) on the random access resource to the SBFD UE through system information. The system information for transmitting information on the random access resource may be system information distinguished from and transmitted separately from system information for a UE (e.g., an existing TDD UE) supporting a different version of protocol in a cell.

The base station configures a separate random access resource for each of the SBFD UE and the TDD UE supporting the different version of protocol, thereby being able to distinguish whether the TDD UE supporting the different version of protocol performs a random access or the SBFD UE performs a random access. For example, the separate random access resource configured for the SBFD UE may be a resource that the existing TDD UE determines as a downlink time resource, and the SBFD UE may perform a random access through an uplink resource (or separate random access resource) configured in some frequencies of the downlink time resource, so that the base station may determine that the UE which has attempted the random access in the uplink resource is an SBFD UE.

Alternatively, a base station may not configure a separate random access resource for an SBFD UE, and may configure a common random access resource for all UEs in a cell. In this case, the configuration information on the random access resource may be transmitted to all the UEs in the cell through system information, and an SBFD UE having received the system information may perform a random access in the random access resource. Thereafter, the SBFD UE may complete a random access process to enter an RRC connection mode for transmission or reception of data with the cell. After the RRC connection mode, the SBFD UE may receive, from the base station, a higher or physical signal enabling determination that a partial frequency resource of the downlink time resource are configured as an uplink resource, and transmit an uplink signal in the uplink resource as, for example, an SBFD operation.

When the SBFD UE determines that the cell supports SBFD, the SBFD UE transmits, to the base station, capability information including at least one of whether the UE supports SBFD, whether the UE supports full-duplex communication or half-duplex communication, and the number of transmission or reception antennas included in (or supported by) the UE, thereby notifying the base station that the UE attempting to access is an SBFD UE. Alternatively, when support of half-duplex communication is necessarily implemented for an SBFD UE, whether half-duplex communication is supported as described above may be omitted from the capability information. A report of the SBFD UE on the capability information may be transmitted to the base station through a random access process, may be reported to the base station after completion of the random access process, or may be reported to the base station after entering an RRC connection mode for transmission or reception of data with the cell.

The SBFD UE may support half-duplex communication in which only uplink transmission or downlink reception is performed at one time like an existing TDD UE, or may support full-duplex communication in which both uplink transmission and downlink reception are performed at one time. Therefore, the SBFD UE may report, to the base station through capability reporting, whether the SBFD UE supports half-duplex communication or full-duplex communication, and after the reporting, the base station may configure, for the SBFD UE, whether the SBFD UE is to use half-duplex communication for transmission or reception or to use full-duplex communication for transmission or reception. When the SBFD UE reports the capability of half-duplex communication to the base station, since a duplexer is normally absent, a switching gap for changing a radio frequency (RF) between transmission and reception may be required in a case of operating in FDD or TDD.

FIGS. 20A, 20B, 20C, and 20D illustrate SBFD being operated in a TDD band of a wireless communication system according to an embodiment of the disclosure.

Figure 20A:
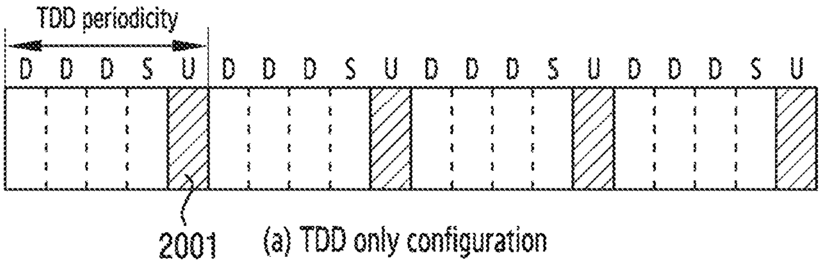
FIGS. 20A, 20B, 20C, and 20D illustrate SBFD is operated in a time division duplex (TDD) band of a wireless communication system according to an embodiment of the disclosure.

FIG. 20A illustrates TDD being operated in a particular frequency band. In a cell operating the TDD, a base station may transmit or receive, to or from an existing TDD UE or an SBFD UE, a signal including data/control information in a downlink slot (or symbol), an uplink slot (or symbol) 2001, and a flexible slot (or symbol), based on a configuration on TDD UL-DL resource configuration information indicating a downlink slot (or symbol) resource and an uplink slot (or symbol) resource of the TDD.

Referring to FIG. 20A, it may be assumed that a DDDSU slot format is configured according to TDD UL-DL resource configuration information. Here, "D" is a slot, the entirety of which is configured by downlink symbols, "U" is a slot, the entirety of which is configured by uplink symbols, and "S" is a slot, other than "D" or "U", including downlink symbols or uplink symbols or including flexible symbol. For convenience, S may be assumed to be configured by 12 downlink symbols and two flexible symbols. Furthermore, a DDDSU slot format may be repeated according to TDD UL-DL resource configuration information. For example, a repetition period of a TDD configuration may correspond to five slots (5 ms at 15 kHz SCS, 2.5 ms at 30 KHz SCS, or the like).

Figure 20B:
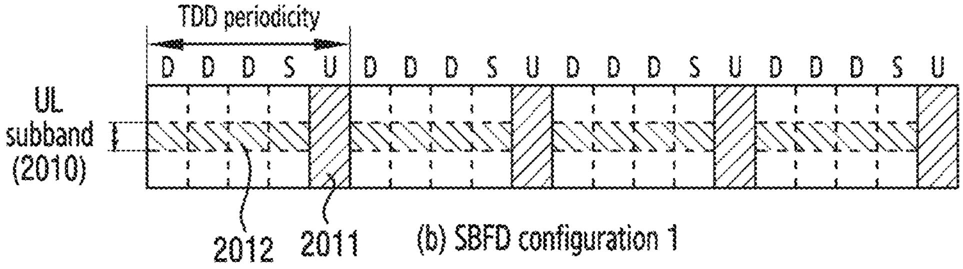
Figure 20C:
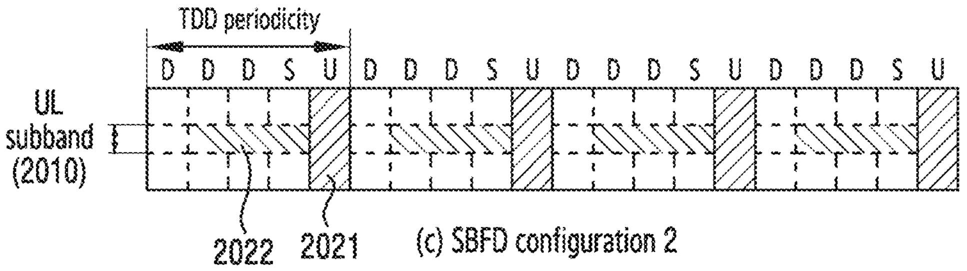
Figure 20D:
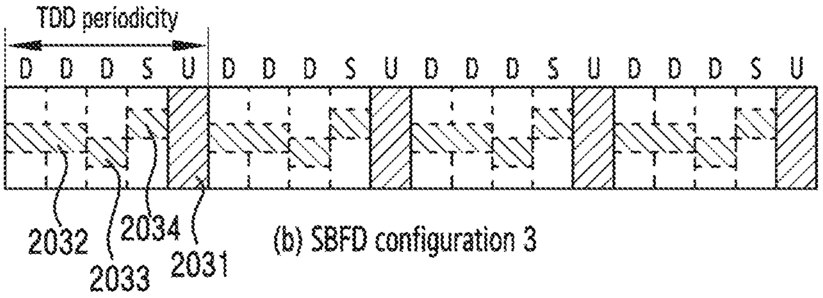

Next, FIGS. 20B, 20C, and 20D illustrate a case where SBFD is operated together with TDD in a particular frequency band.

Referring to FIG. 20B, a partial band among frequency of a cell may be configured for a UE as a frequency band 2010 in which uplink transmission is possible. This band may be called an uplink subband (UL subband). The uplink subband may be applied to all symbols of all slots. The UE may transmit a scheduled uplink channel or signal on all symbols 2012 in the subband (UL subband). However, the UE is unable to transmit an uplink channel or signal in a band other than the subband (UL subband).

Referring to FIG. 20C, a partial band among frequency of a cell may be configured for a UE as a frequency band 2020 in which uplink transmission is possible, and a time region in which the frequency band is activated may be configured therefor. Herein, this frequency band may be called an uplink subband (UL subband). In FIG. 20C, the uplink (UL) subband is deactivated in a first slot, and the uplink (UL) subband may be activated in the remaining slots. Therefore, the UE may transmit an uplink channel or signal in the uplink subband (UL subband) 2022 of the remaining slots. Therefore, herein, the uplink subband (UL subband) is activated in a unit of a slot, but whether the subband is activated may be configured in a unit of a symbol.

Referring to FIG. 20D, a time-frequency resource on which uplink transmission is possible may be configured for a UE. One or more time-frequency resources may be configured for the UE as time-frequency resources on which uplink transmission is possible. For example, a partial frequency band 2032 of a first slot and a second slot may be configured as a time-frequency resource on which uplink transmission is possible. For example, a partial frequency band 2033 of a third slot and a partial frequency band 2034 of a fourth slot may be configured as time-frequency resources on which uplink transmission is possible.

In the following description, a time-frequency resource on which uplink transmission is possible in a downlink symbol or slot may be called an SBFD resource. In addition, a downlink symbol in which an uplink subband is configured may be called an SBFD symbol. In addition, a time-frequency resource on which downlink reception is possible in an uplink symbol or slot may be called an SBFD resource. In addition, an uplink symbol in which a downlink subband is configured may be called an SBFD symbol.

For convenience, in the disclosure, a band, other than an uplink subband, in which reception of a downlink channel or signal is possible is expressed by a downlink subband. A maximum of one uplink subband per symbol is configurable for a UE, and a maximum of two downlink subbands is configurable therefor. For example, one of {uplink subband, downlink subband}, {downlink subband, uplink subband}, and {first downlink subband, uplink subband, second downlink subband} in the frequency domain may be configured for a UE.

Figure 21:
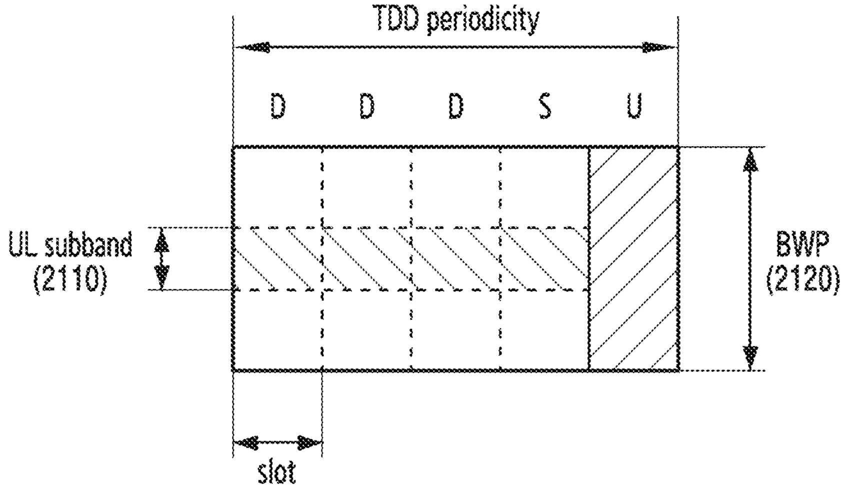
FIG. 21 is a diagram illustrating an SBFD configuration according to an embodiment of the disclosure.

FIG. 21 is a diagram illustrating an SBFD configuration according to an embodiment of the disclosure.

Referring to FIG. 21, an uplink symbol, a downlink symbol, or a flexible symbol may be configured for a UE according to a TDD configuration. Here, all symbols of a "D" slot are downlink symbols. All symbols of a "U" slot are uplink symbols. An "S" slot is a slot other than a "D" slot or a "U" slot. A UL BWP 2120 may be configured for the UE. Then, a UL subband 2110 may be configured for the UE in DL symbols. In addition, a slot or symbol to which the UL subband 2110 is to be applied may be configured for the UE. Referring to FIG. 21, the UL subband may be applied to only some symbols among the DL symbols of a TDD period (periodicity). The UL subband is applied to the DL symbols of a second slot and a third slot, but the UL subband may not be applied to the other DL symbols. Here, an SBFD symbol may indicate a symbol to which the UL subband is applied.

A base station may configure, for a UE, a guard frequency interval between a DL subband and a UL subband. If the guard frequency interval is configured for the UE, frequency resources in the frequency domain may be divided into the UL subband, the guard frequency interval, and the DL subband. For description of this embodiment of the disclosure, the guard frequency interval is assumed to be included in the UL subband. For example, in the following description, an expression that "if "X" overlaps with a UL subband" may be interpreted as "if "X" overlaps with a UL subband or guard frequency interval". In addition, an expression that "if "X" overlaps with a UL subband" may be interpreted as "if "X" does not overlap with a DL subband".

The expression that "if "X" does not overlap with a UL subband" may be interpreted as "if "X" does not overlap with a UL subband and a guard frequency band". In addition, an expression that "if "X" does not overlap with a UL subband" may be interpreted as "if "X" overlaps with a DL subband".

Hereinafter, embodiments of the disclosure will be described in conjunction with the accompanying drawings. The contents of the disclosure may be applied to FDD and TDD systems. As used herein, upper signaling (or upper layer signaling) is a method for transferring signals from a base station to a UE by using a downlink data channel of a physical layer, or from the UE to the base station by using an uplink data channel of the physical layer, and may also be referred to as "RRC signaling", "PDCP signaling", or "medium access control (MAC) control element (MAC CE)".

Hereinafter, determining priority between A and B may be variously described as, for example, selecting an entity having a higher priority according to a predetermined priority rule and performing an operation corresponding thereto, or omitting or dropping operations regarding an entity having a lower priority.

Hereinafter, the above examples may be described through multiple embodiments of the disclosure, but they are not independent of each other, and one or more embodiments may be applied simultaneously or in combination.

Hereinafter, for the sake of descriptive convenience, a cell, a transmission point, a panel, a beam, and/or a transmission direction which can be distinguished through an upper layer/L1 parameter, such as a TCI state or spatial relation information, a cell ID, a TRP ID, or a panel ID may be described as a TRP, a beam, or a TCI state as a whole. Therefore, in actual applications, a TRP, a beam, or a TCI state may be appropriately replaced with one of the above terms.

As used herein, the UE may use various methods to determine whether or not to apply cooperative communication, for example, PDCCH(s) that allocates a PDSCH to which cooperative communication is applied have a specific format, or PDCCH(s) that allocates a PDSCH to which cooperative communication is applied include a specific indicator indicating whether or not to apply cooperative communication, or PDCCH(s) that allocates a PDSCH to which cooperative communication is applied are scrambled by a specific RNTI, or cooperative communication application is assumed in a specific range indicated by an upper layer. Hereinafter, it will be assumed for the sake of descriptive convenience that NC-JT case refers to a case in which the UE receives a PDSCH to which cooperative communication is applied, based on conditions similar to those described above.

Hereinafter, embodiments of the disclosure will be described in conjunction with the accompanying drawings. In the following description, a base station is an entity that allocates resources to terminals, and may be at least one of a gNode B, a gNB), an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing a communication function. In the following description of embodiments of the disclosure, 5G systems are described by way of example, but the embodiments of the disclosure may also be applied to other communication systems having similar technical backgrounds or channel types. Examples of such communication systems may include LTE or LTE-A mobile communication systems and mobile communication technologies developed beyond 5G. Therefore, based on determinations by those skilled in the art, the embodiments of the disclosure may be applied to other communication systems through some modifications without significantly departing from the scope of the disclosure. The contents of the disclosure may be applied to FDD and TDD systems.

Furthermore, in describing the disclosure, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification.

In the following description of the disclosure, upper layer signaling may refer to signaling corresponding to at least one signaling among the following signaling, or a combination of one or more thereof.

- Master information block (MIB)
- System information block (SIB) or SIB X (X=1, 2, . . . )
- Radio resource control (RRC)
- Medium access control (MAC) control element (CE)

In addition, L1 signaling may refer to signaling corresponding to at least one signaling method among signaling methods using the following physical layer channels or signaling, or a combination of one or more thereof.

- Physical downlink control channel (PDCCH)
- Downlink control information (DCI)
- UE-specific DCI
- Group common DCI
- Common DCI
- Scheduling DCI (for example, DCI used for the purpose of scheduling downlink or uplink data)
- Non-scheduling DCI (for example, DCI not used for the purpose of scheduling downlink or uplink data)
- Physical uplink control channel (PUCCH)
- Uplink control information (UCI)

Hereinafter, determining priority between A and B may be variously described as, for example, selecting an entity having a higher priority according to a predetermined priority rule and performing an operation corresponding thereto, or omitting or dropping operations regarding an entity having a lower priority.

As used herein, the term "slot" may generally refer to a specific time unit corresponding to a transmit time interval (TTI), may specifically refer to a slot used in a 5G NR system, or may refer to a slot or a subframe used in a $4^{th}$ generation (4G) LTE system.

Hereinafter, the above examples may be described through multiple embodiments of the disclosure, but they are not independent of each other, and one or more embodiments may be applied simultaneously or in combination.

First Embodiment: Aperiodic CSI Report or Semi-Persistent CSI Report Multiplexing Method As an embodiment of the disclosure, an aperiodic CSI report or semi-persistent CSI report multiplexing method of a UE is described. This embodiment may be operated in combination with other embodiments of the disclosure.

In a case where two SRS resource sets having a usage configured to be codebook or non-codebook are configured by a base station for a UE through higher layer signaling (therefore, there is an SRS resource set indicator field in DCI), the base station indicates "10" or "11" as an SRS resource set indicator in DCI, the base station configures PUSCH repetition type A through higher layer signaling, and the base station schedules an indication to report aperiodic CSI by using a PUSCH including a transport block, through a CSI request field in DCI, 1) If CSI-AperiodicTriggerState in which the higher layer signaling AP-CSI-MultiplexingMode is configured is indicated to the UE through the CSI request field in the DCI, and UCI other than the aperiodic CSI report is not multiplexed with the PUSCH, 2) The UE may multiplex the aperiodic CSI report with a first PUSCH repetition among PUSCH repetitions corresponding to a first SRS resource set and a first PUSCH repetition among PUSCH repetitions corresponding to a second SRS resource set.

1) Otherwise (i.e., if CSI-AperiodicTriggerState in which the higher layer signaling AP-CSI-MultiplexingMode is not configured is indicated to the UE through the CSI request field in the DCI, or UCI other than the aperiodic CSI report is multiplexed with the PUSCH), 2) The UE may multiplex the aperiodic CSI report with a first PUSCH repetition among one or more PUSCH repetitions.

In a case where two SRS resource sets having a usage configured to be codebook or non-codebook are configured by a base station for a UE through higher layer signaling (therefore, there is an SRS resource set indicator field in DCI), the base station indicates "10" or "11" as an SRS resource set indicator in DCI, the base station configures PUSCH repetition type A through higher layer signaling, and the base station schedules an indication to report aperiodic CSI by using a PUSCH not including a transport block, through a CSI request field in DCI, 1) The UE may consider 2 as a PUSCH repetition count regardless of a configured and indicated PUSCH repetition count.

2) In this case, a first PUSCH repetition may be performed toward a TRP corresponding to a first SRS resource set, and a second PUSCH repetition may be performed toward a TRP corresponding to a second SRS resource set.

2) In this case, the configured and indicated PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

1) If CSI-AperiodicTriggerState in which the higher layer signaling AP-CSI-MultiplexingMode is configured is indicated to the UE through the CSI request field in the DCI, and UCI other than the aperiodic CSI report is not multiplexed with the PUSCH, 2) The UE may multiplex the aperiodic CSI report with a first PUSCH repetition among PUSCH repetitions corresponding to a first SRS resource set and a first PUSCH repetition among PUSCH repetitions corresponding to a second SRS resource set.

1) Otherwise (i.e., if CSI-AperiodicTriggerState in which the higher layer signaling AP-CSI-MultiplexingMode is not configured is indicated to the UE through the CSI request field in the DCI, or UCI other than the aperiodic CSI report is multiplexed with the PUSCH), 2) The UE may multiplex the aperiodic CSI report with a first PUSCH repetition among two or more PUSCH repetitions.

In a case where two SRS resource sets having a usage configured to be codebook or non-codebook are configured by a base station for a UE through higher layer signaling (therefore, there is an SRS resource set indicator field in DCI), the base station indicates "10" or "11" as an SRS resource set indicator in DCI, the base station configures PUSCH repetition type A through higher layer signaling, and the base station schedules an indication to report semi-persistent CSI by using a PUSCH not including a transport block, through a CSI request field in DCI, 1) The UE may consider/determine/identify 2 as a PUSCH repetition count regardless of a configured and indicated PUSCH repetition count.

2) In this case, a first PUSCH repetition may be performed toward a TRP corresponding to a first SRS resource set, and a second PUSCH repetition may be performed toward a TRP corresponding to a second SRS resource set.

2) In this case, the configured and indicated PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

1) If CSI-SemiPersistentOnPUSCH-TriggerState or CSI-SemiPersistentOnPUSCH-TriggerStateList in which the higher layer signaling SP-CSI-MultiplexingMode is configured is indicated to the UE through the CSI request field in the DCI, and UCI other than the semi-persistent CSI report is not multiplexed with the PUSCH, 2) The UE may multiplex the semi-persistent CSI report with both a first PUSCH repetition and a second PUSCH repetition with respect to a first PUSCH transmission after PUSCH transmission with which the semi-persistent CSI report is able to be multiplexed is scheduled through DCI.

2) The UE may multiplex the semi-persistent CSI report with both a first PUSCH repetition and a second PUSCH repetition starting from a second PUSCH transmission, which may be periodically transmitted without DCI, after a first PUSCH transmission after PUSCH transmission with which the semi-persistent CSI report is able to be multiplexed is scheduled through DCI.

1) Otherwise (i.e., if CSI-SemiPersistentOnPUSCH-TriggerState or CSI-SemiPersistentOnPUSCH-TriggerStateList in which the higher layer signaling SP-CSI-MultiplexingMode is not configured is indicated to the UE through the CSI request field in the DCI, or UCI other than the semi-persistent CSI report is multiplexed with the PUSCH), 2) The UE may multiplex the semi-persistent CSI report with a first PUSCH repetition among two or more PUSCH repetitions.

In a case where two SRS resource sets having a usage configured to be codebook or non-codebook are configured by a base station for a UE through higher layer signaling (therefore, there is an SRS resource set indicator field in DCI), the base station indicates "10" or "11" as an SRS resource set indicator in DCI, the base station configures PUSCH repetition type B through higher layer signaling, and the base station schedules an indication to report aperiodic CSI by using a PUSCH including a transport block, through a CSI request field in DCI, 1) If CSI-AperiodicTriggerState in which the higher layer signaling AP-CSI-MultiplexingMode is configured is indicated to the UE through the CSI request field in the DCI, a first actual repetition corresponding to a first SRS resource set and a first actual repetition corresponding to a second SRS resource set have the same OFDM symbol length, and UCI other than the aperiodic CSI report is not multiplexed with the PUSCH, 2) The UE may multiplex the aperiodic CSI report with the first PUSCH actual repetition among actual repetitions corresponding to the first SRS resource set and the first PUSCH actual repetition among actual repetitions corresponding to the second SRS resource set.

1) Otherwise (i.e., if CSI-AperiodicTriggerState in which the higher layer signaling AP-CSI-MultiplexingMode is not configured is indicated to the UE through the CSI request field in the DCI, a first actual repetition corresponding to a first SRS resource set and a first actual repetition corresponding to a second SRS resource set have different OFDM symbol lengths, or UCI other than the aperiodic CSI report is multiplexed with the PUSCH), 2) The UE may multiplex the aperiodic CSI report with a first actual repetition among one or more PUSCH repetitions.

In a case where two SRS resource sets having a usage configured to be codebook or non-codebook are configured by a base station for a UE through higher layer signaling (therefore, there is an SRS resource set indicator field in DCI), the base station indicates "10" or "11" as an SRS resource set indicator in DCI, the base station configures PUSCH repetition type B through higher layer signaling, and the base station schedules an indication to report aperiodic CSI by using a PUSCH not including a transport block, through a CSI request field in DCI, 1) The UE may consider/determine/identify 2 as a nominal repetition value regardless of a configured and indicated nominal repetition value, and consider/determine/identify that a first nominal repetition has the same OFDM symbol length as a first actual repetition, and a second nominal repetition has the same OFDM symbol length as a second actual repetition.

2) In this case, the first actual repetition may be transmitted toward a TRP corresponding to a first SRS resource set, and the second actual repetition may be transmitted toward a TRP corresponding to a second SRS resource set.

2) In this case, the configured and indicated PUSCH repetition count may be a value configured through the higher layer signaling numberOfRepetitions in an entry indicated through a TDRA field.

1) If CSI-AperiodicTriggerState in which the higher layer signaling AP-CSI-MultiplexingMode is configured is indicated to the UE through the CSI request field in the DCI, and UCI other than the aperiodic CSI report is not multiplexed with the PUSCH, 2) The UE may multiplex the aperiodic CSI report with a first actual repetition and a second actual repetition.

1) Otherwise (i.e., if CSI-AperiodicTriggerState in which the higher layer signaling AP-CSI-MultiplexingMode is not configured is indicated to the UE through the CSI request field in the DCI, or UCI other than the aperiodic CSI report is multiplexed with the PUSCH), 2) The UE may multiplex the aperiodic CSI report with a first actual repetition.

In a case where two SRS resource sets having a usage configured to be codebook or non-codebook are configured by a base station for a UE through higher layer signaling (therefore, there is an SRS resource set indicator field in DCI), the base station indicates "10" or "11" as an SRS resource set indicator in DCI, the base station configures PUSCH repetition type B through higher layer signaling, and the base station schedules an indication to report semi-persistent CSI by using a PUSCH not including a transport block, through a CSI request field in DCI, 1) With respect to a first PUSCH transmission after PUSCH transmission with which the semi-persistent CSI report is able to be multiplexed is scheduled through DCI, 2) The UE may consider/determine/identify 2 as a nominal repetition value regardless of a configured and indicated nominal repetition value, and consider/determine/identify that a first nominal repetition has the same OFDM symbol length as a first actual repetition, and a second nominal repetition has the same OFDM symbol length as a second actual repetition.

3) In this case, the first actual repetition may be transmitted toward a TRP corresponding to a first SRS resource set, and the second actual repetition may be transmitted toward a TRP corresponding to a second SRS resource set.

3) In this case, the PUSCH repetition count may be a value configured through the higher layer signaling numberOfRepetitions in an entry indicated through a TDRA field.

2) If CSI-SemiPersistentOnPUSCH-TriggerState or CSI-SemiPersistentOnPUSCH-TriggerStateList in which the higher layer signaling SP-CSI-MultiplexingMode is configured is indicated to the UE through the CSI request field in the DCI, and UCI other than the semi-persistent CSI report is not multiplexed with the PUSCH, 3) The UE may multiplex the semi-consistent CSI report with a first actual repetition and a second actual repetition.

2) Otherwise (i.e., if CSI-SemiPersistentOnPUSCH-TriggerState or CSI-SemiPersistentOnPUSCH-TriggerStateList in which the higher layer signaling SP-CSI-Multiplexing-Mode is not configured is indicated to the UE through the CSI request field in the DCI, or UCI other than the semi-consistent CSI report is multiplexed with the PUSCH), 3) The UE may multiplex the semi-consistent CSI report with a first actual repetition.

1) Starting from a second PUSCH transmission, which may be periodically transmitted without DCI, after a first PUSCH transmission after PUSCH transmission with which the semi-persistent CSI report is able to be multiplexed is scheduled through DCI, 2) The UE may consider/determine/identify 2 as a nominal repetition value regardless of a configured and indicated nominal repetition value.

3) In this case, a first actual repetition may be transmitted toward a TRP corresponding to a first SRS resource set, and a second actual repetition may be transmitted toward a TRP corresponding to a second SRS resource set.

3) In this case, the PUSCH repetition count may be a value configured through the higher layer signaling numberOfRepetitions in an entry indicated through a TDRA field.

2) If CSI-SemiPersistentOnPUSCH-TriggerState or CSI-SemiPersistentOnPUSCH-TriggerStateList in which the higher layer signaling SP-CSI-MultiplexingMode is configured is indicated to the UE through the CSI request field in the DCI, 3) If a first nominal repetition and a first actual repetition have the same OFDM symbol length, and a second nominal repetition and a second actual repetition have different OFDM symbol lengths, the second nominal repetition is not transmitted, and the semi-persistent CSI report may be multiplexed with the first actual repetition.

3) If a first nominal repetition and a first actual repetition have different OFDM symbol lengths, and a second nominal repetition and a second actual repetition have the same OFDM symbol length, the first actual repetition is not transmitted, and the semi-persistent CSI report may be multiplexed with the second actual repetition.

2) If CSI-SemiPersistentOnPUSCH-TriggerState or CSI-SemiPersistentOnPUSCH-TriggerStateList in which the higher layer signaling SP-CSI-MultiplexingMode is configured is indicated to the UE through the CSI request field in the DCI, a first nominal repetition and a first actual repetition have the same OFDM symbol length, a second nominal repetition and a second actual repetition have the same OFDM symbol length, and UCI other than the semi-persistent CSI report is not multiplexed with the PUSCH, 3) The UE may multiplex the semi-consistent CSI report with the first actual repetition and the second actual repetition.

2) Otherwise (i.e., if CSI-SemiPersistentOnPUSCH-TriggerState or CSI-SemiPersistentOnPUSCH-TriggerStateList in which the higher layer signaling SP-CSI-Multiplexing-Mode is not configured is indicated to the UE through the CSI request field in the DCI, a first nominal repetition and a first actual repetition have different OFDM symbol lengths, a second nominal repetition and a second actual repetition have different OFDM symbol lengths, or UCI other than the semi-persistent CSI report is multiplexed with the PUSCH), 3) The UE may multiplex the semi-consistent CSI report with the first actual repetition.

In a case where two SRS resource sets having a usage configured to be codebook or non-codebook are configured by a base station for a UE through higher layer signaling (therefore, there is an SRS resource set indicator field in DCI), the base station indicates “00” or “01” as an SRS resource set indicator in DCI, the base station configures PUSCH repetition type A through higher layer signaling, and the base station schedules an indication to report aperiodic CSI by using a PUSCH including a transport block, through a CSI request field in DCI, the UE may multiplex the aperiodic CSI report with a first PUSCH repetition.

In a case where one SRS resource set having a usage configured to be codebook or non-codebook is configured by a base station for a UE through higher layer signaling (therefore, there is no SRS resource set indicator field in DCI), the base station configures PUSCH repetition type A through higher layer signaling, and the base station schedules an indication to report aperiodic CSI by using a PUSCH including a transport block, through a CSI request field in DCI, the UE may multiplex the aperiodic CSI report with a first PUSCH repetition.

In a case where two SRS resource sets having a usage configured to be codebook or non-codebook are configured by a base station for a UE through higher layer signaling (therefore, there is an SRS resource set indicator field in DCI), the base station indicates “00” or “01” as an SRS resource set indicator in DCI, the base station configures PUSCH repetition type A through higher layer signaling, and the base station schedules an indication to report aperiodic CSI or semi-persistent CSI by using a PUSCH not including a transport block, through a CSI request field in DCI, 1) The UE may consider/determine/identify 1 as a PUSCH repetition count regardless of a configured and indicated PUSCH repetition count. In this case, the PUSCH repetition count may be a value configured through the higher layer signaling numberOfRepetitions in an entry indicated through a TDRA field, or may be a value configured through the higher layer signaling pusch-Aggregation-Factor if numberOfRepetitions is not configured.

1) The UE may multiplex the aperiodic or semi-consistent CSI report with a first PUSCH repetition.

1) In a case of the semi-persistent CSI report, the UE may multiplex the aperiodic CSI or semi-consistent CSI report with a first PUSCH repetition in the same way with respect to both a first PUSCH transmission after PUSCH transmission with which the semi-persistent CSI report is able to be multiplexed is scheduled through DCI, and a second PUSCH transmission, which may be periodically transmitted without DCI, after the first PUSCH transmission after PUSCH transmission with which the semi-persistent CSI report is able to be multiplexed is scheduled through DCI.

In a case where one SRS resource set having a usage configured to be codebook or non-codebook is configured by a base station for a UE through higher layer signaling (therefore, there is no SRS resource set indicator field in DCI), the base station configures PUSCH repetition type A through higher layer signaling, and the base station schedules an indication to report aperiodic CSI or semi-persistent CSI by using a PUSCH not including a transport block, through a CSI request field in DCI, 1) The UE may consider/determine/identify 1 as a PUSCH repetition count regardless of a configured and indicated PUSCH repetition count. In this case, the PUSCH repetition count may be a value configured through the higher layer signaling numberOfRepetitions in an entry indicated through a TDRA field, or may be a value configured through the higher layer signaling pusch-Aggregation-Factor if numberOfRepetitions is not configured.

1) The UE may multiplex the aperiodic or semi-consistent CSI report with a first PUSCH repetition.

1) In a case of the semi-persistent CSI report, the UE may multiplex the aperiodic CSI or semi-consistent CSI report with a first PUSCH repetition in the same way with respect to both a first PUSCH transmission after PUSCH transmission with which the semi-persistent CSI report is able to be multiplexed is scheduled through DCI, and a second PUSCH transmission, which may be periodically transmitted without DCI, after the first PUSCH transmission after PUSCH transmission with which the semi-persistent CSI report is able to be multiplexed is scheduled through DCI.

In a case where two SRS resource sets having a usage configured to be codebook or non-codebook are configured by a base station for a UE through higher layer signaling (therefore, there is an SRS resource set indicator field in DCI), the base station indicates “00” or “01” as an SRS resource set indicator in DCI, the base station configures PUSCH repetition type B through higher layer signaling, and the base station schedules an indication to report aperiodic CSI by using a PUSCH including a transport block, through a CSI request field in DCI, the UE may multiplex the aperiodic CSI report with a first actual repetition.

In a case where one SRS resource set having a usage configured to be codebook or non-codebook is configured by a base station for a UE through higher layer signaling (therefore, there is no SRS resource set indicator field in DCI), the base station configures PUSCH repetition type B through higher layer signaling, and the base station schedules an indication to report aperiodic CSI by using a PUSCH including a transport block, through a CSI request field in DCI, the UE may multiplex the aperiodic CSI report with a first PUSCH repetition.

In a case where two SRS resource sets having a usage configured to be codebook or non-codebook are configured by a base station for a UE through higher layer signaling (therefore, there is an SRS resource set indicator field in DCI), the base station indicates “00” or “01” as an SRS resource set indicator in DCI, the base station configures PUSCH repetition type B through higher layer signaling, and the base station schedules an indication to report aperiodic CSI by using a PUSCH not including a transport block, through a CSI request field in DCI, 1) The UE may consider/determine/identify 1 as a nominal repetition value regardless of a configured and indicated nominal repetition value, and consider/determine/identify that a first nominal repetition has the same OFDM symbol length as a first actual repetition. In this case, the PUSCH repetition count may be a value configured through the higher layer signaling numberOfRepetitions in an entry indicated through a TDRA field.

1) The UE may multiplex the aperiodic CSI with a first actual repetition.

In a case where one SRS resource set having a usage configured to be codebook or non-codebook is configured by a base station for a UE through higher layer signaling (therefore, there is no SRS resource set indicator field in DCI), the base station configures PUSCH repetition type B through higher layer signaling, and the base station schedules an indication to report aperiodic CSI by using a PUSCH not including a transport block, through a CSI request field in DCI, 1) The UE may consider/determine/identify 1 as a nominal repetition value regardless of a configured and indicated nominal repetition value, and consider/determine/identify that a first nominal repetition has the same OFDM symbol length as a first actual repetition. In this case, the PUSCH repetition count may be a value configured through the higher layer signaling numberOfRepetitions in an entry indicated through a TDRA field.

1) The UE may multiplex the aperiodic or semi-consistent CSI report with a first PUSCH repetition.

In a case where two SRS resource sets having a usage configured to be codebook or non-codebook are configured by a base station for a UE through higher layer signaling (therefore, there is an SRS resource set indicator field in DCI), the base station indicates “00” or “01” as an SRS resource set indicator in DCI, the base station configures PUSCH repetition type B through higher layer signaling, and the base station schedules an indication to report semi-persistent CSI by using a PUSCH not including a transport block, through a CSI request field in DCI, 1) With respect to a first PUSCH transmission after PUSCH transmission with which the semi-persistent CSI report is able to be multiplexed is scheduled for the UE through DCI, 2) The UE may consider/determine/identify 1 as a nominal repetition value regardless of a configured and indicated nominal repetition value, and consider/determine/identify that a first nominal repetition has the same OFDM symbol length as a first actual repetition. In this case, the PUSCH repetition count may be a value configured through the higher layer signaling numberOfRepetitions in an entry indicated through a TDRA field.

2) The UE may multiplex the semi-persistent CSI with a first actual repetition.

1) Starting from a second PUSCH transmission, which may be periodically transmitted without DCI, after a first PUSCH transmission after PUSCH transmission with which the semi-persistent CSI report is able to be multiplexed is scheduled for the UE through DCI, 2) The UE may consider/determine/identify 1 as a nominal repetition value regardless of a configured and indicated nominal repetition value. In this case, the PUSCH repetition count may be a value configured through the higher layer signaling numberOfRepetitions in an entry indicated through a TDRA field.

2) If a first nominal repetition and a first actual repetition have different OFDM symbol lengths, the UE may disregard the first nominal repetition without transmitting same, and if the first nominal repetition and the first actual repetition have the same OFDM symbol length, the UE may multiplex the semi-persistent CSI report with the first actual repetition.

In a case where a TDRA field indicated by a base station to a UE through one DCI format 0_1 or 0_2 includes multiple pieces of time resource allocation information, that is, in a case where multiple PUSCHs (multi-PUSCH) are scheduled by the base station for the UE, and an aperiodic CSI report is indicated thereto through the same DCI, 1) If two different PUSCH transmissions are scheduled for the UE, the UE may multiplex the aperiodic CSI report with a second PUSCH.

1) If more than two different PUSCH transmissions are scheduled for the UE, the UE may multiplex the aperiodic CSI report with a second-to-last PUSCH.

A transmission scheme (TB over multiple slots (TBoMS)) of processing a transport block included in a PUSCH by using multiple slots may be configured for a UE, and in a case where the UE receives DCI format 0_1 or 0_2 scheduling a PUSCH to which TBoMS is applied, through a PDCCH including a CRC scrambled by a C-RNTI, MCS-C-RNTI, or CS-RNTI, 1) N, the number of slots for determining a transport block size, may be configured by a base station for the UE through the higher layer signaling numberOfSlotsTBoMS. The higher layer signaling numberOfSlotsTBoMS may be configured as higher layer signaling in each entry indicatable through a TDRA field in DCI, and one of 1, 2, 4, or 8 may be configured as a value thereof.

1) K meaning a repetition count may be configured through the higher layer signaling numberOfRepetitions, and may indicate the number of times of repetition of N, the number of slots configured through the higher layer signaling numberOfSlotsTBoMS. For example, if N is 2 and K is 4, the UE may expect that one TBoMS-based PUSCH transmitted through two slots is repeated four times and thus is transmitted by occupying a total of eight slots. The higher layer signaling numberOfRepetitions may be configured as higher layer signaling in each entry indicatable through a TDRA field in DCI, and a maximum of 32 may be possible as same (e.g., one value among n1, n2, n3, n4, n7, n8, n12, n16, n20, n24, n28, and n32).

1) The UE may not expect that the multiple of N and K is greater than 32.

1) If an aperiodic CSI report is indicated to the UE, the aperiodic CSI report may be multiplexed with only a first PUSCH transmission among N×K slots.

<Second Embodiment>: Beam Mapping Method Considering SBFD Resource Allocation at Time of Multi-TRP-Based PUSCH Repetition As an embodiment of the disclosure, a beam mapping method considering SBFD resource allocation at the time of multi-TRP-based PUSCH repetition is described. In the following description, the term “beam” may be replaced with spatial relation info, TCI state, UL TCI state, joint TCI state, QCL-TypeD, SSB, CSI-RS, SRS, or the like. This embodiment may be operated in combination with other embodiments.

A UE may receive multi-TRP PUSCH repetition scheduling from a base station by using one DCI, that is, single-DCI. To this end, two SRS resource sets having the higher layer signaling usage configured to be codebook or non-codebook may be configured for the UE by the base station. If two SRS resource sets having the higher layer signaling usage configured to be codebook or noncodebook may be configured for the UE by the base station, the UE may expect that a 2-bit field called an SRS resource set indicator exists in DCI formats 0_1 and 0_2. The UE may consider/determined/identify that the SRS resource set indicator is a field through which the base station indicates dynamic switching between single-TRP and multi-TRP to the UE by using DCI. The higher layer signaling mappingPattern may be configured for the UE by the base station, the value thereof may be cyclicMapping or sequentialMapping, the value may be a parameter indicating a method for beam mapping at the time of multi-TRP PUSCH repetition, and an SRS resource set to which each PUSCH repetition is connected according to a beam mapping method may be configured for the UE. If an entry indicated by the base station to the UE through a TDRA field in DCI includes a repetition count greater than 1, the UE may interpret the SRS resource set indicator field as follows.

1) If the UE receives 00 as the value of the SRS resource set indicator, the UE may consider/determine/identify that all PUSCH repetitions scheduled through the DCI received from the base station are connected to a first SRS resource set.

1) If the UE receives 01 as the value of the SRS resource set indicator, the UE may consider/determine/identify that all PUSCH repetitions scheduled through the DCI received from the base station are connected to a second SRS resource set.

1) If the UE receives 10 as the value of the SRS resource set indicator, the UE may consider/determine/identify that some of PUSCH repetitions scheduled through the DCI received from the base station are connected to a first SRS resource set and the others are connected to a second SRS resource set.

2) If the repetition count is 2, the UE may consider/determine/identify that the first SRS resource set is connected to a first PUSCH repetition and the second SRS resource set is connected to a second PUSCH repetition.

2) If the repetition count is greater than 2 and cyclicMapping is configured for the UE as the higher layer signaling mappingPattern, the UE may consider/determine/identify that the first SRS resource set is connected to a first PUSCH repetition, consider/determine/identify that the second SRS resource set is connected to a second PUSCH repetition, and expect that the remaining one or more PUSCH repetitions have the same connection relation.

2) If the repetition count is greater than 2 and sequentialMapping is configured for the UE as the higher layer signaling mappingPattern, the UE may consider/determine/identify that the first SRS resource set is connected to a first PUSCH repetition and a second PUSCH repetition, consider/determine/identify that the second SRS resource set is connected to a third PUSCH repetition and a fourth PUSCH repetition, and expect that the remaining one or more PUSCH repetitions have the same connection relation.

1) If the UE receives 11 as the value of the SRS resource set indicator, the UE may consider/determine/identify that some of PUSCH repetitions scheduled through the DCI received from the base station are connected to a first SRS resource set and the others are connected to a second SRS resource set.

2) If the repetition count is 2, the UE may consider/determine/identify that the second SRS resource set is connected to a first PUSCH repetition and the first SRS resource set is connected to a second PUSCH repetition.

2) If the repetition count is greater than 2 and cyclicMapping is configured for the UE as the higher layer signaling mappingPattern, the UE may consider/determine/identify that the second SRS resource set is connected to a first PUSCH repetition, consider/determine/identify that the first SRS resource set is connected to a second PUSCH repetition, and expect that the remaining one or more PUSCH repetitions have the same connection relation.

2) If the repetition count is greater than 2 and sequentialMapping is configured for the UE as the higher layer signaling mappingPattern, the UE may consider/determine/identify that the second SRS resource set is connected to a first PUSCH repetition and a second PUSCH repetition, consider/determine/identify that the first SRS resource set is connected to a third PUSCH repetition and a fourth PUSCH repetition, and expect that the remaining one or more PUSCH repetitions have the same connection relation.

According to the beam mapping method, the UE may recognize an SRS resource, among the first or second SRS resource, to which each PUSCH repetition is connected, if PUSCH repetition type A is configured for the UE through higher layer signaling, the UE may apply the above description to each PUSCH repetition, and if PUSCH repetition type B is configured for the UE through higher layer signaling, the UE may consider/determine/identify that the PUSCH repetition is a nominal PUSCH repetition.

Figure 22:
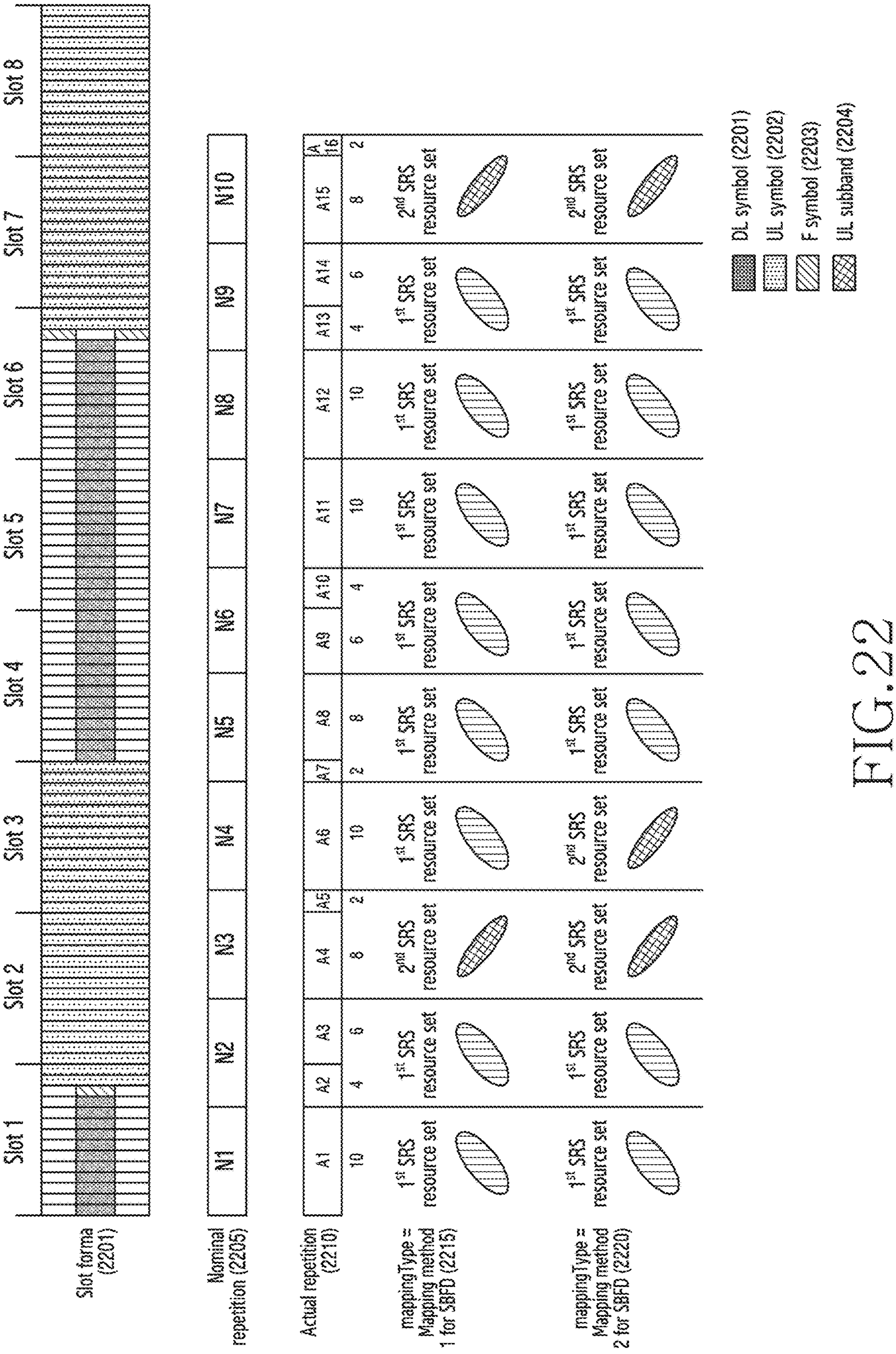
FIG. 22 is a diagram illustrating a beam mapping method considering an SBFD resource allocation method at a time of multi-transmission and reception point (TRP)-based PUSCH repetition according to an embodiment of the disclosure.

FIG. 22 is a diagram illustrating a beam mapping method considering an SBFD resource allocation method at a time of multi-TRP-based PUSCH repetition according to an embodiment of the disclosure.

Referring to FIG. 22, a UE may perform uplink transmission or downlink reception according to a slot format 2200 configured or indicated by a base station. The UE may receive TDD configuration-related information from the base station whereby a DL symbol 2201, a UL symbol 2202, and a flexible symbol 2203 are configured for or indicated to the UE. The UE may additionally receive an SBFD-related higher layer signaling configuration and a dynamic indication from the base station whereby information related to a UL subband 2204 is configured for or indicated to the UE.

There is an example where 0 is configured as the transmission starting symbol S and 10 is configured as the transmission symbol length for the UE for nominal repetitions, and 10 is configured as a repetition count, and the nominal repetitions are represented by N1 to N10 in FIG. 22 (2205). The UE may determine invalid symbols based on the slot format to determine actual repetitions, and the actual repetitions are represented by A1 to A16 in FIG. 22 (2210). The UE may transmit an uplink signal through the UL subband 2204 even if a symbol of a corresponding time point is a DL symbol.

The UE may be connected to a base station operated by multiple TRPs, and all two TRPs may not have an SBFD function. It may be assumed that TRP 1 which may be connected to SRS resource set 1 configured through higher layer signaling may perform SBFD for the UE, and TRP 2 which may be connected to SRS resource set 2 configured through higher layer signaling is unable to perform SBFD therefor. In this case, the UE is able to perform PUSCH transmission to TRP1 in a UL subband configured and indicated by the base station, but is unable to perform PUSCH transmission to TRP 2. Accordingly, the UE may transmit a PUSCH transmitted in a UL subband only to TRP 1 capable of an SBFD operation, and may transmit a PUSCH transmitted on a UL symbol to one of TRP 1 and TRP 2 capable or incapable of an SBFD operation.

Therefore, a beam mapping method considering multiple TRPs capable or incapable of an SBFD operation.

1) Basically, a UE may be assumed to perform PUSCH transmission in a UL subband only to TRP 1 capable of SBFD. Therefore, if multi-TRP-based PUSCH repetition is scheduled for the UE and a transmission time point is in a UL subband, the UE may use a beam corresponding to TRP 1, and the PUSCH transmission may be assumed to be connected to SRS resource set 1 connected to TRP 1 capable of an SBFD operation. If PUSCH repetition type B is configured for the UE by a base station, the UE may perform beam mapping in a unit of a nominal repetition, and an actual repetition transmitted in a UL subband and an actual repetition transmitted on a UL symbol may be included in one nominal repetition. In this case, if a nominal repetition includes at least one actual repetition transmitted in a UL subband, the UE may assume that the nominal repetition is connected to SRS resource set 1 connected to TRP 1 capable of an SBFD operation.

1) In beam mapping operation 1 2215, the UE may similarly use the cyclic mapping for PUSCH transmission (i.e., transmission on a UL symbol) other than that in the UL subband. Therefore, if at least one symbol of a particular n-$^{th}$ PUSCH repetition is transmitted in the UL subband and all the symbols of the immediately next (n+1)$^{th}$ PUSCH repetition are transmitted on UL symbols, the UE may assume that the n-$^{th}$ PUSCH repetition is connected to SRS resource set 1 connected to TRP 1 capable of an SBFD operation, as described above, and may apply the cyclic mapping for PUSCH repetitions, among PUSCH repetitions starting from the (n+1)$^{th}$ PUSCH repetition, all the symbols of which are transmitted on UL symbols. For example, all the symbols of the (n+1)$^{th}$ and (n+2)$^{th}$ PUSCH repetition are transmitted on UL symbols and at least some symbols of an (n+3)$^{th}$ PUSCH repetition are transmitted in the UL subband, the UE may assume that the (n+1)$^{th}$ PUSCH repetition and the (n+2)$^{th}$ PUSCH repetition are connected to SRS resource set 2 and SRS resource set 1, respectively, and may assume that the (n+3)$^{th}$ PUSCH repetition is connected to SRS resource set 1 connected to TRP 1 capable of an SBFD operation because some symbols thereof are transmitted in the UL subband.

1) In beam mapping operation 2 2220, the UE may similarly use the sequential mapping for PUSCH transmission (i.e., transmission on a UL symbol) other than that in the UL subband. Therefore, if at least one symbol of a particular n-$^{th}$ PUSCH repetition is transmitted in the UL subband and all the symbols of the immediately next (n+1)$^{th}$ PUSCH repetition are transmitted on UL symbols, the UE may assume that the n-$^{th}$ PUSCH repetition is connected to SRS resource set 1 connected to TRP 1 capable of an SBFD operation, as described above, and may apply the sequential mapping for PUSCH repetitions, among PUSCH repetitions starting from the (n+1)$^{th}$ PUSCH repetition, all the symbols of which are transmitted on UL symbols. For example, all the symbols of the (n+1)$^{th}$ and (n+2)$^{th}$ PUSCH repetition are transmitted on UL symbols and at least some symbols of an (n+3)$^{th}$ PUSCH repetition are transmitted in the UL subband, the UE may assume that both the (n+1)$^{th}$ PUSCH repetition and the (n+2)$^{th}$ PUSCH repetition are connected to SRS resource set 2, and may assume that the (n+3)$^{th}$ PUSCH repetition is connected to SRS resource set 1 connected to TRP 1 capable of an SBFD operation because some symbols thereof are transmitted in the UL subband.

Index 1 indicating the TRP capable of the SBFD operation and index 1 indicating the SRS resource set connected to TRP 1 merely correspond to an example, and may not always imply that a TRP and an SRS resource set having an index of 1 are connected for beam mapping of a PUSCH transmitted in a UL subband, and the index may have a value other than 1.

The UL subband may indicate an uplink subband.

The UE may transmit, to the base station, a UE capability report having the meaning that the UE supports at least one of beam mapping operations 1 and 2, and if there is higher layer signaling corresponding thereto transmitted from the base station and the base station may support same, or there may be no higher layer signaling described above. In a case where there is the higher layer signaling, if the higher layer signaling is not configured by the base station, the UE may perform beam mapping when multi-TRP PUSCH repetition and an SBFD configuration are received, based on a combination of at least one of the beam mapping operations 1 and 2, and a method of beam mapping at the time of multi-TRP PUSCH repetition defined for a case where there is no SBFD configuration (e.g., a beam mapping operation of the UE when one of the higher layer signaling cyclicMapping or sequentialMapping is configured).

Third Embodiment: Aperiodic or Semi-Persistent CSI Report Multiplexing Method Considering SBFD Resource Allocation at Time of Multi-TRP-Based PUSCH Repetition As an embodiment of the disclosure, an aperiodic CSI report multiplexing method considering SBFD resource allocation is described. This embodiment may be operated in combination with other embodiments.

As described above, if a UE accesses a base station operating in SBFD, the UE may be notified by the base station of a combination of at least one of higher layer signaling, MAC-CE, and L1 signaling for an uplink subband. Based on the notification, the base station and the UE may determine a transmission/reception direction therebetween, that is, a duplex scheme and direction by using at least one of SBFD configuration methods illustrated in FIGS. 20A, 20B, 20C, and 20D described above.

If the UE operates in SBFD and multi-TRP-based PUSCH repetition transmitted on at least multiple slots is scheduled therefor, the UE may select a PUSCH with which an aperiodic CSI report is able to be multiplexed, by considering the following items.

1) If different PUSCH transmissions or PUSCH repetitions are performed on multiple slots or multiple symbols, the UE may perform PUSCH repetition even on slots allowing an SBFD operation as well as uplink slots. Therefore, when the UE multiplexes an aperiodic CSI report, the UE may consider more candidates for a PUSCH transmission-allowed position with which the aperiodic CSI report is multiplexable. For example, in FIG. 20A representing an example of a TDD configuration, PUSCH transmission is possible only in the uplink slot 2001, 2011, 2021, and 2031. However, in FIGS. 20B, 20C, and 20D, the uplink subbands 2012, 2022, 2032, 2033, and 2034 exist even on the existing downlink slots. Therefore, PUSCH transmission may be also possible on the time positions of downlink slots including the uplink subbands, whereby more uplink transmission-allowed positions are secured to increase coverage and shorten a delay time.

1) A case where different PUSCH transmissions or PUSCH repetitions are performed on multiple slots or multiple symbols, some of the multiple slots or multiple symbols operate in SBFD (i.e., in an identical time, some frequency resources operate as uplink and the other frequency resources operate as downlink), the other slots or symbols operate as only uplink is considered. The UE may expect that different PUSCH transmissions or PUSCH repetitions are performed on different slot or symbol positions and the time and frequency resource amounts of the repetitions are the same or different from each other. For example, if the frequency resource amount of a PUSCH on one symbol, which is transmitted on an uplink slot, is 10 RB, and the frequency resource overlaps with an uplink subband by two RBs on an SBFD operation-allowed symbol or slot, a PUSCH transmitted in the uplink subband may occupy eight RBs, and thus the resource amounts of the PUSCHs may be different.

1) While the UE may obtain an uplink transmission occasion through an uplink subband even on an SBFD slot or symbol, downlink scheduling may be still possible on a frequency resource on which there is no uplink subband in the same SBFD slot or symbol. Therefore, there may occur reception performance degradation at the base station due to an interference amount caused by whether downlink scheduling by the base station exists on the same SBFD slot or symbol for uplink transmission from the UE to the base station in an uplink subband, and furthermore, the interference amount may be different according to different SBFD slots or symbols. Therefore, the reception performance of a multiplexed aperiodic CSI report may also vary according to an SBFD slot or symbol on which a PUSCH, with which the UE multiplexes the aperiodic CSI report, is transmitted.

If the UE operates in SBFD and multi-TRP-based PUSCH repetition transmitted on at least multiple slots is scheduled therefor, specifically, the following three detailed embodiments may be considered. In addition, in each embodiment of the disclosure, at least one of the following items as detailed conditions considerable by the UE and the base station may be considered. In addition, under each condition and combinations of the detailed conditions, the UE and the base station may multiplex an aperiodic CSI or semi-persistent CSI report through a combination of at least one of the following various methods.

(3-1)th Embodiment: Method of Multiplexing Aperiodic CSI Report at Time of Scheduling of Multi-TRP-Based PUSCH Repetition Including Transport Block>

[Condition 3-1]

In a case where a UE receives an aperiodic CSI report indication from a base station through DCI, a PUSCH scheduled through the DCI may include a transport block, and the PUSCH may be a PUSCH repeatedly transmitted in a PUSCH repetition type A or B scheme according to a PUSCH repetition type configured for the UE through higher layer signaling, and a repetition count configured in an entry of a TDRA field indicatable to the UE through DCI. An additional condition may be a combination of at least one of the following conditions.

[Condition 3-1-1] Two SRS resource sets having a usage configured to be codebook or non-codebook are configured by the base station for the UE through higher layer signaling (therefore, there is an SRS resource set indicator field in DCI), and the base station indicates "10" or "11" as an SRS resource set indicator in DCI

[Condition 3-1-2] CSI-AperiodicTriggerState in which the higher layer signaling AP-CSI-MultiplexingMode is configured is indicated to the UE through a CSI request field in DCI, and UCI other than the aperiodic CSI report is not multiplexed with the PUSCH With respect to [Condition 3-1] and a combination of at least one of [Condition 3-1-1] or [Condition 3-1-2] that is the detailed condition thereof, the UE and the base station may define a multiplexing method for an aperiodic CSI report by considering a combination of at least one of the methods described below.

1) [Method 3-1-1] The UE may multiplex the aperiodic CSI report with a PUSCH repetition, which is the earliest transmitted PUSCH repetition in time, among PUSCH repetitions to which a first beam is mapped, and a PUSCH repetition, which is the earliest transmitted PUSCH repetition in time, among PUSCH repetitions to which a second beam is mapped.

2) Through this operation, the UE may transfer the aperiodic CSI report to the base station with a short delay time.

2) If the UE is scheduled based on PUSCH repetition type B, the first PUSCH repetition may be a first actual repetition.

2) The PUSCH repetition to which the first beam is mapped may indicate PUSCH repetitions connected to a first SRS resource set among the two SRS resource sets having the higher layer signaling usage configured to be codebook or non-codebook.

2) The earliest transmitted PUSCH repetition in time, among the PUSCH repetitions to which the first beam is mapped, may be transmitted in an SBFD slot or a set of consecutive SBFD symbols or transmitted in a UL slot or a set of consecutive UL symbols.

2) The PUSCH repetitions to which the second beam is mapped may indicate PUSCH repetitions connected to a second SRS resource set among the two SRS resource sets having the higher layer signaling usage configured to be codebook or non-codebook.

2) The earliest transmitted PUSCH repetition in time, among the PUSCH repetitions to which the second beam is mapped, may be transmitted in an SBFD slot or a set of consecutive SBFD symbols or transmitted in a UL slot or a set of consecutive UL symbols.

2) The two PUSCH repetitions with which the aperiodic CSI report is multiplexed may be assumed to have the same resource amount (e.g., at least one of a total number of REs, the number of RBs per OFDM symbols, and the number of OFDM symbols). If an aperiodic CSI report is multiplexed with two PUSCH repetitions having the same resource amount and different connected beams, the base station may obtain spatial diversity when receiving the aperiodic CSI report, and the resource amounts of the PUSCHs are the same, whereby the process of combining and decoding two signals encoded with a polar code may be simplified.

3) As a method for a case where the resource amounts are different, the aperiodic CSI report may be multiplexed with a first transmitted PUSCH repetition among all PUSCH repetitions, the PUSCH repetition may be connected to the first or second SRS resource set, and the PUSCH repetition may be transmitted in an SBFD slot or a set of consecutive SBFD symbols or transmitted in a UL slot or a set of consecutive UL symbols. In this case, the UE may reduce a delay time at the time of aperiodic CSI reporting to the base station.

3) As another method, in a case where the resource amounts are different, the aperiodic CSI report may be multiplexed with a first transmitted PUSCH repetition among PUSCH repetitions transmitted in a UL slot or a set of consecutive UL symbols among all PUSCH repetitions, and the PUSCH repetition may be connected to the first or second SRS resource set. In this case, the UE may avoid an SBFD resource where downlink interference may exist at the time of aperiodic CSI reporting to the base station, so as to ensure the base station to stably receive the aperiodic CSI report.

3) As another method, in a case where the resource amounts are different, the UE may operate in a combination of at least one of [Method 3-1-1] to [Method 3-1-6].

2) For [Method 3-1-1], the UE may report, to the base station, a UE capability for multiplexing of an aperiodic CSI report during an SBFD operation.

3) For example, the UE and the base station may use [Method 3-1-1] according to the UE capability reporting of the UE, and there may be no particular higher layer signaling configurable by the base station for [Method 3-1-1].

3) As another example, the base station may configure, for the UE, a particular higher layer signaling having the meaning that [Method 3-1-1] is used, according to the UE capability reporting of the UE. If the higher layer signaling is not configured, the UE may operate in a combination of at least one of [Method 3-1-1] to [Method 3-1-6].

1) [Method 3-1-2] The UE may multiplex the aperiodic CSI report with a PUSCH repetition, which is transmitted in a UL slot or a set of consecutive UL symbols and is transmitted earliest in time, among PUSCH repetitions to which a first beam is mapped, and a PUSCH repetition, which is transmitted in a UL slot or a set of consecutive UL symbols and is transmitted earliest in time, among PUSCH repetitions to which a second beam is mapped.

2) Through this operation, the UE does not transmit the aperiodic CSI report in an SBFD slot or a set of consecutive SBFD symbols on which the reception performance at the base station may deteriorate because there may be downlink interference, whereby the base station may stably ensure aperiodic CSI report reception performance.

2) If the UE is scheduled based on PUSCH repetition type B, the first PUSCH repetition may be a first actual repetition.

2) The PUSCH repetition to which the first beam is mapped may indicate PUSCH repetitions connected to a first SRS resource set among the two SRS resource sets having the higher layer signaling usage configured to be codebook or non-codebook.

2) The PUSCH repetition to which the second beam is mapped may indicate PUSCH repetitions connected to a second SRS resource set among the two SRS resource sets having the higher layer signaling usage configured to be codebook or non-codebook.

2) The two PUSCH repetitions with which the aperiodic CSI report is multiplexed may be assumed to have the same resource amount (e.g., at least one of a total number of REs, the number of RBs per OFDM symbols, and the number of OFDM symbols). If an aperiodic CSI report is multiplexed with two PUSCH repetitions having the same resource amount and different connected beams, the base station may obtain spatial diversity when receiving the aperiodic CSI report, and the resource amounts of the PUSCHs are the same, whereby the process of combining and decoding two signals encoded with a polar code may be simplified.

3) As a method for a case where the resource amounts are different, the aperiodic CSI report may be multiplexed with a first transmitted PUSCH repetition among all PUSCH repetitions, the PUSCH repetition may be connected to the first or second SRS resource set, and the PUSCH repetition may be transmitted in an SBFD slot or a set of consecutive SBFD symbols or transmitted in a UL slot or a set of consecutive UL symbols. In this case, the UE may reduce a delay time at the time of aperiodic CSI reporting to the base station.

3) As another method, in a case where the resource amounts are different, the aperiodic CSI report may be multiplexed with a first transmitted PUSCH repetition among PUSCH repetitions transmitted in a UL slot or a set of consecutive UL symbols among all PUSCH repetitions, and the PUSCH repetition may be connected to the first or second SRS resource set. In this case, the UE may avoid an SBFD resource where downlink interference may exist at the time of aperiodic CSI reporting to the base station, so as to ensure the base station to stably receive the aperiodic CSI report.

3) As another method, in a case where the resource amounts are different, the UE may operate in a combination of at least one of [Method 3-1-1] to [Method 3-1-6].

2) For [Method 3-1-2], the UE may report, to the base station, a UE capability for multiplexing of an aperiodic CSI report during an SBFD operation.

3) As an example, the UE and the base station may use [Method 3-1-2] according to the UE capability reporting of the UE, and there may be no particular higher layer signaling configurable by the base station for [Method 3-1-2].

3) As another example, the base station may configure, for the UE, a particular higher layer signaling having the meaning that [Method 3-1-2] is used, according to the UE capability reporting of the UE. If the higher layer signaling is not configured, the UE may operate in a combination of at least one of [Method 3-1-1] to [Method 3-1-6].

1) [Method 3-1-3] The UE may multiplex the aperiodic CSI report with a PUSCH repetition, which is transmitted in an SBFD slot or a set of consecutive SBFD symbols and is transmitted earliest in time, among PUSCH repetitions to which a first beam is mapped, and a PUSCH repetition, which is transmitted in an SBFD slot or a set of consecutive SBFD symbols and is transmitted earliest in time, among PUSCH repetitions to which a second beam is mapped.

2) Through this operation, the UE may transfer the aperiodic CSI report to the base station with a short delay time, and may select PUSCH repetitions mapped to different beams and transmitted in the same session management function data sets panel (SMFD) resources so as to ensure a possibility that the aperiodic CSI is multiplexed with both of the PUSCH repetitions mapped to the different beams. However, this operation may be possible in a case where both of two TRPs support an SBFD operation, and may be largely affected by downlink interference.

2) If the UE is scheduled based on PUSCH repetition type B, the first PUSCH repetition may be a first actual repetition.

2) The PUSCH repetition to which the first beam is mapped may indicate PUSCH repetitions connected to a first SRS resource set among the two SRS resource sets having the higher layer signaling usage configured to be codebook or non-codebook.

2) The PUSCH repetition to which the second beam is mapped may indicate PUSCH repetitions connected to a second SRS resource set among the two SRS resource sets having the higher layer signaling usage configured to be codebook or non-codebook.

2) The two PUSCH repetitions with which the aperiodic CSI report is multiplexed may be assumed to have the same resource amount (e.g., at least one of a total number of REs, the number of RBs per OFDM symbols, and the number of OFDM symbols). If an aperiodic CSI report is multiplexed with two PUSCH repetitions having the same resource amount and different connected beams, the base station may obtain spatial diversity when receiving the aperiodic CSI report, and the resource amounts of the PUSCHs are the same, whereby the process of combining and decoding two signals encoded with a polar code may be simplified.

3) As a method for a case where the resource amounts are different, the aperiodic CSI report may be multiplexed with a first transmitted PUSCH repetition among all PUSCH repetitions, the PUSCH repetition may be connected to the first or second SRS resource set, and the PUSCH repetition may be transmitted in an SBFD slot or a set of consecutive SBFD symbols or transmitted in a UL slot or a set of consecutive UL symbols. In this case, the UE may reduce a delay time at the time of aperiodic CSI reporting to the base station.

3) As another method, in a case where the resource amounts are different, the aperiodic CSI report may be multiplexed with a first transmitted PUSCH repetition among PUSCH repetitions transmitted in a UL slot or a set of consecutive UL symbols among all PUSCH repetitions, and the PUSCH repetition may be connected to the first or second SRS resource set. In this case, the UE may avoid an SBFD resource where downlink interference may exist at the time of aperiodic CSI reporting to the base station, so as to ensure the base station to stably receive the aperiodic CSI report.

3) As another method, in a case where the resource amounts are different, the UE may operate in a combination of at least one of [Method 3-1-1] to [Method 3-1-6].

2) For [Method 3-1-3], the UE may report, to the base station, a UE capability for multiplexing of an aperiodic CSI report during an SBFD operation.

3) As an example, the UE and the base station may use [Method 3-1-3] according to the UE capability reporting of the UE, and there may be no particular higher layer signaling configurable by the base station for [Method 3-1-3].

3) As another example, the base station may configure, for the UE, a particular higher layer signaling having the meaning that [Method 3-1-3] is used, according to the UE capability reporting of the UE. If the higher layer signaling is not configured, the UE may operate in a combination of at least one of [Method 3-1-1] to [Method 3-1-6].

1) [Method 3-1-4] The UE may multiplex the aperiodic CSI report with a PUSCH repetition, which is transmitted in an SBFD slot or a set of consecutive SBFD symbols and is transmitted earliest in time, among PUSCH repetitions to which a first beam is mapped, and a PUSCH repetition, which is transmitted in a UL slot or a set of consecutive UL symbols and is transmitted earliest in time, among PUSCH repetitions to which a second beam is mapped.

2) Through this operation, the UE may transfer the aperiodic CSI report to the base station with a short delay time, and may apply same in a case where both of two TRPs are unable to support an SBFD operation.

2) If the UE is scheduled based on PUSCH repetition type B, the first PUSCH repetition may be a first actual repetition.

2) The PUSCH repetition to which the first beam is mapped may indicate PUSCH repetitions connected to a first SRS resource set among the two SRS resource sets having the higher layer signaling usage configured to be codebook or non-codebook.

2) The PUSCH repetition to which the second beam is mapped may indicate PUSCH repetitions connected to a second SRS resource set among the two SRS resource sets having the higher layer signaling usage configured to be codebook or non-codebook.

2) The two PUSCH repetitions with which the aperiodic CSI report is multiplexed may be assumed to have the same resource amount (e.g., at least one of a total number of REs, the number of RBs per OFDM symbols, and the number of OFDM symbols). If an aperiodic CSI report is multiplexed with two PUSCH repetitions having the same resource amount and different connected beams, the base station may obtain spatial diversity when receiving the aperiodic CSI report, and the resource amounts of the PUSCHs are the same, whereby the process of combining and decoding two signals encoded with a polar code may be simplified.

3) As a method for a case where the resource amounts are different, the aperiodic CSI report may be multiplexed with a first transmitted PUSCH repetition among all PUSCH repetitions, the PUSCH repetition may be connected to the first or second SRS resource set, and the PUSCH repetition may be transmitted in an SBFD slot or a set of consecutive SBFD symbols or transmitted in a UL slot or a set of consecutive UL symbols. In this case, the UE may reduce a delay time at the time of aperiodic CSI reporting to the base station.

3) As another method, in a case where the resource amounts are different, the aperiodic CSI report may be multiplexed with a first transmitted PUSCH repetition among PUSCH repetitions transmitted in a UL slot or a set of consecutive UL symbols among all PUSCH repetitions, and the PUSCH repetition may be connected to the first or second SRS resource set. In this case, the UE may avoid an SBFD resource where downlink interference may exist at the time of aperiodic CSI reporting to the base station, so as to ensure the base station to stably receive the aperiodic CSI report.

3) As another method, in a case where the resource amounts are different, the UE may operate in a combination of at least one of [Method 3-1-1] to [Method 3-1-6].

2) For [Method 3-1-4], the UE may report, to the base station, a UE capability for multiplexing of an aperiodic CSI report during an SBFD operation.

3) As an example, the UE and the base station may use [Method 3-1-4] according to the UE capability reporting of the UE, and there may be no particular higher layer signaling configurable by the base station for [Method 3-1-4].

3) As another example, the base station may configure, for the UE, a particular higher layer signaling having the meaning that [Method 3-1-4] is used, configured, the UE may operate in a combination of at least one of [Method 3-1-1] to [Method 3-1-6].

1) [Method 3-1-5] The UE may multiplex the aperiodic CSI report with an X1-th PUSCH repetition which is transmitted in an SBFD slot or a set of consecutive SBFD symbols among PUSCH repetitions to which a first beam is mapped, and an X2-th PUSCH repetition which is transmitted in a UL slot or a set of consecutive UL symbols among PUSCH repetitions to which a second beam is mapped.

2) X1 and X2 may be notified of by the base station through a combination of at least one of higher layer signaling, MAC-CE, and L1 signaling, or at least one of X1 or X2 may be used as a fixed value. For example, the UE may be notified of the X1 value by the base station as described above, and fix and use 1 as X2.

2) Through this operation, the UE may multiplex and transfer the aperiodic CSI report with and on a particular position notified of by the base station and thus there is a high probability that the resource amounts of the two PUSCH repetitions may become identical. In particular, an indication of the X1 value may help the UE in avoiding interference occurring due to a downlink signal when the UE multiplexes the aperiodic CSI report with a PUSCH repetition in a case where the base station recognizes a certain amount of an interference situation caused by a downlink situation on SBFD resources.

2) As another method, the PUSCH repetition to which the first beam is mapped and the PUSCH repetition to which the second beam is mapped may be transmitted in one of an SBFD slot or a set of consecutive SBFD symbols and a UL slot or a set of consecutive UL symbols.

2) If the UE is scheduled based on PUSCH repetition type B, the first PUSCH repetition may be a first actual repetition.

2) The PUSCH repetition to which the first beam is mapped may indicate PUSCH repetitions connected to a first SRS resource set among the two SRS resource sets having the higher layer signaling usage configured to be codebook or non-codebook.

2) The PUSCH repetition to which the second beam is mapped may indicate PUSCH repetitions connected to a second SRS resource set among the two SRS resource sets having the higher layer signaling usage configured to be codebook or non-codebook.

2) The two PUSCH repetitions with which the aperiodic CSI report is multiplexed may be assumed to have the same resource amount (e.g., at least one of a total number of REs, the number of RBs per OFDM symbols, and the number of OFDM symbols). If an aperiodic CSI report is multiplexed with two PUSCH repetitions having the same resource amount and different connected beams, the base station may obtain spatial diversity when receiving the aperiodic CSI report, and the resource amounts of the PUSCHs are the same, whereby the process of combining and decoding two signals encoded with a polar code may be simplified.

3) As a method for a case where the resource amounts are different, the aperiodic CSI report may be multiplexed with a first transmitted PUSCH repetition among all PUSCH repetitions, the PUSCH repetition may be connected to the first or second SRS resource set, and the PUSCH repetition may be transmitted in an SBFD slot or a set of consecutive SBFD symbols or transmitted in a UL slot or a set of consecutive UL symbols. In this case, the UE may reduce a delay time at the time of aperiodic CSI reporting to the base station.

3) As another method, in a case where the resource amounts are different, the aperiodic CSI report may be multiplexed with a first transmitted PUSCH repetition among PUSCH repetitions transmitted in a UL slot or a set of consecutive UL symbols among all PUSCH repetitions, and the PUSCH repetition may be connected to the first or second SRS resource set. In this case, the UE may avoid an SBFD resource where downlink interference may exist at the time of aperiodic CSI reporting to the base station, so as to ensure the base station to stably receive the aperiodic CSI report.

3) As another method, in a case where the resource amounts are different, the UE may operate in a combination of at least one of [Method 3-1-1] to [Method 3-1-6].

2) For [Method 3-1-5], the UE may report, to the base station, a UE capability for multiplexing of an aperiodic CSI report during an SBFD operation.

3) As an example, the UE and the base station may use [Method 3-1-5] according to the UE capability reporting of the UE, and there may be no particular higher layer signaling configurable by the base station for [Method 3-1-5].

3) As another example, the base station may configure, for the UE, a particular higher layer signaling having the meaning that [Method 3-1-5] is used, according to the UE capability reporting of the UE. If the higher layer signaling is not configured, the UE may operate in a combination of at least one of [Method 3-1-1] to [Method 3-1-6].

1) [Method 3-1-6] The UE may be notified to use a combination of at least one of [Method 3-1-1] to [Method 3-1-5] described above by the base station through a combination of at least one of higher layer signaling, MAC-CE, and L1 signaling, or a combination of at least one may be fixedly defined in a specification. For example, in a case where the UE receives an SBFD configuration and resource allocation information from the base station, when an aperiodic CSI report is indicated from the base station through DCI and multi-TRP PUSCH repetition is scheduled, the UE may define [Method 3-1-1] described above as a method fixed in a specification as a method of multiplexing an aperiodic CSI report. As another example, the UE may be notified by the base station of one of [Method 3-1-1] to [Method 3-1-4] described above through a combination of at least one of higher layer signaling, MAC-CE, and L1 signaling. As another example, the UE may be notified by the base station of one of [Method 3-1-1] and [Method 3-1-5] described above through a combination of at least one of higher layer signaling, MAC-CE, and L1 signaling. The above description may merely correspond to an example, and other combinations may be possible.

2) For [Method 3-1-6], the UE may report, to the base station, a UE capability for multiplexing of an aperiodic CSI report during an SBFD operation.

3) For example, the UE and the base station may use [Method 3-1-6] according to the UE capability reporting of the UE, and there may be no particular higher layer signaling configurable by the base station for [Method 3-1-6].

3) As another example, the base station may configure, for the UE, a particular higher layer signaling having the meaning that [Method 3-1-6] is used, configured, the UE may operate in a combination of at least one of [Method 3-1-1] to [Method 3-1-6].

<(3-2)th Embodiment: Method of Multiplexing Aperiodic CSI Report or Semi-Persistent CSI Report at Time of Scheduling of PUSCH Repetition not Including Transport Block>

[Condition 3-2]

In a case where a UE receives an aperiodic CSI report or semi-persistent CSI report indication from a base station through DCI, a PUSCH scheduled through the DCI may not include a transport block, and the PUSCH may be a PUSCH repeatedly transmitted in a PUSCH repetition type A or B scheme according to a PUSCH repetition type configured for the UE through higher layer signaling, and a repetition count configured in an entry of a TDRA field indicatable to the UE through DCI. An additional condition may be a combination of at least one of the following conditions.

1) [Condition 3-2-1] Two SRS resource sets having a usage configured to be codebook or non-codebook are configured by the base station for the UE through higher layer signaling (therefore, there is an SRS resource set indicator field in DCI), and the base station indicates "10" or "11" as an SRS resource set indicator in DCI 1) [Condition 3-2-2] CSI-AperiodicTriggerState in which the higher layer signaling AP-CSI-MultiplexingMode is configured is indicated to the UE through a CSI request field in DCI, and UCI other than the aperiodic CSI report is not multiplexed with the PUSCH 1) [Condition 3-2-3] CSI-SemiPersistentOnPUSCH-TriggerState or CSI-SemiPersistentOnPUSCH-TriggerStateList in which the higher layer signaling SP-CSI-Multiplexing-Mode is configured is indicated to the UE through a CSI request field in DCI, and UCI other than the semi-persistent CSI report is not multiplexed with the PUSCH 1) [Condition 3-2-4] A PUSCH transmission is the first PUSCH transmission after receiving DCI indicating a semi-persistent CSI report 1) [Condition 3-2-5] The PUSCH is a PUSCH transmitted without DCI scheduling in the next period after the first PUSCH transmission after receiving DCI indicating a semi-persistent CSI report With respect to [Condition 3-2] and a combination of at least one of [Condition 3-2-1] or [Condition 3-2-5] that is the detailed condition thereof, the UE and the base station may define a multiplexing method for an aperiodic CSI report or semi-persistent CSI report by considering a combination of at least one of the methods described below.

1) [Method 3-2-1] The UE may consider/determine/identify 2 as a repetition count regardless of the indicated repetition count. Two PUSCH repetitions may be a first PUSCH repetition among PUSCH repetitions to which a first beam is mapped and a first PUSCH repetition among PUSCH repetitions to which a second beam is mapped. The UE may perform a detailed operation as below according to PUSCH repetition type A or B configurable through higher layer signaling.

2) Through this operation, the UE may transfer the aperiodic CSI report to the base station with a short delay time.

2) The PUSCH repetition to which the first beam is mapped may indicate PUSCH repetitions connected to a first SRS resource set among the two SRS resource sets having the higher layer signaling usage configured to be codebook or non-codebook. The PUSCH repetition to which the second beam is mapped may indicate PUSCH repetitions connected to a second SRS resource set among the two SRS resource sets having the higher layer signaling usage configured to be codebook or non-codebook.

2) In a case of PUSCH repetition type A, the PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

3) The UE may multiplex the aperiodic CSI report or semi-persistent CSI report with the two PUSCH repetitions if the UE receives DCI indicating an aperiodic CSI report, if a PUSCH transmission is the first PUSCH transmission after receiving DCI indicating a semi-persistent CSI report, or if the PUSCH is a PUSCH transmitted without DCI scheduling in the next period after the first PUSCH transmission after receiving DCI indicating a semi-persistent CSI report.

4) For example, the UE may consider/determine/identify that the two PUSCH repetitions have the same time and/or frequency resource amounts (e.g., at least one of an OFDM symbol length, the number of RBs per symbol, and a total number of REs). For example, the UE may expect that the base station ensures the first two PUSCH repetitions to have the same time and/or frequency resource amounts.

4) As another example, the UE may multiplex the aperiodic CSI report with the two PUSCH repetitions only when a particular condition is satisfied, and the condition may be a combination of at least one of the following items.

5) The two PUSCH repetitions have the same OFDM symbol length

5) The two PUSCH repetitions have the same frequency resource amount

5) The two PUSCH repetitions have the same number of REs

5) If the particular condition is not satisfied, the UE may operate according to a combination of at least one of [Method 3-2-1] to [Method 3-2-6], or may multiplex the aperiodic CSI report with a first PUSCH repetition among the two PUSCH repetitions, with a second PUSCH repetition, with a PUSCH repetition notified of through higher layer signaling, MAC-CE, or L1 signaling, with a PUSCH repetition having a larger time and/or frequency resource amount or a PUSCH repetition having a smaller resource amount, with a PUSCH repetition transmitted on an uplink slot or a set of consecutive uplink symbols, or with a PUSCH repetition transmitted on an SBFD slot or a set of consecutive SBFD symbols.

2) In a case of PUSCH repetition type B, the UE may consider/determine/identify 2 as the number of nominal repetitions, and the PUSCH repetition count may be a value configured through the higher layer signaling numberOfRepetitions in an entry indicated through a TDRA field.

3) If the UE receives DCI indicating an aperiodic CSI report, or if a PUSCH transmission is the first PUSCH transmission after receiving DCI indicating semi-persistent CSI report, 4) The UE may consider/determine/identify that a first nominal repetition has the same time and/or frequency resource amount as a first actual repetition (e.g., an OFDM symbol length, the number of RBs per symbol, or a total number of REs), and may consider/determine/identify that a second nominal repetition has the same time and/or frequency resource amount as a second actual repetition (e.g., an OFDM symbol length, the number of RBs per symbol, or a total number of REs). In addition, the UE may multiplex the aperiodic CSI report or semi-consistent CSI report with both of the first and second actual repetitions.

4) As another example, the UE may multiplex the aperiodic CSI report with the first and second actual repetitions only when a particular condition is satisfied, and the condition may be a combination of at least one of the following items.

5) The first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition 5) If the particular condition is not satisfied, the UE may operate according to a combination of at least one of [Method 3-2-1] to [Method 3-2-6], or may multiplex the aperiodic CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols.

3) If the PUSCH is a PUSCH transmitted without DCI scheduling in the next period after the first PUSCH transmission after receiving DCI indicating a semi-persistent CSI report, 4) If the first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition, the UE may multiplex the semi-consistent CSI report with both of the first and second actual repetitions.

4) If the first nominal repetition has a time and/or frequency resource amount different from that of the first actual repetition (e.g., an OFDM symbol length, the number of RBs per symbol, or a total number of REs), and the second nominal repetition has the same time and/or frequency resource amount as the second actual repetition, the UE may disregard transmission for the first actual repetition, and multiplex the semi-consistent CSI report with the second actual repetition.

4) In addition, if the first nominal repetition has the same time and/or frequency resource amount as the first actual repetition (e.g., an OFDM symbol length, the number of RBs per symbol, or a total number of REs), and the second nominal repetition has a time and/or frequency resource amount different from that of the second actual repetition, the UE may disregard transmission for the second actual repetition, and multiplex the semi-consistent CSI report with the first actual repetition.

4) In addition, if the first nominal repetition has a time and/or frequency resource amount different from that of the first actual repetition (e.g., an OFDM symbol length, the number of RBs per symbol, or a total number of REs), and the second nominal repetition has a time and/or frequency resource amount different from that of the second actual repetition, the UE may operate according to a combination of at least one of [Method 3-2-1] to [Method 3-2-6], or may multiplex the semi-persistent CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols, and may disregard transmission for the remaining one actual repetition.

2) For [Method 3-2-1], the UE may report, to the base station, a UE capability for multiplexing an aperiodic CSI report or semi-persistent CSI during an SBFD operation.

3) For example, the UE and the base station may use [Method 3-2-1] according to the UE capability reporting of the UE, and there may be no particular higher layer signaling configurable by the base station for [Method 3-2-1].

3) As another example, the base station may configure, for the UE, a particular higher layer signaling having the meaning that [Method 3-2-1] is used, according to the UE capability reporting of the UE. If the higher layer signaling is not configured, the UE may operate in a combination of at least one of [Method 3-2-1] to [Method 3-2-6].

1) [Method 3-2-2] The UE may consider/determine/identify 2 as a repetition count regardless of the indicated repetition count. Two PUSCH repetitions may be a PUSCH repetition, which is transmitted in a UL slot or a set of consecutive UL symbols and is transmitted earliest in time, among PUSCH repetitions to which a first beam is mapped, and a PUSCH repetition, which is transmitted in a UL slot or a set of consecutive UL symbols and is transmitted earliest in time, among PUSCH repetitions to which a second beam is mapped. The UE may perform a detailed operation as below according to PUSCH repetition type A or B configurable through higher layer signaling.

2) Through this operation, the UE does not transmit the aperiodic CSI report or semi-persistent CSI report in an SBFD slot or a set of consecutive SBFD symbols on which the reception performance at the base station may deteriorate because there may be downlink interference, whereby the base station may stably ensure reception performance for the aperiodic CSI report or semi-persistent CSI report.

2) The PUSCH repetition to which the first beam is mapped may indicate PUSCH repetitions connected to a first SRS resource set among the two SRS resource sets having the higher layer signaling usage configured to be codebook or non-codebook. The PUSCH repetition to which the second beam is mapped may indicate PUSCH repetitions connected to a second SRS resource set among the two SRS resource sets having the higher layer signaling usage configured to be codebook or non-codebook.

2) In a case of PUSCH repetition type A, the PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

3) If the UE receives DCI indicating an aperiodic CSI report, if a PUSCH transmission is the first PUSCH transmission after receiving DCI indicating a semi-persistent CSI report, or if the PUSCH is a PUSCH transmitted without DCI scheduling in the next period after the first PUSCH transmission after receiving DCI indicating a semi-persistent CSI report, the UE may multiplex the aperiodic CSI report or semi-persistent CSI report with the PUSCH repetition, which is transmitted in a UL slot or a set of consecutive UL symbols and is transmitted earliest in time, among the PUSCH repetitions to which the first beam is mapped, and the PUSCH repetition, which is transmitted in a UL slot or a set of consecutive UL symbols and is transmitted earliest in time, among the PUSCH repetitions to which the second beam is mapped.

4) As an example, the UE may consider/determine/identify that the PUSCH repetition, which is transmitted in a UL slot or a set of consecutive UL symbols and is transmitted earliest in time, among the PUSCH repetitions to which the first beam is mapped, and a PUSCH repetition, which is transmitted in a UL slot or a set of consecutive UL symbols and is transmitted earliest in time, among the PUSCH repetitions to which the second beam is mapped have the same time and/or frequency resource amount (e.g., an OFDM symbol length, the number of RBs per symbol, or a total number of REs). For example, the UE may expect that the base station ensures, to have the same time and/or frequency resource amount, the PUSCH repetition, which is transmitted in a UL slot or a set of consecutive UL symbols and is transmitted earliest in time, among the PUSCH repetitions to which the first beam is mapped, and a PUSCH repetition, which is transmitted in a UL slot or a set of consecutive UL symbols and is transmitted earliest in time, among the PUSCH repetitions to which the second beam is mapped.

4) As another example, only when a particular condition is satisfied, the UE may multiplex the aperiodic CSI report with the PUSCH repetition, which is transmitted in a UL slot or a set of consecutive UL symbols and is transmitted earliest in time, among the PUSCH repetitions to which the first beam is mapped, and a PUSCH repetition, which is transmitted in a UL slot or a set of consecutive UL symbols and is transmitted earliest in time, among the PUSCH repetitions to which the second beam is mapped, and the condition may be a combination of at least one of the following items.

5) The two PUSCH repetitions have the same OFDM symbol length

5) The two PUSCH repetitions have the same frequency resource amount

5) The two PUSCH repetitions have the same number of REs

5) If the particular condition is not satisfied or at least one of the two PUSCH repetitions does not occur (i.e., if all of the PUSCH repetitions to which the first beam is mapped are transmitted in an SBFD slot or a set of consecutive SBFD symbols, or all of the PUSCH repetitions to which the second beam is mapped are transmitted in an SBFD slot or a set of consecutive SBFD symbols), the UE may operate according to a combination of at least one of [Method 3-2-1] to [Method 3-2-6], or may multiplex the aperiodic CSI report with one PUSCH repetition among the two PUSCH repetitions, and the one PUSCH repetition may correspond to a PUSCH repetition transmitted in a first uplink slot or a first set of consecutive uplink symbols, a PUSCH repetition transmitted in a first SBFD slot or a first set of consecutive SBFD symbols, a PUSCH repetition appearing first in the time dimension among the two PUSCH repetitions, a PUSCH repetition notified of through higher layer signaling, MAC-CE, or L1 signaling, a PUSCH repetition having a larger time and/or frequency resource amount, or a PUSCH repetition having a smaller time and/or frequency resource amount.

2) In a case of PUSCH repetition type B, the UE may consider/determine/identify 2 as a nominal repetition value regardless of a configured and indicated nominal repetition value, and the PUSCH repetition count may be a value configured through the higher layer signaling numberOf-Repetitions in an entry indicated through a TDRA field.

3) If the UE receives DCI indicating an aperiodic CSI report, or if a PUSCH transmission is the first PUSCH transmission after receiving DCI indicating semi-persistent CSI report, 4) The UE may consider/determine/identify that a first nominal repetition has the same time and/or frequency resource amount as a first actual repetition (e.g., an OFDM symbol length, the number of RBs per symbol, or a total number of REs), and may consider/determine/identify that a second nominal repetition has the same time and/or frequency resource amount as a second actual repetition (e.g., an OFDM symbol length, the number of RBs per symbol, or a total number of REs). In addition, the UE may multiplex the aperiodic CSI report or semi-consistent CSI report with both of the first and second actual repetitions.

4) As another example, the UE may multiplex the aperiodic CSI report with the first and second actual repetitions only when a particular condition is satisfied, and the condition may be a combination of at least one of the following items.

5) The first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition 5) If the particular condition is not satisfied or at least one of the two PUSCH repetitions does not occur (i.e., if all of the PUSCH repetitions to which the first beam is mapped are transmitted in an SBFD slot or a set of consecutive SBFD symbols, or all of the PUSCH repetitions to which the second beam is mapped are transmitted in an SBFD slot or a set of consecutive SBFD symbols), the UE may operate according to a combination of at least one of [Method 3-2-1] to [Method 3-2-6], or may multiplex the aperiodic CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols.

3) If the PUSCH is a PUSCH transmitted without DCI scheduling in the next period after the first PUSCH transmission after receiving DCI indicating a semi-persistent CSI report, 4) If the first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition, the UE may multiplex the semi-consistent CSI report with both of the first and second actual repetitions.

4) If the first nominal repetition has a time and/or frequency resource amount different from that of the first actual repetition (e.g., an OFDM symbol length, the number of RBs per symbol, or a total number of REs), and the second nominal repetition has the same time and/or frequency resource amount as the second actual repetition, the UE may disregard transmission for the first actual repetition, and multiplex the semi-consistent CSI report with the second actual repetition.

4) In addition, if the first nominal repetition has the same time and/or frequency resource amount as the first actual repetition (e.g., an OFDM symbol length, the number of RBs per symbol, or a total number of REs), and the second nominal repetition has a time and/or frequency resource amount different from that of the second actual repetition, the UE may disregard transmission for the second actual repetition, and multiplex the semi-consistent CSI report with the first actual repetition.

4) In addition, if the first nominal repetition has a time and/or frequency resource amount different from that of the first actual repetition (e.g., an OFDM symbol length, the number of RBs per symbol, or a total number of REs) and the second nominal repetition has a time and/or frequency resource amount different from that of the second actual repetition, or at least one of the two PUSCH repetitions does not occur (i.e., if all of the PUSCH repetitions to which the first beam is mapped are transmitted in an SBFD slot or a set of consecutive SBFD symbols, or all of the PUSCH repetitions to which the second beam is mapped are transmitted in an SBFD slot or a set of consecutive SBFD symbols), the UE may operate according to a combination of at least one of [Method 3-2-1] to [Method 3-2-6], or may multiplex the semi-persistent CSI report with the first actual repetition among a PUSCH repetition transmitted in a first uplink slot or a first set of consecutive uplink symbols and a PUSCH repetition transmitted in a first SBFD slot or a first set of consecutive SBFD symbols, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols, and may disregard transmission for the remaining one actual repetition.

2) For [Method 3-2-2], the UE may report, to the base station, a UE capability for multiplexing an aperiodic CSI report or semi-persistent CSI during an SBFD operation.

3) For example, the UE and the base station may use [Method 3-2-2] according to the UE capability reporting of the UE, and there may be no particular higher layer signaling configurable by the base station for [Method 3-2-2].

3) As another example, the base station may configure, for the UE, a particular higher layer signaling having the meaning that [Method 3-2-2] is used, according to the UE capability reporting of the UE. If the higher layer signaling is not configured, the UE may operate in a combination of at least one of [Method 3-2-1] to [Method 3-2-6].

1) [Method 3-2-3] The UE may consider/determine/identify 2 as a repetition count regardless of the indicated repetition count. Two PUSCH repetitions may be a PUSCH repetition, which is transmitted in an SBFD slot or a set of consecutive SBFD symbols and is transmitted earliest in time, among PUSCH repetitions to which a first beam is mapped, and a PUSCH repetition, which is transmitted in an SBFD slot or a set of consecutive SBFD symbols and is transmitted earliest in time, among PUSCH repetitions to which a second beam is mapped. The UE may perform a detailed operation as below according to PUSCH repetition type A or B configurable through higher layer signaling.

2) Through this operation, the UE may transfer the aperiodic CSI report to the base station with a short delay time, and may select PUSCH repetitions mapped to different beams and transmitted in the same SMFD resources so as to ensure a possibility that the aperiodic CSI is multiplexed with both of the PUSCH repetitions mapped to the different beams. However, this operation may be possible in a case where both of two TRPs support an SBFD operation, and may be largely affected by downlink interference.

2) The PUSCH repetition to which the first beam is mapped may indicate PUSCH repetitions connected to a first SRS resource set among the two SRS resource sets having the higher layer signaling usage configured to be codebook or non-codebook. The PUSCH repetition to which the second beam is mapped may indicate PUSCH repetitions connected to a second SRS resource set among the two SRS resource sets having the higher layer signaling usage configured to be codebook or non-codebook.

2) In a case of PUSCH repetition type A, the PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

3) The UE may multiplex the aperiodic CSI report or semi-persistent CSI report with the two PUSCH repetitions if the UE receives DCI indicating an aperiodic CSI report, if a PUSCH transmission is the first PUSCH transmission after receiving DCI indicating a semi-persistent CSI report, or if the PUSCH is a PUSCH transmitted without DCI scheduling in the next period after the first PUSCH transmission after receiving DCI indicating a semi-persistent CSI report.

4) For example, the UE may consider/determine/identify that the two PUSCH repetitions have the same time and/or frequency resource amounts (e.g., an OFDM symbol length, the number of RBs per symbol, or a total number of REs). For example, the UE may expect that the base station ensures the two PUSCH repetitions to have the same time and/or frequency resource amounts.

4) As another example, the UE may multiplex the aperiodic CSI report with the two PUSCH repetitions only when a particular condition is satisfied, and the condition may be a combination of at least one of the following items.

5) The two PUSCH repetitions have the same OFDM symbol length

5) The two PUSCH repetitions have the same frequency resource amount

5) The two PUSCH repetitions have the same number of REs

5) If the particular condition is not satisfied or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the aperiodic CSI report with one PUSCH repetition among a PUSCH repetition transmitted in a first SBFD slot or a first set of consecutive SBFD symbols and a PUSCH repetition transmitted in a second SBFD slot or a second set of consecutive SBFD symbols, and the one PUSCH repetition may correspond to the PUSCH repetition transmitted in the first SBFD slot or the first set of consecutive SBFD symbols, the PUSCH repetition transmitted in the second SBFD slot or the second set of consecutive SBFD symbols, a PUSCH repetition appearing first in the time dimension among the two PUSCH repetitions, a PUSCH repetition notified of through higher layer signaling, MAC-CE, or L1 signaling, a PUSCH repetition having a larger time and/or frequency resource amount or a PUSCH repetition having a smaller time and/or frequency resource amount, or a PUSCH repetition transmitted on an uplink slot or a set of consecutive uplink symbols or a PUSCH repetition transmitted on an SBFD slot or a set of consecutive SBFD symbols.

2) In a case of PUSCH repetition type B, the UE may consider/determine/identify 2 as a nominal repetition value regardless of a configured and indicated nominal repetition value. In this case, the PUSCH repetition count may be a value configured through the higher layer signaling numberOfRepetitions in an entry indicated through a TDRA field.

3) If the UE receives DCI indicating an aperiodic CSI report, or if a PUSCH transmission is the first PUSCH transmission after receiving DCI indicating semi-persistent CSI report, 4) The UE may consider/determine/identify that a first nominal repetition has the same time and/or frequency resource amount as a first actual repetition (e.g., an OFDM symbol length, the number of RBs per symbol, or a total number of REs), and may consider/determine/identify that a second nominal repetition has the same time and/or frequency resource amount as a second actual repetition (e.g., an OFDM symbol length, the number of RBs per symbol, or a total number of REs). In addition, the UE may multiplex the aperiodic CSI report or semi-consistent CSI report with both of the first and second actual repetitions.

4) As another example, the UE may multiplex the aperiodic CSI report with the first and second actual repetitions only when a particular condition is satisfied, and the condition may be a combination of at least one of the following items.

5) The first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition 5) If the particular condition is not satisfied or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the aperiodic CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols.

3) If the PUSCH is a PUSCH transmitted without DCI scheduling in the next period after the first PUSCH transmission after the UE receives DCI indicating a semi-persistent CSI report, 4) If the first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition, the UE may multiplex the semi-consistent CSI report with both of the first and second actual repetitions.

4) If the first nominal repetition has a time and/or frequency resource amount different from that of the first actual repetition (e.g., an OFDM symbol length, the number of RBs per symbol, or a total number of REs), and the second nominal repetition has the same time and/or frequency resource amount as the second actual repetition, the UE may disregard transmission for the first actual repetition, and multiplex the semi-consistent CSI report with the second actual repetition.

4) In addition, if the first nominal repetition has the same time and/or frequency resource amount as the first actual repetition (e.g., an OFDM symbol length, the number of RBs per symbol, or a total number of REs), and the second nominal repetition has a time and/or frequency resource amount different from that of the second actual repetition (e.g., an OFDM symbol length, the number of RBs per symbol, or a total number of REs), the UE may disregard transmission for the second actual repetition, and multiplex the semi-consistent CSI report with the first actual repetition.

4) In addition, if the first nominal repetition has a time and/or frequency resource amount different from that of the first actual repetition (e.g., an OFDM symbol length, the number of RBs per symbol, or a total number of REs) and the second nominal repetition has a time and/or frequency resource amount different from that of the second actual repetition, or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the semi-persistent CSI report with the first actual repetition among a PUSCH repetition transmitted in a first SBFD slot or a first set of consecutive SBFD symbols and a PUSCH repetition transmitted in a second SBFD slot or a second set of consecutive SBFD symbols, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols, and may disregard transmission for the remaining one actual repetition.

2) For [Method 3-2-3], the UE may report, to the base station, a UE capability for multiplexing an aperiodic CSI report or semi-persistent CSI during an SBFD operation.

3) For example, the UE and the base station may use [Method 3-2-3] according to the UE capability reporting of the UE, and there may be no particular higher layer signaling configurable by the base station for [Method 3-2-3].

3) As another example, the base station may configure, for the UE, a particular higher layer signaling having the meaning that [Method 3-2-3] is used, according to the UE capability reporting of the UE. If the higher layer signaling is not configured, the UE may operate in a combination of at least one of [Method 3-2-1] to [Method 3-2-6].

1) [Method 3-2-4] The UE may consider/determine/identify 2 as a repetition count regardless of the indicated repetition count. Two PUSCH repetitions may be a PUSCH repetition, which is transmitted in an SBFD slot or a set of consecutive SBFD symbols and is transmitted earliest in time, among PUSCH repetitions to which a first beam is mapped, and a PUSCH repetition, which is transmitted in a UL slot or a set of consecutive UL symbols and is transmitted earliest in time, among PUSCH repetitions to which a second beam is mapped. The UE may perform a detailed operation as below according to PUSCH repetition type A or B configurable through higher layer signaling.

2) Through this operation, the UE may transfer the aperiodic CSI report to the base station with a short delay time, and may apply same in a case where both of two TRPs are unable to support an SBFD operation.

2) The PUSCH repetition to which the first beam is mapped may indicate PUSCH repetitions connected to a first SRS resource set among the two SRS resource sets having the higher layer signaling usage configured to be codebook or non-codebook. The PUSCH repetition to which the second beam is mapped may indicate PUSCH repetitions connected to a second SRS resource set among the two SRS resource sets having the higher layer signaling usage configured to be codebook or non-codebook.

2) In a case of PUSCH repetition type A, the PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

3) The UE may multiplex the aperiodic CSI report or semi-persistent CSI report with the two PUSCH repetitions if the UE receives DCI indicating an aperiodic CSI report, if a PUSCH transmission is the first PUSCH transmission after receiving DCI indicating a semi-persistent CSI report, or if the PUSCH is a PUSCH transmitted without DCI scheduling in the next period after the first PUSCH transmission after receiving DCI indicating a semi-persistent CSI report.

4) For example, the UE may consider/determine/identify that the two PUSCH repetitions have the same time and/or frequency resource amounts (e.g., an OFDM symbol length, the number of RBs per symbol, or a total number of REs). For example, the UE may expect that the base station ensures the two PUSCH repetitions to have the same time and/or frequency resource amounts.

4) As another example, the UE may multiplex the aperiodic CSI report with the two PUSCH repetitions only when a particular condition is satisfied, and the condition may be a combination of at least one of the following items.

5) The two PUSCH repetitions have the same OFDM symbol length

5) The two PUSCH repetitions have the same frequency resource amount

5) The two PUSCH repetitions have the same number of REs

5) If the particular condition is not satisfied or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the aperiodic CSI report with one PUSCH repetition among the two PUSCH repetitions, and the one PUSCH repetition may correspond to the PUSCH repetition transmitted in the first SBFD slot or the first set of consecutive SBFD symbols, a PUSCH repetition appearing first in the time dimension among the two PUSCH repetitions, a PUSCH repetition notified of through higher layer signaling, MAC-CE, or L1 signaling, a PUSCH repetition having a larger time and/or frequency resource amount or a PUSCH repetition having a smaller time and/or frequency resource amount, or a PUSCH repetition transmitted on an uplink slot or a set of consecutive uplink symbols or a PUSCH repetition transmitted on an SBFD slot or a set of consecutive SBFD symbols.

2) In a case of PUSCH repetition type B, the UE may consider/determine/identify 2 as a nominal repetition value regardless of a configured and indicated nominal repetition value, and the PUSCH repetition count may be a value configured through the higher layer signaling numberOf-Repetitions in an entry indicated through a TDRA field.

3) If the UE receives DCI indicating an aperiodic CSI report, or if a PUSCH transmission is the first PUSCH transmission after receiving DCI indicating semi-persistent CSI report, 4) The UE may consider/determine/identify that a first nominal repetition has the same time and/or frequency resource amount as a first actual repetition (e.g., an OFDM symbol length, the number of RBs per symbol, or a total number of REs), and may consider/determine/identify that a second nominal repetition has the same time and/or frequency resource amount as a second actual repetition (e.g., an OFDM symbol length, the number of RBs per symbol, or a total number of REs). In addition, the UE may multiplex the aperiodic CSI report or semi-consistent CSI report with both of the first and second actual repetitions.

4) As another example, the UE may multiplex the aperiodic CSI report with the first and second actual repetitions only when a particular condition is satisfied, and the condition may be a combination of at least one of the following items.

5) The first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition 5) If the particular condition is not satisfied or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the aperiodic CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols.

3) If the PUSCH is a PUSCH transmitted without DCI scheduling in the next period after the first PUSCH transmission after receiving DCI indicating a semi-persistent CSI report, 4) If the first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition, the UE may multiplex the semi-consistent CSI report with both of the first and second actual repetitions.

4) If the first nominal repetition has a time and/or frequency resource amount different from that of the first actual repetition (e.g., an OFDM symbol length, the number of RBs per symbol, or a total number of REs), and the second nominal repetition has the same time and/or frequency resource amount as the second actual repetition, the UE may disregard transmission for the first actual repetition, and multiplex the semi-consistent CSI report with the second actual repetition.

4) In addition, if the first nominal repetition has the same time and/or frequency resource amount as the first actual repetition (e.g., an OFDM symbol length, the number of RBs per symbol, or a total number of REs), and the second nominal repetition has a time and/or frequency resource amount different from that of the second actual repetition (e.g., an OFDM symbol length, the number of RBs per symbol, or a total number of REs), the UE may disregard transmission for the second actual repetition, and multiplex the semi-consistent CSI report with the first actual repetition.

4) In addition, if the first nominal repetition has a time and/or frequency resource amount different from that of the first actual repetition (e.g., an OFDM symbol length, the number of RBs per symbol, or a total number of REs) and the second nominal repetition has a time and/or frequency resource amount different from that of the second actual repetition, or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the semi-persistent CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols, and may disregard transmission for the remaining one actual repetition.

2) For [Method 3-2-4], the UE may report, to the base station, a UE capability for multiplexing an aperiodic CSI report or semi-persistent CSI during an SBFD operation.

3) For example, the UE and the base station may use [Method 3-2-4] according to the UE capability reporting of the UE, and there may be no particular higher layer signaling configurable by the base station for [Method 3-2-4].

3) As another example, the base station may configure, for the UE, a particular higher layer signaling having the meaning that [Method 3-2-4] is used, according to the UE capability reporting of the UE. If the higher layer signaling is not configured, the UE may operate in a combination of at least one of [Method 3-2-1] to [Method 3-2-6].

1) [Method 3-2-5] The UE may consider/determine/identify 2 as a repetition count regardless of the indicated repetition count. Two PUSCH repetitions may be an X1-th PUSCH repetition, which is transmitted in an SBFD slot or a set of consecutive SBFD symbols, among PUSCH repetitions to which a first beam is mapped, and an X2-th PUSCH repetition, which is transmitted in a UL slot or a set of consecutive UL symbols, among PUSCH repetitions to which a second beam is mapped. The UE may perform a detailed operation as below according to PUSCH repetition type A or B configurable through higher layer signaling.

2) X1 and X2 may be notified of by the base station through a combination of at least one of higher layer signaling, MAC-CE, and L1 signaling, or at least one of X1 or X2 may be used as a fixed value. For example, the UE may be notified of the X1 value by the base station as described above, and fix and use 1 as X2.

2) Through this operation, the UE may multiplex and transfer the aperiodic CSI report with and on a particular position notified of by the base station and thus there is a high probability that the resource amounts of the two PUSCH repetitions may become identical. In particular, an indication of the X1 value may help the UE in avoiding interference occurring due to a downlink signal when the UE multiplexes the aperiodic CSI report with a PUSCH repetition in a case where the base station recognizes a certain amount of an interference situation caused by a downlink situation on SBFD resources.

2) The PUSCH repetition to which the first beam is mapped may indicate PUSCH repetitions connected to a first SRS resource set among the two SRS resource sets having the higher layer signaling usage configured to be codebook or non-codebook. The PUSCH repetition to which the second beam is mapped may indicate PUSCH repetitions connected to a second SRS resource set among the two SRS resource sets having the higher layer signaling usage configured to be codebook or non-codebook.

2) In a case of PUSCH repetition type A, the UE may consider/determine/identify 2 as a PUSCH repetition count regardless of a configured and indicated PUSCH repetition count. In this case, the PUSCH repetition count may be a value configured through the higher layer signaling numberOfRepetitions in an entry indicated through a TDRA field, or may be a value configured through the higher layer signaling pusch-AggregationFactor if numberOfRepetitions is not configured.

3) The UE may multiplex the aperiodic CSI report or semi-persistent CSI report with the two PUSCH repetitions if the UE receives DCI indicating an aperiodic CSI report, if a PUSCH transmission is the first PUSCH transmission after receiving DCI indicating a semi-persistent CSI report, or if the PUSCH is a PUSCH transmitted without DCI scheduling in the next period after the first PUSCH transmission after receiving DCI indicating a semi-persistent CSI report.

4) For example, the UE may consider/determine/identify that the two PUSCH repetitions have the same time and/or frequency resource amounts (e.g., an OFDM symbol length, the number of RBs per symbol, or a total number of REs). For example, the UE may expect that the base station ensures the two PUSCH repetitions to have the same time and/or frequency resource amounts.

4) As another example, the UE may multiplex the aperiodic CSI report with the two PUSCH repetitions only when a particular condition is satisfied, and the condition may be a combination of at least one of the following items.

5) The two PUSCH repetitions have the same OFDM symbol length

5) The two PUSCH repetitions have the same frequency resource amount

5) The two PUSCH repetitions have the same number of REs

5) If the particular condition is not satisfied or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the aperiodic CSI report with one PUSCH repetition among the two PUSCH repetitions, and the one PUSCH repetition may correspond to one of the two PUSCH repetitions, a PUSCH repetition appearing first in the time dimension among the two PUSCH repetitions, a PUSCH repetition notified of through higher layer signaling, MAC-CE, or L1 signaling, a PUSCH repetition having a larger time and/or frequency resource amount or a PUSCH repetition having a smaller time and/or frequency resource amount, or a PUSCH repetition transmitted on an uplink slot or a set of consecutive uplink symbols or a PUSCH repetition transmitted on an SBFD slot or a set of consecutive SBFD symbols.

2) In a case of PUSCH repetition type B, the UE may consider/determine/identify 2 as a nominal repetition value regardless of a configured and indicated nominal repetition value. In this case, the PUSCH repetition count may be a value configured through the higher layer signaling numberOfRepetitions in an entry indicated through a TDRA field.

3) If the UE receives DCI indicating an aperiodic CSI report, or if a PUSCH transmission is the first PUSCH transmission after receiving DCI indicating semi-persistent CSI report, 4) The UE may consider/determine/identify that a first nominal repetition has the same time and/or frequency resource amount as a first actual repetition (e.g., an OFDM symbol length, the number of RBs per symbol, or a total number of REs), and may consider/determine/identify that a second nominal repetition has the same time and/or frequency resource amount as a second actual repetition (e.g., an OFDM symbol length, the number of RBs per symbol, or a total number of REs). In addition, the UE may multiplex the aperiodic CSI report or semi-consistent CSI report with both of the first and second actual repetitions.

4) As another example, the UE may multiplex the aperiodic CSI report with the first and second actual repetitions only when a particular condition is satisfied, and the condition may be a combination of at least one of the following items.

5) The first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition 5) If the particular condition is not satisfied or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the aperiodic CSI report with the first actual repetition among the first two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols.

3) If the PUSCH is a PUSCH transmitted without DCI scheduling in the next period after the first PUSCH transmission after the UE receives DCI indicating a semi-persistent CSI report, 4) If the first nominal repetition has the same time and/or frequency resource amount as the first actual repetition (e.g., an OFDM symbol length, the number of RBs per symbol, or a total number of REs), and the second nominal repetition has the same time and/or frequency resource amount as the second actual repetition, the UE may multiplex the semi-consistent CSI report with both the first and second actual repetitions.

4) If the first nominal repetition has a time and/or frequency resource amount different from that of the first actual repetition (e.g., an OFDM symbol length, the number of RBs per symbol, or a total number of REs), and the second nominal repetition has the same time and/or frequency resource amount as the second actual repetition, the UE may disregard transmission for the first actual repetition, and multiplex the semi-consistent CSI report with the second actual repetition.

4) In addition, if the first nominal repetition has the same time and/or frequency resource amount as the first actual repetition (e.g., an OFDM symbol length, the number of RBs per symbol, or a total number of REs), and the second nominal repetition has a time and/or frequency resource amount different from that of the second actual repetition (e.g., an OFDM symbol length, the number of RBs per symbol, or a total number of REs), the UE may disregard transmission for the second actual repetition, and multiplex the semi-consistent CSI report with the first actual repetition.

4) In addition, if the first nominal repetition has a time and/or frequency resource amount different from that of the first actual repetition (e.g., an OFDM symbol length, the number of RBs per symbol, or a total number of REs) and the second nominal repetition has a time and/or frequency resource amount different from that of the second actual repetition, or at least one of the two PUSCH repetitions does not occur (i.e., if all PUSCH repetitions are transmitted in an uplink slot or a set of consecutive uplink symbols, or there is one PUSCH repetition transmitted in an SBFD slot or a set of consecutive SBFD symbols), the UE may operate according to a combination of at least one of [Method 3-2-1] to [Method 3-2-6], or may multiplex the semi-persistent CSI report with the first actual repetition among the two PUSCH repetitions, with the second actual repetition, with an actual repetition notified of through higher layer signaling, MAC-CE, or L1 signaling, with an actual repetition having a larger time and/or frequency resource amount or an actual repetition having a smaller resource amount, with an actual repetition transmitted on an uplink slot or a set of consecutive uplink symbols, or with an actual repetition transmitted on an SBFD slot or a set of consecutive SBFD symbols, and may disregard transmission for the remaining one actual repetition.

2) For [Method 3-2-5], the UE may report, to the base station, a UE capability for multiplexing an aperiodic CSI report or semi-persistent CSI during an SBFD operation.

3) For example, the UE and the base station may use [Method 3-2-5] according to the UE capability reporting of the UE, and there may be no particular higher layer signaling configurable by the base station for [Method 3-2-5].

3) As another example, the base station may configure, for the UE, a particular higher layer signaling having the meaning that [Method 3-2-5] is used, according to the UE capability reporting of the UE. If the higher layer signaling is not configured, the UE may operate in a combination of at least one of [Method 3-2-1] to [Method 3-2-6].

1) [Method 3-2-6] The UE may be notified to use a combination of at least one of [Method 3-2-1] to [Method 3-2-5] described above by the base station through a combination of at least one of higher layer signaling, MAC-CE, and L1 signaling, or a combination of at least one may be fixedly defined in a specification. For example, in a case where the UE receives an SBFD configuration and resource allocation information from the base station, when an aperiodic CSI report is indicated from the base station through DCI, the UE may define [Method 3-2-1] described above as a method fixed in a specification as a method of multiplexing an aperiodic CSI report. As another example, the UE may be notified by the base station of one of [Method 3-2-1] to [Method 3-2-4] described above through a combination of at least one of higher layer signaling, MAC-CE, and L1 signaling. As another example, the UE may be notified by the base station of one of [Method 3-2-1] and [Method 3-2-5] described above through a combination of at least one of higher layer signaling, MAC-CE, and L1 signaling. The above description may merely correspond to an example, and other combinations may be possible.

2) For [Method 3-2-6], the UE may report, to the base station, a UE capability for multiplexing of an aperiodic CSI report during an SBFD operation.

3) For example, the UE and the base station may use [Method 3-2-6] according to the UE capability reporting of the UE, and there may be no particular higher layer signaling configurable by the base station for [Method 3-2-6].

3) As another example, the base station may configure, for the UE, a particular higher layer signaling having the meaning that [Method 3-2-6] is used, configured, the UE may operate in a combination of at least one of [Method 3-2-1] to [Method 3-2-6].

Fourth Embodiment: Independent Beta-Offset Indication Method Considering SBFD Resource Allocation As an embodiment of the disclosure, an independent beta-offset indication method considering SBFD resource allocation of a UE is described. This embodiment may be operated in combination with other embodiments.

Higher layer signaling UCI-OnPUSCH may be configured by a base station for a UE for DCI formats 0_1 and 0_2 (e.g., UCI-OnPUSCH to be applied to DCI format 0_1 may be configured, and UCI-OnPUSCH-DCI-0-2 that is a parameter to be applied to DCI format 0_2 may be configured).

If two types of HARQ-ACK codebooks including a HARQ-ACK codebook for a unicast PDSCH and a HARQ-ACK codebook for multi-cast or broadcast are configured for and used by the UE, a list of UCI-OnPUSCH may be configured for the UE with respect to each of DCI formats 0_1 and 0_2. For example, UCI-OnPUSCH-ListDCI-0-1 may be configured for the UE as higher layer signaling including a beta offset to be applied to DCI format 0_1, and UCI-OnPUSCH-ListDCI-0-2 may be configured for the UE as higher layer signaling including a beta offset to be applied to DCI format 0_2.

If SBFD configuration enabling allowing operation in SBFD is notified of to the UE by the base station through a combination of at least one of higher layer signaling, MAC-CE, and L1 signaling, the UE may operate through a combination of at least one of the following items for a signaling method of a beta-offset value applied when UCI multiplexing is performed at the time of PUSCH transmission.

1) [Method 4-1]

2) The UE may apply UCI-OnPUSCH, UCI-OnPUSCH-DCI-0-2, UCI-OnPUSCH-ListDCI-0-1, and UCI-OnPUSCH-ListDCI-0-2 even to a PUSCH transmitted on an uplink slot or a set of consecutive uplink symbols, and a PUSCH transmitted on an SBFD slot or a set of consecutive SBFD symbols.

2) Higher layer signaling for [Method 4-1] may not be separately configured for the UE by the base station.

1) [Method 4-2]

2) The UE may apply UCI-OnPUSCH, UCI-OnPUSCH-DCI-0-2, UCI-OnPUSCH-ListDCI-0-1, and UCI-OnPUSCH-ListDCI-0-2 only to a PUSCH transmitted on an uplink slot or a set of consecutive uplink symbols, and new higher layer signaling including a beta offset to be applied to an SBFD slot or a set of consecutive SBFD symbols may be defined.

2) Similarly, as higher layer signaling including a beta offset to be applied on an SBFD resource, UCI-OnPUSCH_SBFD to be applied to DCI format 0_1 and UCI-OnPUSCH_SBFD to be applied to DCI format 0_2 may be defined.

2) For [Method 4-2], the UE is required to transmit, to the base station, a UE capability report having the meaning that the UE supports [Method 4-2], and if there is higher layer signaling corresponding thereto transmitted from the base station and the base station may support same, or there may be no higher layer signaling described above. In a case where there is the higher layer signaling, if the higher layer signaling is not configured by the base station, the UE may apply a beta offset value, based on a combination of at least one of [Method 4-1] to [Method 4-3].

1) [Method 4-3]

2) If UCI-OnPUSCH-ListDCI-0-1 and UCI-OnPUSCH-ListDCI-0-2 described above are configured for the UE by the base station as higher layer signaling, and a HARQ-ACK codebook is configured for the UE only for a unicast PDSCH without a multi-cast or broadcast-related configuration, the UE may apply one of two beta offset values in the UCI-OnPUSCH-ListDCI-0-1 and UCI-OnPUSCH-ListDCI-0-2 received from the base station, to an uplink slot or a set of consecutive uplink symbols and apply the remaining one beta offset value to an SBFD slot or a set of consecutive SBFD symbols.

2) For [Method 4-3], the UE is required to transmit, to the base station, a UE capability report having the meaning that the UE supports [Method 4-3], and if there is higher layer signaling corresponding thereto transmitted from the base station and the base station may support same, or there may be no higher layer signaling described above. In a case where there is the higher layer signaling, if the higher layer signaling is not configured by the base station, the UE may apply a beta offset value, based on a combination of at least one of [Method 4-1] to [Method 4-3].

1) [Method 4-4]

2) The UE may be notified to use a combination of at least one of [Method 4-1] to [Method 4-3] described above by the base station through a combination of at least one of higher layer signaling, MAC-CE, and L1 signaling, or a combination of at least one may be fixedly defined in a specification and then used. For example, the UE and the base station may use [Method 4-2] described above as a method fixedly defined in a specification. As another example, one of [Method 4-1] and [Method 4-3] may be configured for the UE through higher layer signaling and then be used thereby.

If the UE operates in one of [Method 4-1] to [Method 4-4], the UE may define a 2nd beta offset field in addition to a beta offset field existing in DCI, and the 2nd beta offset field may be used when UCI is multiplexed with a PUSCH transmitted on an SBFD slot or a set of consecutive SBFD symbols. Each codepoint of the beta offset field and the 2nd beta offset field may have a different meaning according to DCI formats 0_1 and 0_2.

If the UE operates in one of [Method 4-1] to [Method 4-4] described above, the UE may indicate two types of beta offset information through a beta offset field existing in DCI, one type of beta offset information among the two pieces may be applied when UCI is multiplexed with a PUSCH transmitted on an uplink slot or a set of consecutive uplink symbols, and the other type of beta offset information may be applied when UCI is multiplexed with a PUSCH transmitted on an SBFD slot or a set of consecutive SBFD symbols. The beta offset field in the DCI may maintain two bits without change, or may be extended up to a maximum of four bits in order to indicate two types of beta offset information. Each codepoint which may be included in the beta offset field may have a different meaning according to DCI formats 0_1 and 0_2.

If the UE operates in one of [Method 4-1] to [Method 4-4] described above and two SRS resource sets having the higher layer signaling usage configured to be codebook or non-codebook are configured therefor by the base station, that is, if scheduling for multi-TRP PUSCH repetition is possible, the UE is able to perform the following operations.

1) [Method 4-2-1] A 2nd beta offset field is defined in addition to a beta offset field indicated through DCI, and the UE may operate based on the DCI in which the 2nd beta offset field is additionally defined. 2) The beta offset field may be connected to a first SRS resource set and the 2nd beta offset field may be connected to a second SRS resource set.

2) The beta offset field may be applied when a PUSCH repetition connected to the first SRS resource set is transmitted on one of a UL slot or a set of consecutive UL symbols or an SBFD slot or a set of consecutive SBFD symbols.

2) The 2nd beta offset field may be applied when a PUSCH repetition connected to the second SRS resource set is transmitted on one of a UL slot or a set of consecutive UL symbols or an SBFD slot or a set of consecutive SBFD symbols.

1) [Method 4-2-2] A 2nd beta offset field is defined in addition to a beta offset field indicated through DCI, and the UE may operate based on the DCI in which the 2nd beta offset field is additionally defined.

2) Each of the beta offset field and the 2nd beta offset field may be connected to the first SRS resource set and the second SRS resource set.

3) The beta offset field may be applied when all PUSCH repetitions connected to the first SRS resource set and the second SRS resource set are transmitted on a UL slot or a set of consecutive UL symbols.

3) The 2nd beta offset field may be applied when all PUSCH repetitions connected to the first SRS resource set and the second SRS resource set are transmitted on an SBFD slot or a set of consecutive SBFD symbols.

1) [Method 4-2-3] Two types of beta offset information may be indicated to the UE through a beta offset field indicated through DCI.

2) The beta offset field may be connected to both the first SRS resource set and the second SRS resource set.

2) A first type of beta offset information indicated through the beta offset field may be applied when a PUSCH repetition connected to the first SRS resource set is transmitted on one of a UL slot or a set of consecutive UL symbols or an SBFD slot or a set of consecutive SBFD symbols.

2) A second type of beta offset information indicated through the beta offset field may be applied when a PUSCH repetition connected to the second SRS resource set is transmitted on one of a UL slot or a set of consecutive UL symbols or an SBFD slot or a set of consecutive SBFD symbols.

1) [Method 4-2-4] Two types of beta offset information may be indicated to the UE through a beta offset field indicated through DCI.

2) The beta offset field may be connected to both the first SRS resource set and the second SRS resource set.

2) A first type of beta offset information indicated through the beta offset field may be applied when all PUSCH repetitions connected to the first SRS resource set and the second SRS resource set are transmitted on a UL slot or a set of consecutive UL symbols.

2) A second type of beta offset information indicated through the beta offset field may be applied when all PUSCH repetitions connected to the second SRS resource set are transmitted on an SBFD slot or a set of consecutive SBFD symbols.

The UE may transmit, to the base station, a UE capability report having the meaning that the UE supports at least one of [Method 4-2-1] to [Method 4-2-4], and if there is higher layer signaling corresponding thereto transmitted from the base station and the base station may support same, or there may be no higher layer signaling described above. In a case where there is the higher layer signaling, if the higher layer signaling is not configured by the base station, the UE may apply a beta offset value, based on a combination of at least one of [Method 4-1] to [Method 4-4] and [Method 4-2-1] to [Method 4-2-4].

Figure 23:
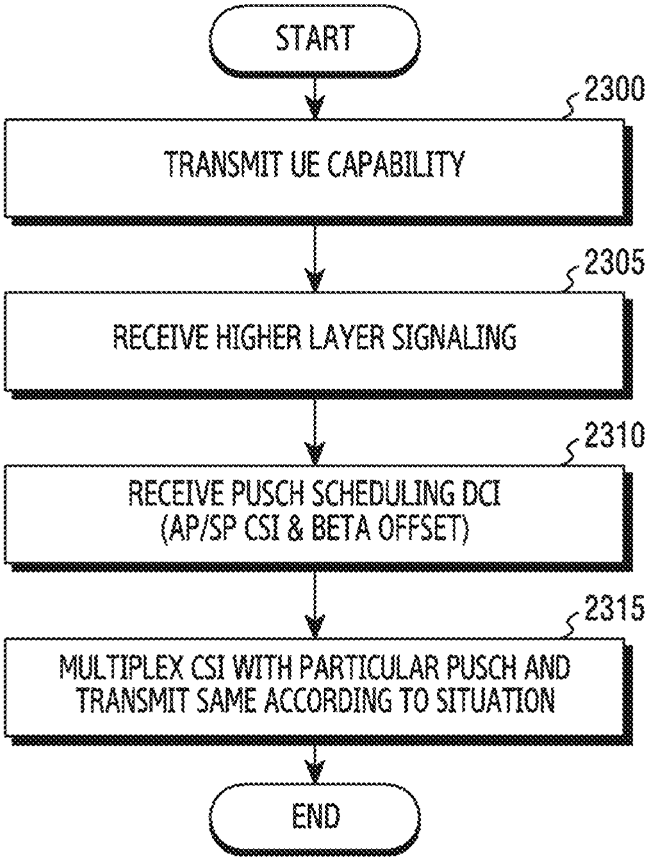
FIG. 23 is a diagram illustrating an operation of a terminal according to an embodiment of the disclosure.

FIG. 23 is a diagram illustrating an operation of a UE according to an embodiment of the disclosure.

Referring to FIG. 23, in operation 2300, a UE may transmit a UE capability to a base station. UE capability signaling which may be reported may relate to a combination of at least one of beam mapping operations 1 and 2, [Method 3-1-1] to [Method 3-1-6], [Method 3-2-1] to [Method 3-2-6], [Method 4-1] to [Method 4-4], and [Method 4-2-1] to [Method 4-2-4], which consider SBFD resource allocation at the time of multi-TRP-based PUSCH repetition. Operation 2300 may be omitted.

In operation 2305, the UE may receive higher layer signaling from the base station according to the reported UE capability. The UE may define higher layer parameters for a combination of, received from the base station, at least one of beam mapping operations 1 and 2 considering SBFD resource allocation at the time of multi-TRP-based PUSCH repetition, [Method 3-1-1] to [Method 3-1-6], [Method 3-2-1] to [Method 3-2-6], [Method 4-1] to [Method 4-4], and [Method 4-2-1] to [Method 4-2-4], and use one of the defined higher layer parameters.

In operation 2310, the UE may receive DCI for PUSCH scheduling from the base station, and an aperiodic CSI report or semi-persistent CSI report may be triggered through the DCI, and/or multiple beta offset values may be indicated through the DCI.

In operation 2315, the UE may multiplex aperiodic CSI or semi-persistent CSI with a particular PUSCH and transmit the multiplexed CSI and PUSCH to the base station. The particular PUSCH may be determined according to a combination of at least one of [Method 3-1-1] to [Method 3-1-6] and [Method 3-2-1] to [Method 3-2-6].

A flowchart described above illustrates an exemplified method implementable according to the principle of the disclosure, and a method illustrated in the flowchart of the disclosure may be variously modified. For example, a series of operations are illustrated, but various operations in each drawing may overlap with each other, occur in parallel, occur in a different sequence, or occur several times. In another example, an operation may be omitted or replaced with another operation.

Figure 24:
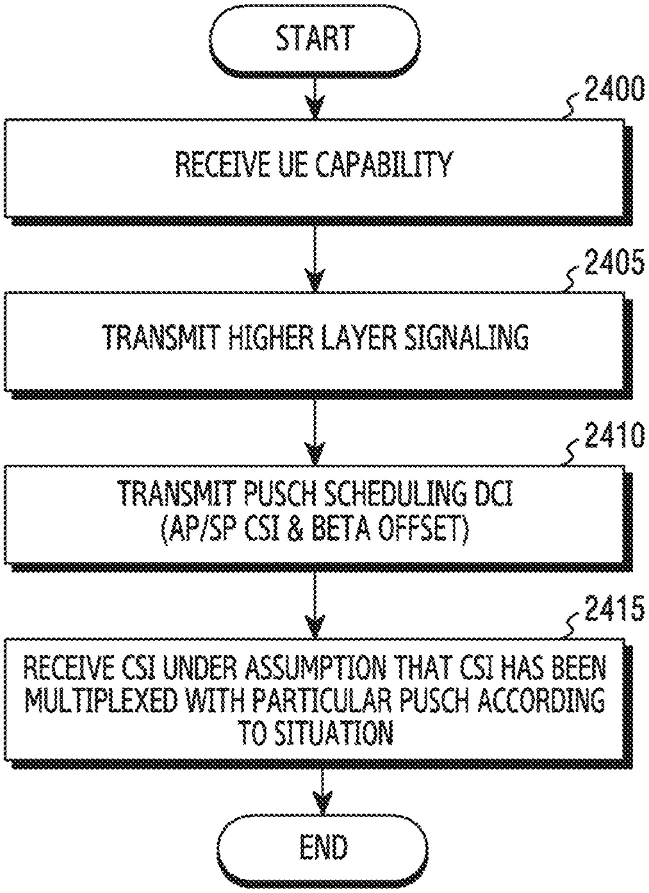
FIG. 24 is a diagram illustrating an operation of a base station according to an embodiment of the disclosure.

FIG. 24 is a diagram illustrating an operation of a base station according to an embodiment of the disclosure.

Referring to FIG. 24, in operation 2400, a base station may receive a UE capability from a UE. UE capability signaling which may be received may relate to a combination of at least one of beam mapping operations 1 and 2 considering SBFD resource allocation at the time of multi-TRP-based PUSCH repetition, [Method 3-1-1] to [Method 3-1-6], [Method 3-2-1] to [Method 3-2-6], [Method 4-1] to [Method 4-4], and [Method 4-2-1] to [Method 4-2-4]. Operation 2400 may be omitted.

In operation 2405, the base station may transmit higher layer signaling according to the UE capability reported by the UE. The base station may define higher layer parameters for a combination of at least one of beam mapping operations 1 and 2 considering SBFD resource allocation at the time of multi-TRP-based PUSCH repetition, [Method 3-1-1] to [Method 3-1-6], [Method 3-2-1] to [Method 3-2-6], [Method 4-1] to [Method 4-4], and [Method 4-2-1] to [Method 4-2-4], and use one of the defined higher layer parameters.

In operation 2410, the base station may transmit DCI for PUSCH scheduling to the UE. The DCI may include information that triggers an aperiodic CSI report or a semi-persistent CSI report for the UE, and/or multiple beta offset values may be indicated through the DCI.

In operation 2415, the base station may receive aperiodic CSI or semi-persistent CSI multiplexed with a particular PUSCH. The particular PUSCH may follow a combination of at least one of [Method 3-1-1] to [Method 3-1-6] and [Method 3-2-1] to [Method 3-2-6].

A flowchart described above illustrates an exemplified method implementable according to the principle of the disclosure, and a method illustrated in the flowchart of the disclosure may be variously modified. For example, a series of operations are illustrated, but various operations in each drawing may overlap with each other, occur in parallel, occur in a different sequence, or occur several times. In another example, an operation may be omitted or replaced with another operation.

Figure 25:
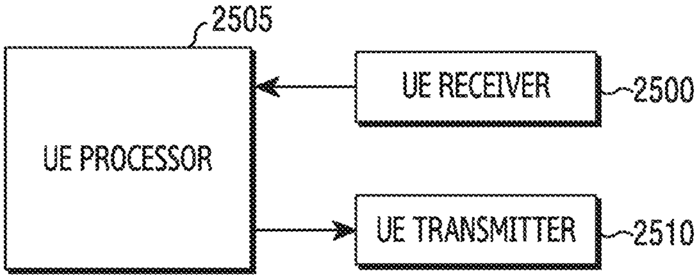
FIG. 25 illustrates a structure of a UE in a wireless communication system according to an embodiment of the disclosure.

FIG. 25 illustrates a structure of a UE in a wireless communication system according to an embodiment of the disclosure.

Referring to FIG. 25, the UE may include a transceiver, which refers to a UE receiver 2500 and a UE transmitter 2510 as a whole, memory (not illustrated), and a UE processor 2505 (or UE controller or processor). The UE receiver 2500 and the UE transmitter 2510, the memory, and the UE processor 2505 may operate according to the above-described communication methods of the UE. However, components of the UE are not limited to the above-described example. For example, the UE may include a larger or smaller number of components than the above-described components. Furthermore, the transceiver, the memory, and the processor may be implemented in the form of a single chip.

The transceiver may transmit/receive signals with the base station. The signals may include control information and data. To this end, the transceiver may include an RF transmitter configured to up-convert and amplify the frequency of transmitted signals, an RF receiver configured to low-noise-amplify received signals and down-convert the frequency thereof, and the like. However, this is only an embodiment of the transceiver, and the components of the transceiver are not limited to the RF transmitter and the RF receiver.

In addition, the transceiver may receive signals through a radio channel, output the same to the processor, and transmit signals output from the processor through the radio channel.

The memory may store programs and data necessary for operations of the UE. In addition, the memory may store control information or data included in signals transmitted/received by the UE. The memory may include storage media, such as read only memory (ROM), random access memory (RAM), hard disk, compact disc (CD)-ROM, and digital versatile disc (DVD), or a combination of storage media. In addition, the memory may include multiple memories.

Furthermore, the processor may control a series of processes such that the UE can operate according to the above-described embodiments. For example, the processor may control components of the UE to receive DCI configured in two layers so as to simultaneously receive multiple PDSCHs. The processor may include multiple processors, and the processor may perform operations of controlling the components of the UE by executing programs stored in the memory.

Figure 26:
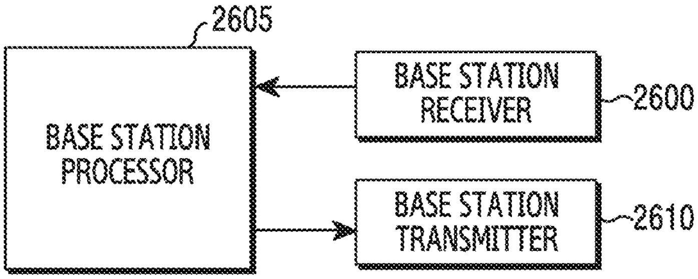
FIG. 26 illustrates a structure of a base station in a wireless communication system according to an embodiment of the disclosure.

FIG. 26 illustrates a structure of a base station in a wireless communication system according to an embodiment of the disclosure.

Referring to FIG. 26, the base station may include a transceiver, which refers to a base station receiver 2600 and a base station transmitter 2610 as a whole, memory (not illustrated), and a base station processor 2605 (or base station controller or processor). The base station receiver 2600 and the base station transmitter 2610, the memory, and the base station processor 2505 may operate according to the above-described communication methods of the base station. However, components of the base station are not limited to the above-described example. For example, the base station may include a larger or smaller number of components than the above-described components. Furthermore, the transceiver, the memory, and the processor may be implemented in the form of a single chip.

The transceiver may transmit/receive signals with the UE. The signals may include control information and data. To this end, the transceiver may include an RF transmitter configured to up-convert and amplify the frequency of transmitted signals, an RF receiver configured to low-noise-amplify received signals and down-convert the frequency thereof, and the like. However, this is only an embodiment of the transceiver, and the components of the transceiver are not limited to the RF transmitter and the RF receiver.

In addition, the transceiver may receive signals through a radio channel, output the same to the processor, and transmit signals output from the processor through the radio channel.

The memory may store programs and data necessary for operations of the base station. In addition, the memory may store control information or data included in signals transmitted/received by the base station. The memory may include storage media, such as ROM, RAM, hard disk, CD-ROM, and DVD, or a combination of storage media. In addition, the memory may include multiple memories.

The processor may control a series of processes such that the base station can operate according to the above-described embodiments of the disclosure. For example, the processor may control components of the base station to configure DCI configured in two layers including allocation information regarding multiple PDSCHs and to transmit the same. The processor may include multiple processors, and the processor may perform operations of controlling the components of the base station by executing programs stored in the memory.

Methods disclosed in the claims and/or methods according to the embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program includes instructions that cause the electronic device to perform the methods according to various embodiments of the disclosure as defined by the appended claims and/or disclosed herein.

These programs (software modules or software) may be stored in non-volatile memories including random access memory and flash memory, read only memory (ROM), electrically erasable programmable read only memory (EEPROM), magnetic disc storage device, compact disc-ROM (CD-ROM), digital versatile discs (DVDs), or other type optical storage devices, or a magnetic cassette. Alternatively, any combination of some or all of them may form memory in which the program is stored.

In addition, a plurality of such memories may be included in the electronic device. In addition, the programs may be stored in an attachable storage device which can access the electronic device through communication networks, such as the Internet, intranet, local area network (LAN), wide LAN (WLAN), and storage area network (SAN) or a combination thereof. Such a storage device may access the electronic device via an external port. In addition, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of embodiments of the disclosure and help understanding of embodiments of the disclosure, and are not intended to limit the scope of embodiments of the disclosure. For example, it will be apparent to those skilled in the art that other variants based on the technical idea of the disclosure may be implemented. Also, the above respective embodiments may be employed in combination, as necessary. For example, a part of one embodiment of the disclosure may be combined with a part of another embodiment to operate a base station and a terminal. As an example, a part of a first embodiment of the disclosure may be combined with a part of a second embodiment to operate a base station and a terminal. Moreover, although the above embodiments have been described based on the FDD LTE system, other variants based on the technical idea of the embodiments may also be implemented in other communication systems, such as TDD LTE, and 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

In addition, in methods of the disclosure, some or all of the contents of each embodiment may be implemented in combination without departing from the essential spirit and scope of the disclosure.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a base station, configuration information including first information on a first sounding reference signal (SRS) resource set and a second SRS resource set, second information associated with a physical uplink shared channel (PUSCH) repeat transmissions, and third information associated with slot configuration;

receiving, from the base station, downlink control information (DCI) scheduling a PUSCH, the DCI including a channel state information (CSI) request field triggering aperiodic CSI reporting; and transmitting, to the base station, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

2. The method of claim 1, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot and at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

3. The method of claim 1, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot excluding at least one first SBFD slot among the at least one first uplink slot and the at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

4. The method of claim 1, wherein, in case that the number of RE allocated to the first repetition of the repetitions of the first PUSCH is different from the number of RE allocated to the first repetition of repetitions of the second PUSCH, the aperiodic CSI reporting is multiplexed in a repetition allocated to an earliest slot among at least one first uplink slot and at least one first SBFD slot which are associated with the repetitions of the first PUSCH, and at least one second uplink slot and at least one second SBFD slot which are associated with the repetitions of the second PUSCH.

5. A method performed by a base station in a wireless communication system, the method comprising:

transmitting, to a user equipment (UE), configuration information including first information on a first sounding reference signal (SRS) resource set and a second SRS resource set, second information associated with a physical uplink shared channel (PUSCH) repeat transmissions, and third information associated with slot configuration;

transmitting, to the UE, downlink control information (DCI) scheduling a PUSCH, the DCI including a channel state information (CSI) request field triggering aperiodic CSI reporting; and receiving, from the UE, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

6. The method of claim 5, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot and at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

7. The method of claim 5, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot excluding at least one first SBFD slot among the at least one first uplink slot and the at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

8. The method of claim 5, wherein, in case that the number of RE allocated to the first repetition of the repetitions of the first PUSCH is different from the number of RE allocated to the first repetition of repetitions of the second PUSCH, the aperiodic CSI reporting is multiplexed in a repetition allocated to an earliest slot among at least one first uplink slot and at least one first SBFD slot which are associated with the repetitions of the first PUSCH, and at least one second uplink slot and at least one second SBFD slot which are associated with the repetitions of the second PUSCH.

9. A user equipment (UE) in a wireless communication system, the UE comprising:

a transceiver; and a controller coupled with the transceiver and configured to:

receive, from a base station, configuration information including first information on a first sounding reference signal (SRS) resource set and a second SRS resource set, second information associated with a physical uplink shared channel (PUSCH) repeat transmissions, and third information associated with slot configuration, receive, from the base station, downlink control information (DCI) scheduling a PUSCH, the DCI including a channel state information (CSI) request field triggering aperiodic CSI reporting, and transmit, to the base station, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

10. The UE of claim 9, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot and at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

11. The UE of claim 9, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot excluding at least one first SBFD slot among the at least one first uplink slot and the at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

12. The UE of claim 9, wherein, in case that the number of RE allocated to the first repetition of the repetitions of the first PUSCH is different from the number of RE allocated to the first repetition of repetitions of the second PUSCH, the aperiodic CSI reporting is multiplexed in a repetition allocated to an earliest slot among at least one first uplink slot and at least one first SBFD slot which are associated with the repetitions of the first PUSCH, and at least one second uplink slot and at least one second SBFD slot which are associated with the repetitions of the second PUSCH.

13. A base station in a wireless communication system, the base station comprising:

a transceiver; and a controller coupled with the transceiver and configured to:

transmit, to a user equipment (UE), configuration information including first information on a first sounding reference signal (SRS) resource set and a second SRS resource set, second information associated with a physical uplink shared channel (PUSCH) repeat transmissions, and third information associated with slot configuration, transmit, to the UE, downlink control information (DCI) scheduling a PUSCH, the DCI including a channel state information (CSI) request field triggering aperiodic CSI reporting, and receive, from the UE, a first PUSCH associated with the first SRS resource set and a second PUSCH associated with the second SRS resource set, wherein the slot configuration configured based on the third information includes a slot for uplink transmission of the UE, and a subband non-overlapping full duplex (SBFD) slot including a subband for downlink reception of the UE and a subband for the uplink transmission of the UE, and wherein, in case that a number of resource element (RE) allocated to a first repetition of repetitions of the first PUSCH is same with a number of RE allocated to a first repetition of repetitions of the second PUSCH, the aperiodic CSI reporting is multiplexed in the first repetition of the repetitions of the first PUSCH and the first repetition of the repetitions of the second PUSCH, respectively.

14. The base station of claim 13, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot and at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

15. The base station of claim 13, wherein, in case that the number of RE allocated to the first repetition of the repetitions of the first PUSCH is same with the number of RE allocated to the first repetition of repetitions of the second PUSCH:

the first repetition of the repetitions of the first PUSCH in which the aperiodic CSI reporting is multiplexed is allocated to an earliest slot among at least one first uplink slot excluding at least one first SBFD slot among the at least one first uplink slot and the at least one first SBFD slot which are associated with the repetitions of the first PUSCH, and the first repetition of the repetitions of the second PUSCH in which the aperiodic CSI reporting is multiplexed is allocated to an earliest slot among at least one second uplink slot and at least one second SBFD slot which are associated with the repetitions of the second PUSCH.

16. The base station of claim 13, wherein, in case that the number of RE allocated to the first repetition of the repetitions of the first PUSCH is different from the number of RE allocated to the first repetition of repetitions of the second PUSCH, the aperiodic CSI reporting is multiplexed in a repetition allocated to an earliest slot among at least one first uplink slot and at least one first SBFD slot which are associated with the repetitions of the first PUSCH, and at least one second uplink slot and at least one second SBFD slot which are associated with the repetitions of the second PUSCH.

* * * * *